(12) United States Patent (10) Patent No.: US 9,234,136 B2
Archetti et al. (45) Date of Patent: Jan. 12, 2016

(54) LIQUID-CRYSTALLINE MEDIUM

(75) Inventors: Graziano Archetti, Darmstadt (DE); Andreas Taugerbeck, Darmstadt (DE); Renate Bender, Darmstadt (DE); Ming-Chou Wu, Zhongli (TW)

(73) Assignee: MERCK PATENT GMBH, Darmstadt (DE)

( * ) Notice: Subject to any disclaimer, the term of this patent is extended or adjusted under 35 U.S.C. 154(b) by 0 days.

(21) Appl. No.: 14/131,294

(22) PCT Filed: Jul. 3, 2012

(86) PCT No.: PCT/EP2012/002794
§ 371 (c)(1),
(2), (4) Date: Jan. 7, 2014

(87) PCT Pub. No.: WO2013/004372
PCT Pub. Date: Jan. 10, 2013

(65) Prior Publication Data
US 2014/0138581 A1 May 22, 2014

(30) Foreign Application Priority Data
Jul. 7, 2011 (EP) .................................... 11005549

(51) Int. Cl.
*G02F 1/1333* (2006.01)
*C09K 19/56* (2006.01)
*C09K 19/04* (2006.01)
*C09K 19/54* (2006.01)

(52) U.S. Cl.
CPC .............. *C09K 19/56* (2013.01); *C09K 19/0403* (2013.01); *C09K 2019/0444* (2013.01); *C09K 2019/0448* (2013.01); *C09K 2019/548* (2013.01)

(58) Field of Classification Search
CPC .................. C09K 2019/0448; C09K 2019/548; C09K 2019/0444; C09K 19/56; C09K 19/0403; G02F 1/1333
USPC .......... 349/167, 182, 183; 252/299.01, 299.6, 252/299.63; 428/1.1
See application file for complete search history.

(56) References Cited

U.S. PATENT DOCUMENTS

| 2004/0011996 A1 | 1/2004 | Klasen-Memmer et al. |
| 2013/0182202 A1 | 7/2013 | Graziano et al. |
| 2013/0314655 A1 | 11/2013 | Archetti et al. |

FOREIGN PATENT DOCUMENTS

| CN | 103119128 A | 5/2013 |
| CN | 103492531 A | 1/2014 |
| WO | 92/13928 A1 | 8/1992 |

OTHER PUBLICATIONS

Chinese Office Action dated Nov. 2, 2014 issued in corresponding Chinese Application 201280032365.1 (pp. 1-7).
English Translation ABSTRACT of CN 103119128 published May 22, 2013.
English Translation ABSTRACT of CN 103492531 published Jan. 1, 2014.
International Search Report dated Sep. 26, 2012 issued in corresponding PCT/EP2012/002794 application (pp. 1-3).

*Primary Examiner* — Geraldina Visconti
(74) *Attorney, Agent, or Firm* — Millen, White, Zelano and Branigan, P.C.

(57) ABSTRACT

The invention relates to a liquid-crystalline medium based on a mixture of polar compounds having a negative dielectric anisotropy which contains at least one self-aligning additive, especially at least one additive selected from the group of the compounds of the formula IA to ID

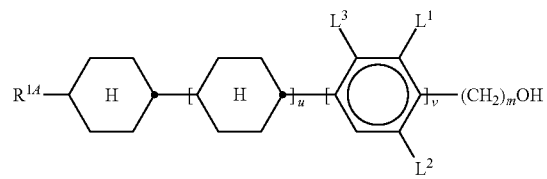

IA

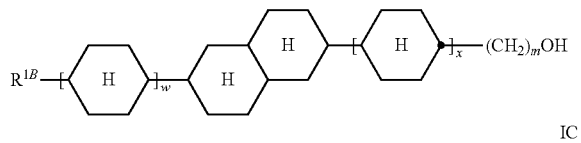

IB

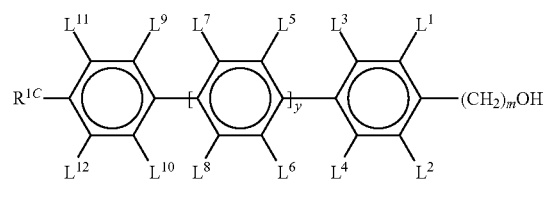

IC

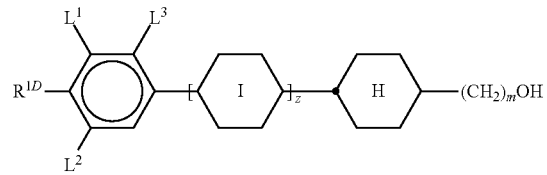

ID in which
$R^{1A}$, $R^{1B}$, $R^{1C}$, $L^{1-12}$, $R^{1D}$, Ring l, u, v, w, x, y, z and m have the meanings indicated in Claim 4
and to the use thereof for an active-matrix display, in particular based on the VA, PSA and PS-VA effect in LC displays.

20 Claims, No Drawings

LIQUID-CRYSTALLINE MEDIUM

The invention relates to a liquid-crystalline medium which comprises at least one self-aligning additive especially for VA- and PS-VA applications.

The self-aligning additives are preferably selected from the group of the following compounds:

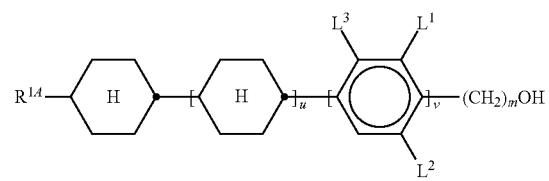

IA

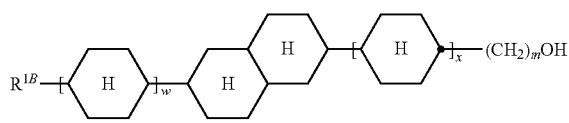

IB

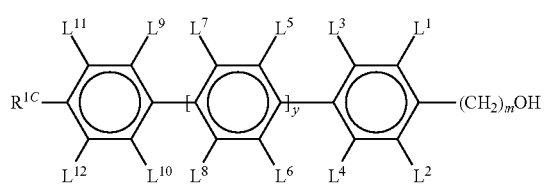

IC

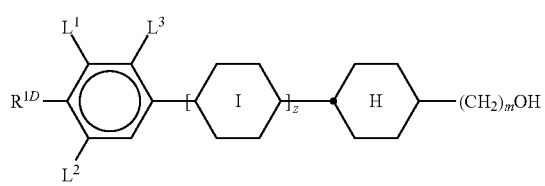

ID in which
$R^{1A}$, $R^{1B}$ and $R^{1C}$ each, independently of one another, denote halogen, an alkyl or alkoxy radical having 1 to 15 C atoms, where, in addition, one or more $CH_2$ groups in these radicals may each be replaced, independently of one another, by —C≡C—, —$CF_2$O—, —CH=CH—,

—CO—O—, —O—CO— in such a way that O atoms are not linked directly to one another, and in which, in addition, one or more H atoms may be replaced by halogen,
$R^{1D}$ H, halogen, an alkyl or alkoxy radical having 1 to 15 C atoms, where, in addition, one or more $CH_2$ groups in these radicals may each be replaced, independently of one another, by —C≡C—, —$CF_2$O—, —CH=CH—, —CO—O—, —O—CO—

in such a way that O atoms are not linked directly to one another, and in which, in addition, one or more H atoms may be replaced by halogen,

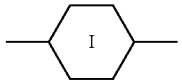

denotes

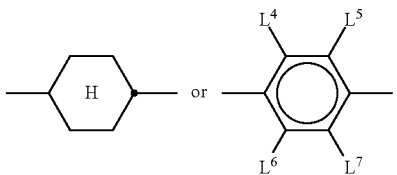

$L^1$ to $L^{12}$ each, independently of one another, denote H, F, Cl, $CF_3$, $CHF_2$ or alkyl with 1-5 carbon atoms, preferably F or alkyl,
m 0, 1, 2, 3, 4, 5 or 6, and
u, v, w, x, y and z each, independently denote 0 or 1.

Media of this type can be used, in particular, for electro-optical displays having active-matrix addressing based on the ECB effect.

The principle of electrically controlled birefringence, the ECB effect or also DAP (deformation of aligned phases) effect, was described for the first time in 1971 (M. F. Schieckel and K. Fahrenschon, "Deformation of nematic liquid crystals with vertical orientation in electrical fields", Appl. Phys. Lett. 19 (1971), 3912). This was followed by papers by J. F. Kahn (Appl. Phys. Lett. 20 (1972), 1193) and G. Labrunie and J. Robert (J. Appl. Phys. 44 (1973), 4869).

The papers by J. Robert and F. Clerc (SID 80 Digest Techn. Papers (1980), 30), J. Duchene (Displays 7 (1986), 3) and H. Schad (SID 82 Digest Techn. Papers (1982), 244) showed that liquid-crystalline phases must have high values for the ratio of the elastic constants $K_3/K_1$, high values for the optical anisotropy $\Delta n$ and values for the dielectric anisotropy of $\Delta\varepsilon \leq -0.5$ in order to be suitable for use in high-information display elements based on the ECB effect. Electro-optical display elements based on the ECB effect have a homeotropic edge alignment (VA technology=vertically aligned).

Displays which use the ECB effect, as so-called VAN (vertically aligned nematic) displays, for example in the MVA (multi-domain vertical alignment, for example: Yoshide, H. et al., paper 3.1: "MVA LCD for Notebook or Mobile PCs...", SID 2004 International Symposium, Digest of Technical Papers, XXXV, Book I, pp. 6 to 9, and Liu, C. T. et al., paper 15.1: "A 46-inch TFT-LCD HDTV Technology...", SID 2004 International Symposium, Digest of Technical Papers, XXXV, Book II, pp. 750 to 753), PVA (patterned vertical alignment, for example: Kim, Sang Soo, paper 15.4: "Super PVA Sets New State-of-the-Art for LCD-TV", SID 2004 International Symposium, Digest of Technical Papers, XXXV, Book II, pp. 760 to 763), ASV (advanced super view, for example: Shigeta, Mitzuhiro and Fukuoka, Hirofumi, paper 15.2: "Development of High Quality LCDTV", SID 2004 International Symposium, Digest of Technical Papers, XXXV, Book II, pp. 754 to 757) modes, have established themselves as one of the three more recent types of liquid-crystal display that are currently the most important, in particular for television applications, besides IPS (in-plane switching) displays (for example: Yeo, S. D., paper 15.3: "An LC Display for the TV Application", SID 2004 International Symposium, Digest of Technical Papers, XXXV, Book II, pp. 758 & 759) and the long-known TN (twisted nematic) displays. The technologies are compared in general form, for example, in Souk, Jun, SID Seminar 2004, seminar M-6: "Recent Advances in LCD Technology", Seminar Lecture Notes, M-6/1 to M-6/26, and Miller, Ian, SID Seminar 2004, seminar M-7: "LCD-Television", Seminar Lecture Notes, M-7/1 to M-7/32. Although the response times of modern ECB displays have already been significantly improved by addressing methods with overdrive, for example: Kim, Hyeon Kyeong et al., paper 9.1: "A 57-in. Wide UXGA TFT-LCD for HDTV Application", SID 2004 International Symposium, Digest of Technical Papers, XXXV, Book I, pp. 106 to 109, the achievement of video-compatible response times, in particular on switching of grey shades, is still a problem which has not yet been satisfactorily solved.

Industrial application of this effect in electro-optical display elements requires LC phases, which have to satisfy a multiplicity of requirements. Particularly important here are chemical resistance to moisture, air and physical influences, such as heat, infrared, visible and ultraviolet radiation and direct and alternating electric fields.

Furthermore, industrially usable LC phases are required to have a liquid-crystalline mesophase in a suitable temperature range and low viscosity.

None of the hitherto-disclosed series of compounds having a liquid-crystalline mesophase includes a single compound which meets all these requirements. Mixtures of two to 25, preferably three to 18, compounds are therefore generally prepared in order to obtain substances which can be used as LC phases. However, it has not been possible to prepare optimum phases easily in this way since no liquid-crystal materials having significantly negative dielectric anisotropy and adequate long-term stability were hitherto available.

Matrix liquid-crystal displays (MLC displays) are known. Non-linear elements which can be used for individual switching of the individual pixels are, for example, active elements (i.e. transistors). The term "active matrix" is then used, where a distinction can be made between two types:
1. MOS (metal oxide semiconductor) transistors on a silicon wafer as substrate
2. thin-film transistors (TFTs) on a glass plate as substrate.

In the case of type 1, the electro-optical effect used is usually dynamic scattering or the guest-host effect. The use of single-crystal silicon as substrate material restricts the display size, since even modular assembly of various part-displays results in problems at the joints.

In the case of the more promising type 2, which is preferred, the electro-optical effect used is usually the TN effect.

A distinction is made between two technologies: TFTs comprising compound semiconductors, such as, for example, CdSe, or TFTs based on polycrystalline or amorphous silicon. The latter technology is being worked on intensively worldwide.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully colour-capable displays, in which a mosaic of red, green and blue filters is arranged in such a way that a filter element is opposite each switchable pixel.

The term MLC displays here covers any matrix display with integrated non-linear elements, i.e. besides the active matrix, also displays with passive elements, such as varistors or diodes (MIM=metal-insulator-metal).

MLC displays of this type are particularly suitable for TV applications (for example pocket TVs) or for high-information displays in automobile or aircraft construction. Besides problems regarding the angle dependence of the contrast and the response times, difficulties also arise in MLC displays due to insufficiently high specific resistance of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210-288 Matrix LCD Controlled by Double Stage Diode Rings, pp. 141 ff., Paris; STROMER, M., Proc. Eurodisplay 84, September 1984: Design of Thin Film Transistors for Matrix Addressing of Television Liquid Crystal Displays, pp. 145 ff., Paris]. With decreasing resistance, the contrast of an MLC display deteriorates. Since the specific resistance of the liquid-crystal mixture generally drops over the life of an MLC display owing to interaction with the inside surfaces of the display, a high (initial) resistance is very important for displays that have to have acceptable resistance values over a long operating period.

There thus continues to be a great demand for MLC displays having very high specific resistance at the same time as a large working-temperature range, short response times and a low threshold voltage with the aid of which various grey shades can be produced.

The disadvantage of the frequently-used MLC-TN displays is due to their comparatively low contrast, the relatively high viewing-angle dependence and the difficulty of generating grey shades in these displays.

VA displays have significantly better viewing-angle dependencies and are therefore principally used for televisions and monitors. However, there continues to be a need here to improve the response times, in particular with respect to the use of televisions having frame rates (image change frequency/repetition rates) of greater than 60 Hz. At the same time, however, the properties, such as, for example, the low-temperature stability, must not be impaired.

The reliability of liquid crystal (LC) mixtures is one of the major issues in today's LCD industry. A main aspect is the stability of the liquid crystal molecules towards the light emitted from the backlight unit of the LCD. Light induced reactions of the LC material can cause display defects known as image sticking. This strongly reduces the lifetime of the LCD and is one of the main reliability criterions in LCD industry.

For example, liquid crystal mixtures containing LC materials with alkenyl-moieties often show some kind of degradation during long term backlight irradiation. This degradation can be observed by measuring the Voltage Holding Ratio (VHR) of the LC mixtures which have been objected to backlight irradiation for a defined time period.

Also other kind of irradiation, like the UV-light, necessary for the curing of reactive mesogens (RMs), especially for the PS-VA technology, may lead to a reduction of the VHR values of a test-cell or of a display. The use of cut-filters in order to reduce this effect is of limited applicability. By increasing the wavelength of the curing-light the VHR is improved, but at the same time the reaction speed of the RMs is reduced and this effect does not fit with the requirements of the LCD industry.

Thus, a solution is needed by which the light induced degradation of a LC mixture is strongly reduced. Especially, in terms of LCD performance, there is an interest to use liquid-crystalline compounds containing an alkenyl side chain in order to achieve faster switching times and hence better moving picture performances. Especially since the trend for LCD TC clearly is to go to higher frame rates, e.g. 200 Hz or higher, also including 3D applications.

The invention thus has an object of providing liquid-crystal mixtures, in particular for monitor and TV applications, which are based on the ECB effect especially for VA, PSA and PS-VA applications, which do not have the above-mentioned disadvantages or only do so to a reduced extent. In particular, it must be ensured for monitors and televisions that they also operate at extremely high and extremely low temperatures and have short response times and at the same time have improved reliability behaviour, in particular have no or significantly reduced image sticking after long operating times.

In conventional VA-displays a polyimide (PI) layer is needed for inducing the required homeotropic orientation of the LC. Besides of the significant costs due to its production, unfavourable interaction between PI and LC often leads to a reduction of the electric resistance of the VA-display. The number of useful LC molecules is thus significantly reduced, at the expenses of the overall switching performances (e.g. higher switching times) of the display. Getting rid of PI is thus desirable, while providing for the required homeotropic orientation.

It has now been found that these and other objects can be achieved if LC media according to the invention are used in LC displays.

The invention thus relates to a liquid crystalline medium having a negative dielectrically anisotropy ($\Delta\epsilon$) with improved degradation which contains at least one self-aligning additive, preferably at least one additive selected from the group of compounds of the formula IA, IB, IC and ID.

Such kind of mixtures are highly suitable for the use in displays which do not contain any orientation layer. Liquid crystal display devices, in general have a structure in which a liquid crystal mixture is sealed between a pair of insulating substrates, such as glass substrates, in such a manner that the liquid crystal molecules thereof are orientated in a predetermined direction, and an orientation film is formed on the respective substrates on the side of the liquid crystal mixture. As a material of an orientation film, there is usually used a polyimide (PI). Homeotropic orientation of the LC molecules is especially necessary for LC modes like PVA, MCA, etc., and can be achieved by the use of self-aligning additives, without the need of an orientation film. The mixtures according to the invention show an improved light and temperature stability compared to LC mixtures without any self-aligning additives.

In a preferred embodiment, the LC mixture according to the invention contains at least one self-aligning additive and at least one polymerisable compound (also called reactive mesogen (RM)). Such kind of LC mixtures are highly suitable for PI-free PS-VA displays. The alignment of the LC molecules is induced by the self-aligning additives and the induced orientation (pre-tilt) may be additionally tuned or stabilized by the polymerization of the RMs, under conditions suitable for a multidomain switching. By the tuning of the UV-curing conditions it is possible in one single step to improve simultaneously SWT and contrast ratio. Reliability of the mixture (VHR) after light stress (both UV-curing and Backlight (BLT)) is improved compared to LC mixtures without any self-aligning additive filled in a "classic" PI-coated test cell. Furthermore, the UV-curing may be performed by using cut-filters at a wavelength by which the polymerization of the RMs is still reasonably fast and the VHR values are on an acceptable level.

The mixtures according to the invention preferably exhibit very broad nematic phase ranges having clearing points ≥70° C., preferably ≥75° C., in particular ≥80° C., very favourable values for the capacitive threshold, relatively high values for the holding ratio and at the same time very good low-temperature stabilities at –20° C. and –30° C., as well as very low rotational viscosities and short response times. The mixtures according to the invention are furthermore distinguished by the fact that, in addition to the improvement in the rotational viscosity $\gamma_1$, relatively high values of the elastic constant $K_{33}$ for improving the response times can be observed.

Some preferred embodiments of the mixtures according to the invention are indicated below.

In the compounds of the formulae IA, IB, IC and ID $R^{1A}$, $R^{1B}$ and $R^{1C}$ each, independently of one another, preferably denote straight-chain alkyl, in particular $CH_3$, $C_2H_5$, n-$C_3H_7$, n-$C_4H_9$, n-$C_5H_{11}$, n-$C_6H_{13}$, furthermore alkenyloxy, in particular $OCH_2CH{=}CH_2$, $OCH_2CH{=}CHCH_3$, $OCH_2CH{=}CHC_2H_5$, alkoxy, in particular $OC_2H_5$, $OC_3H_7$, $OC_4H_9$, $OC_5H_{11}$ and $OC_6H_{13}$.

$R^{1C}$ is preferably H, straight-chain alkyl or straight-chain alkoxy or halogen. In the case that $R^{1C}$ denotes halogen, $R^{1C}$ is preferably F or Cl, in particular F. $R^{1D}$ is preferably F or Cl, in particular F. In the compounds of the formula IA, IB, IC and ID $L^1$ to $L^{12}$ is preferably H or F or alkyl with 1-5 carbon atoms. In the compounds of the formula IC $L^1$ to $L^{12}$ denotes preferably H or F and $L^4$ is preferably H, F or alkyl. In case that $L^4$ in formula IC is alkyl, $L^4$ is preferably $CH_3$, $C_2H_5$ or n-$C_3H_7$.

m is preferably 0 or 1. u+v is preferably ≥1. w+x is preferably 0 or 1.

Preferred compounds of the formula IA are the compounds of the sub-formulae IA-1 to I-60:

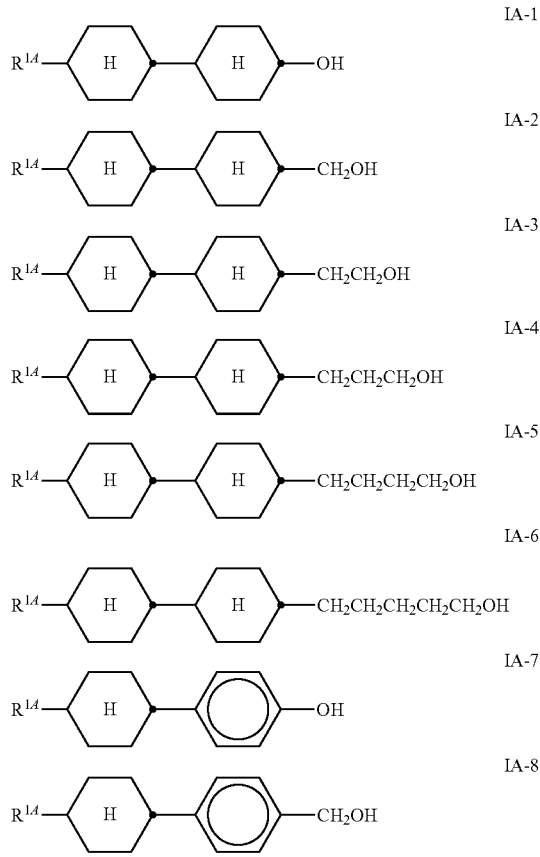

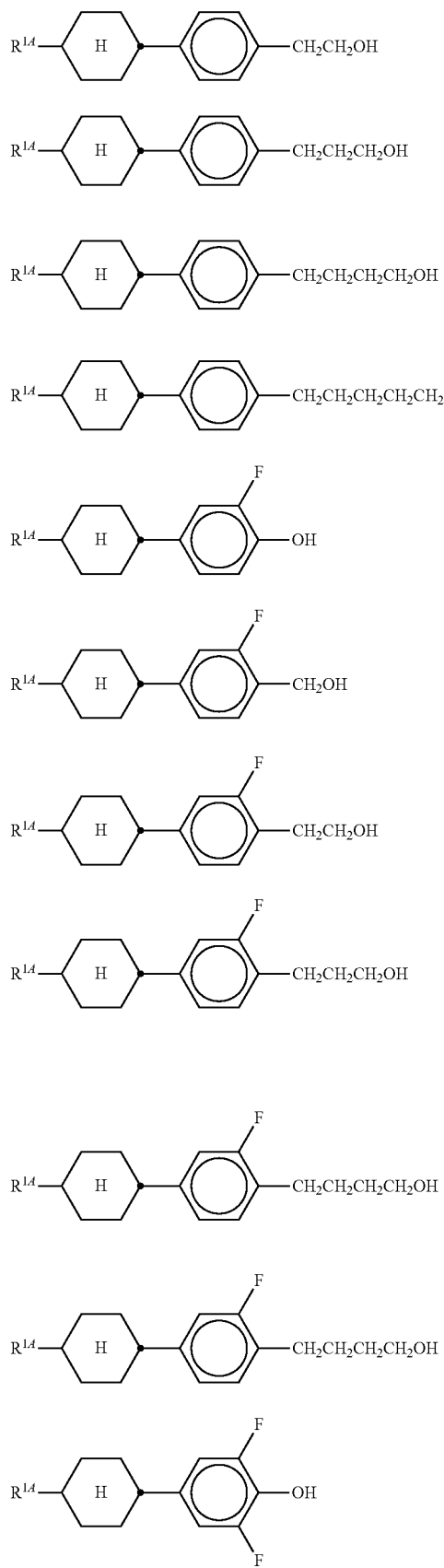

IA-30
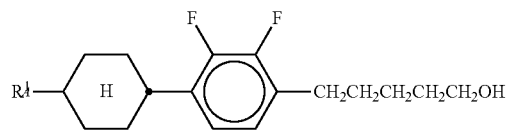
IA-31
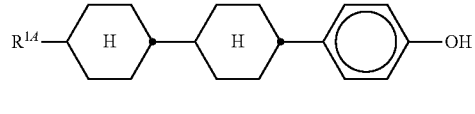
IA-32
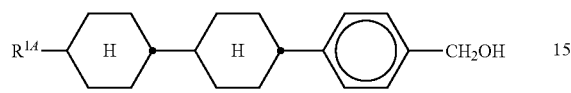
IA-33
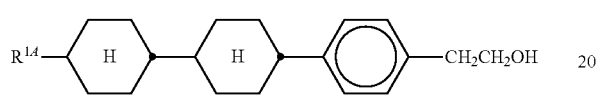
IA-34
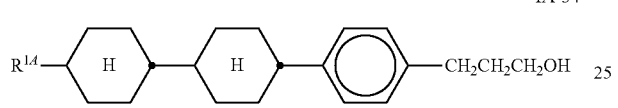
IA-35
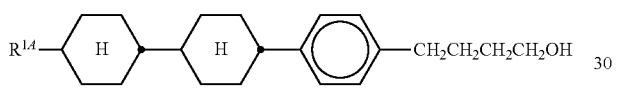
IA-36
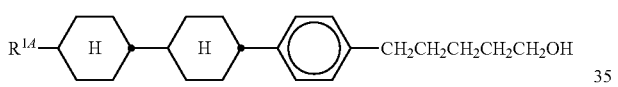
IA-37
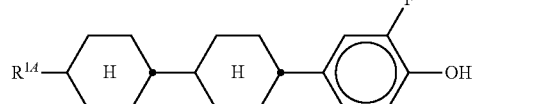
IA-38
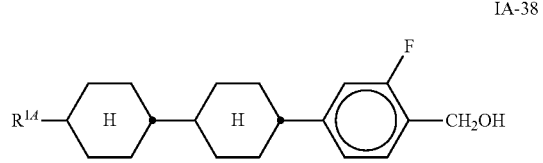
IA-39
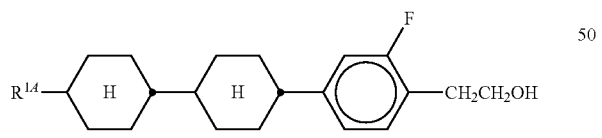
IA-40
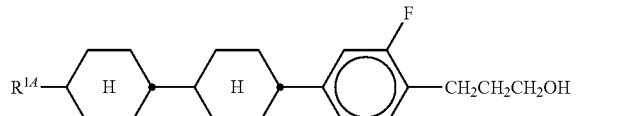
IA-41
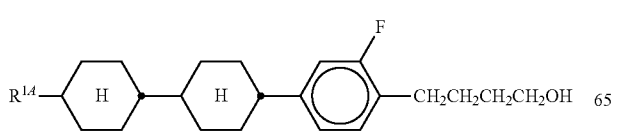
IA-42
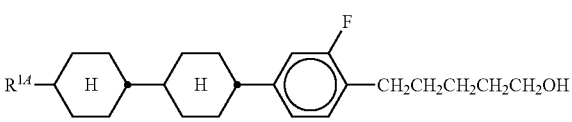
IA-43
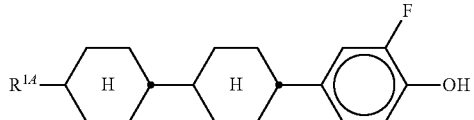
IA-44
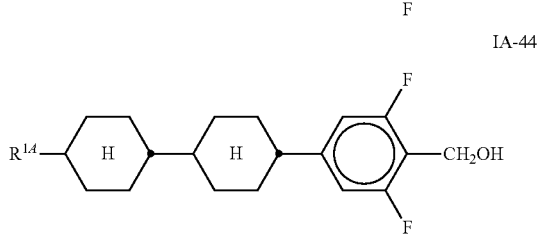
IA-45
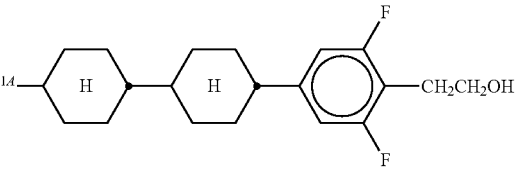
IA-46
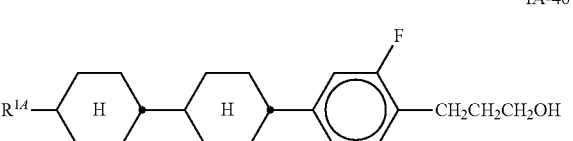
IA-47
IA-48
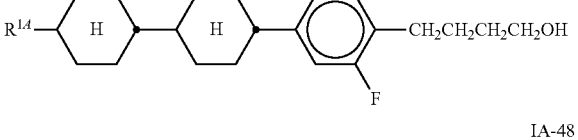
IA-49
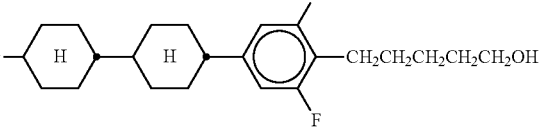
IA-50
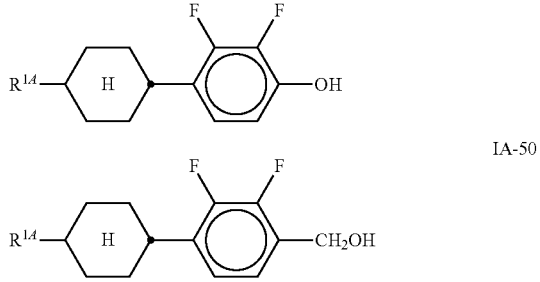

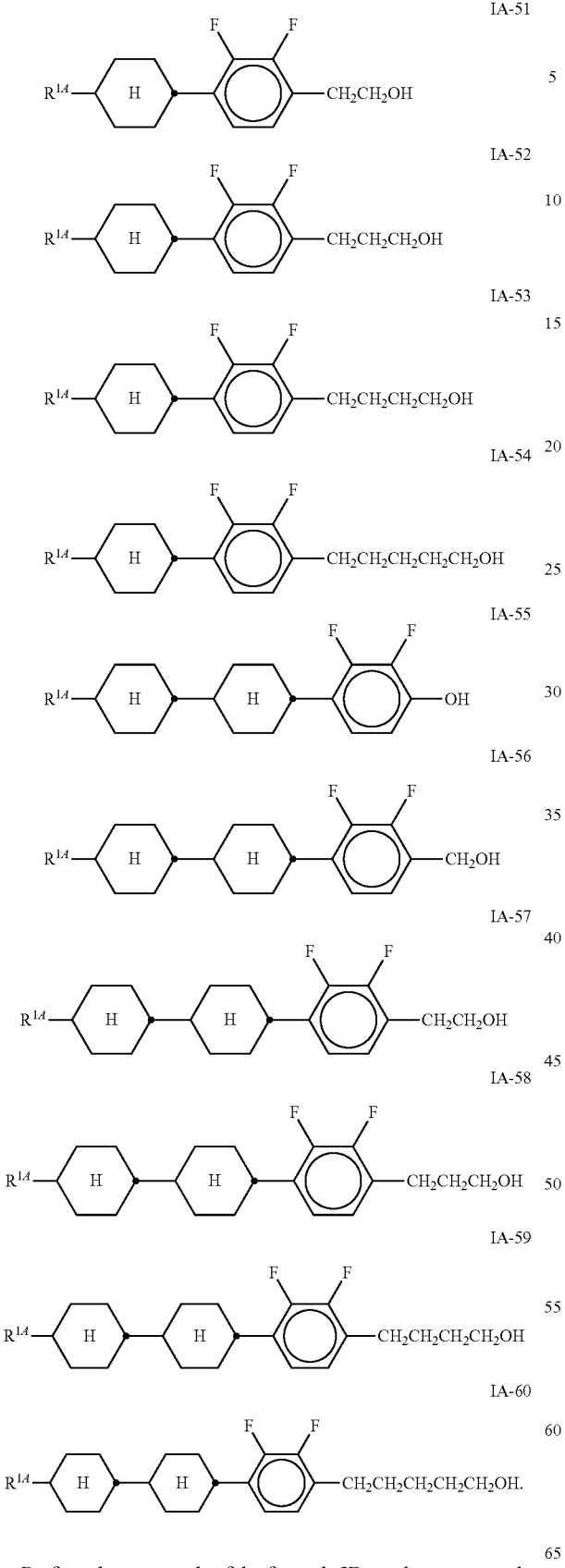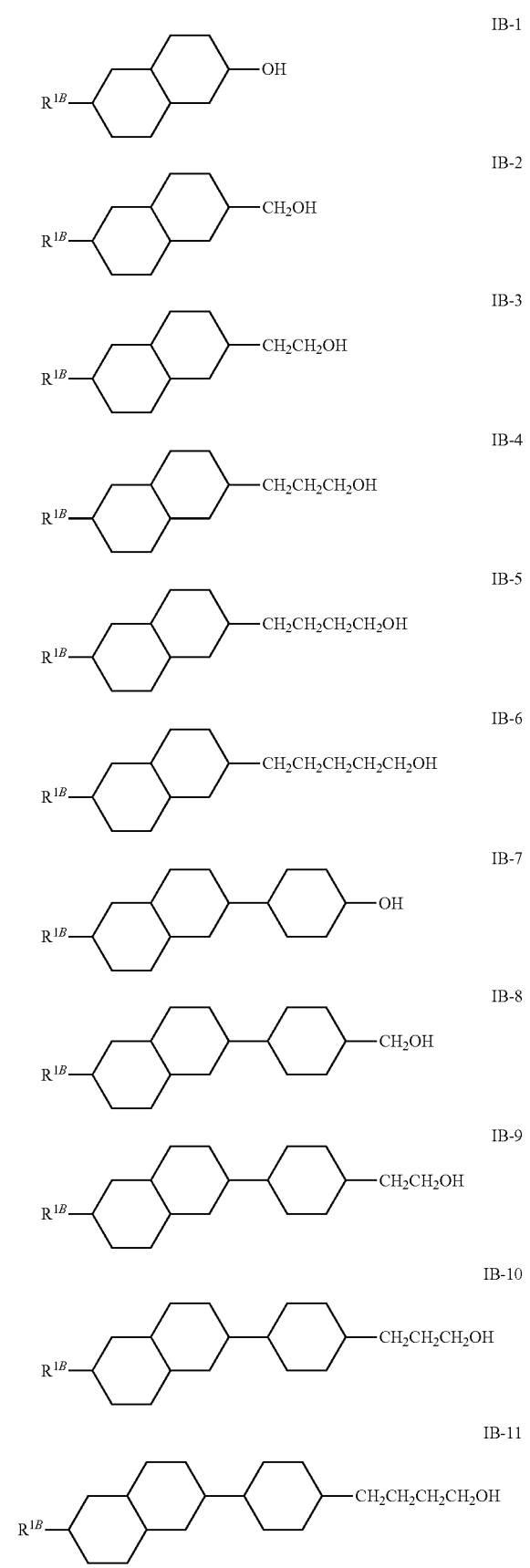
Preferred compounds of the formula IB are the compounds of the sub-formulae IB-1 to IB-18:

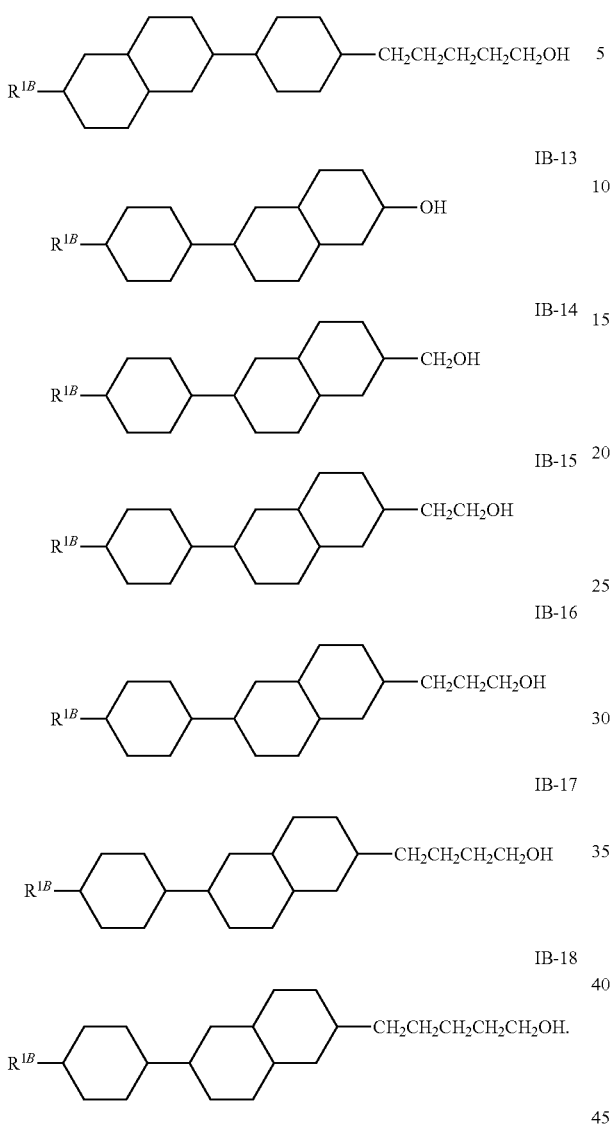
Preferred compounds of the formula IC are the compounds of the sub-formulae IC-1 to IC-96:
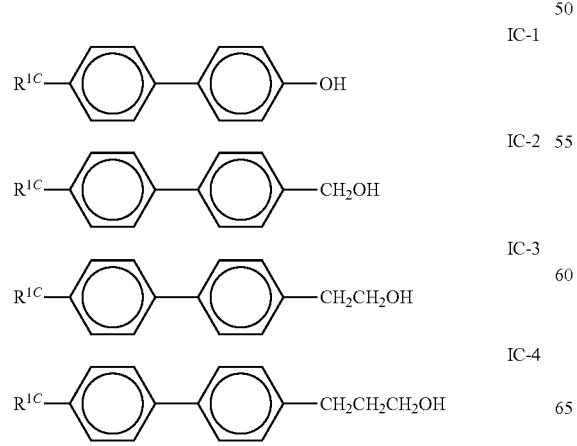
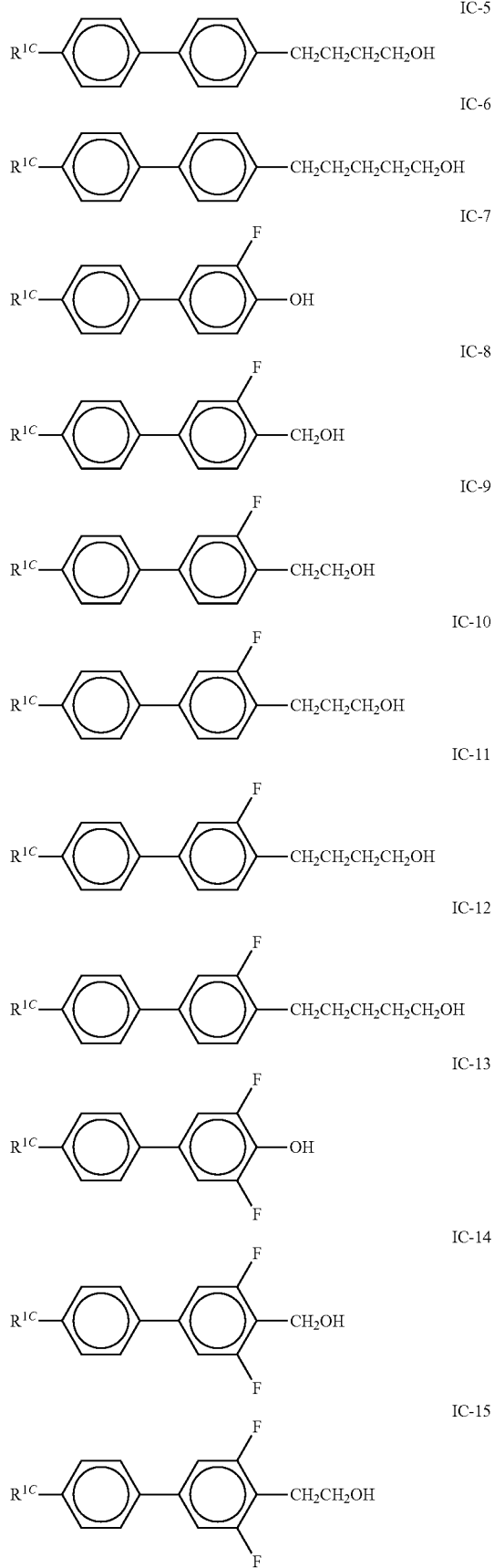

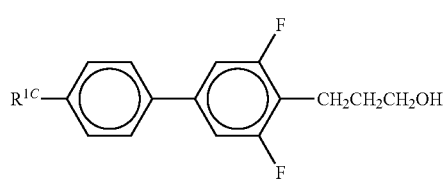
IC-16
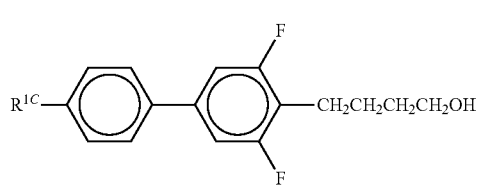
IC-17
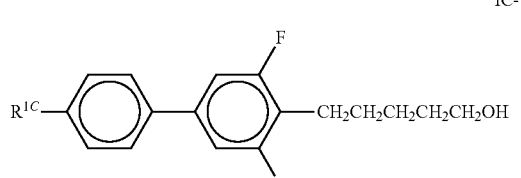
IC-18
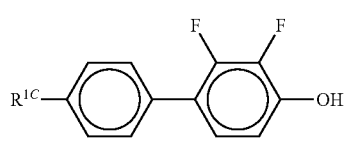
IC-19
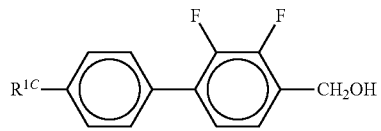
IC-20
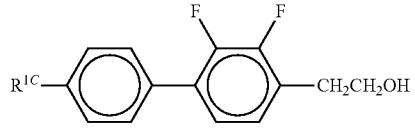
IC-21
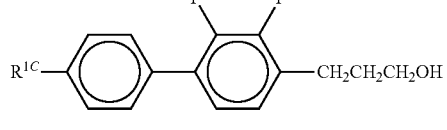
IC-22
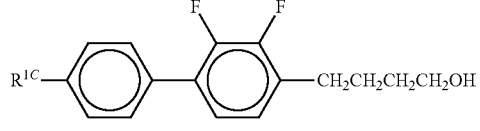
IC-23
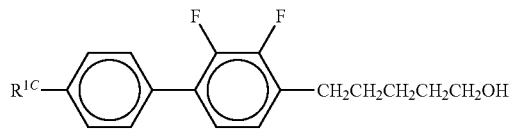
IC-24
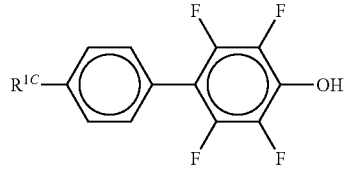
IC-25
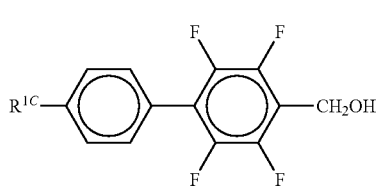
IC-26
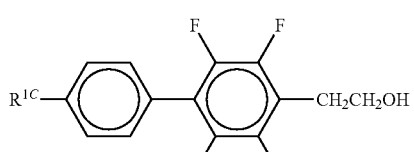
IC-27
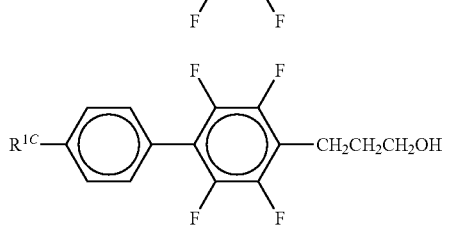
IC-28
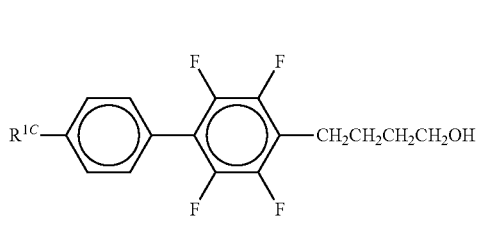
IC-29
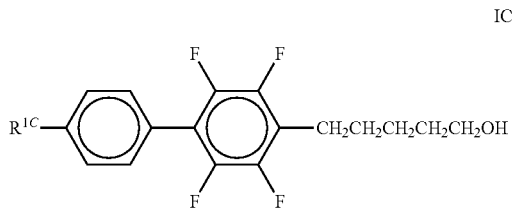
IC-30
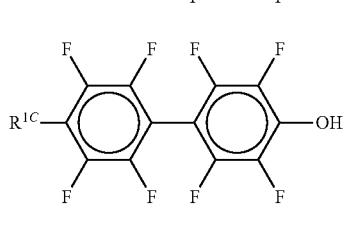
IC-31
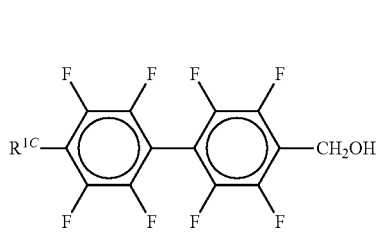
IC-32
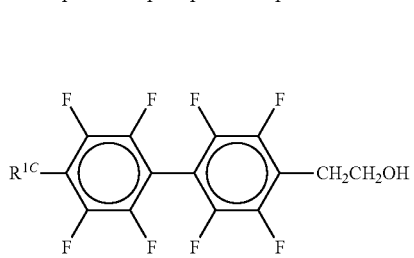
IC-33

IC-34 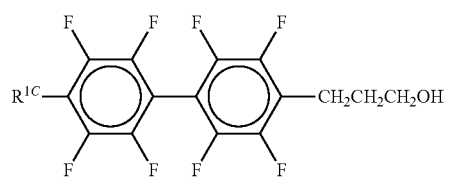
IC-35 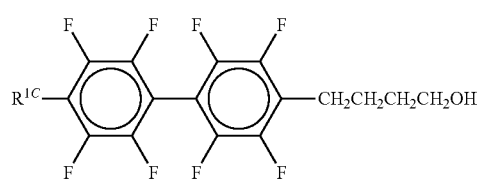
IC-36 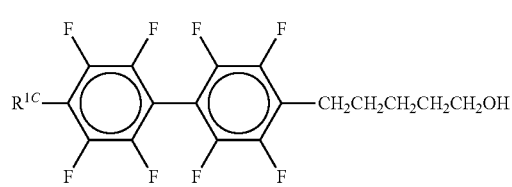
IC-37 
IC-38 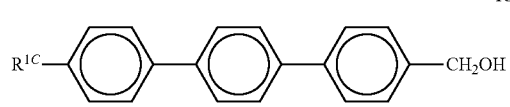
IC-39 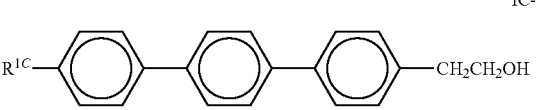
IC-40 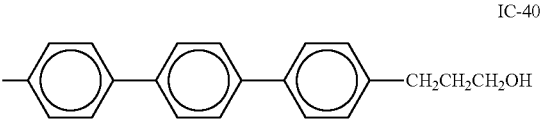
IC-41 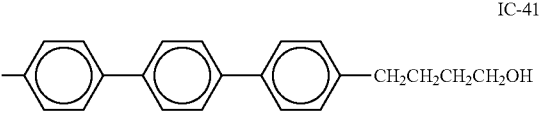
IC-42 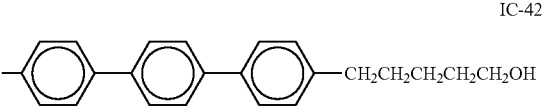
IC-43 
IC-44 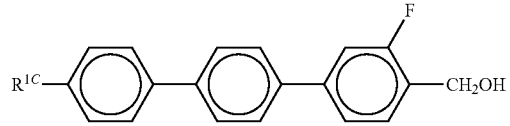
IC-45 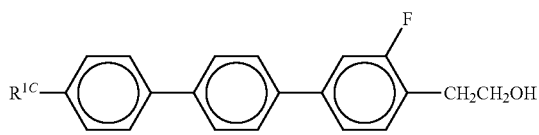
IC-46 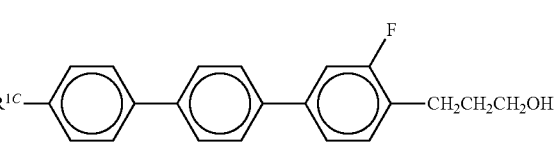
IC-47 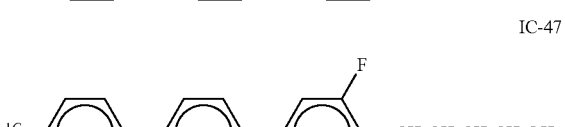
IC-48 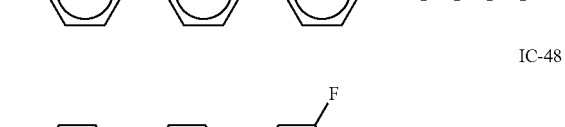
IC-49 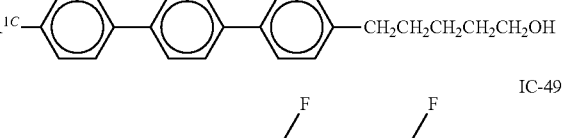
IC-50 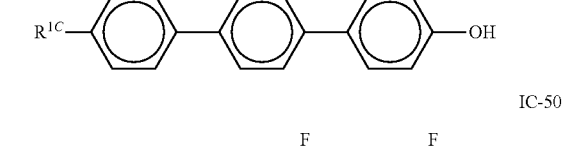
IC-51 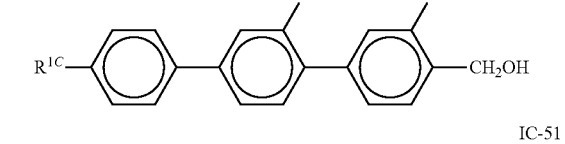
IC-52 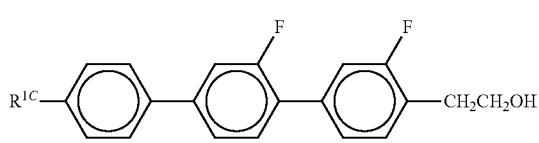
IC-53 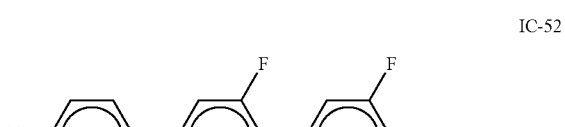
IC-54 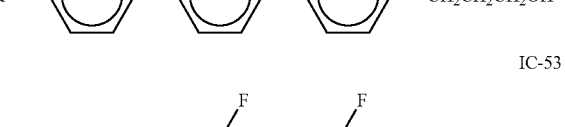
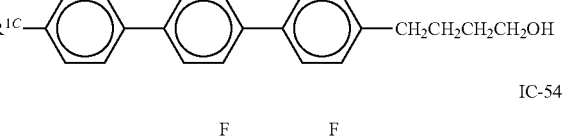

-continued

IC-55: R$^{1C}$—[phenyl]—[phenyl]—[2,3-difluorophenyl]—OH

IC-56: R$^{1C}$—[phenyl]—[phenyl]—[2,3-difluorophenyl]—CH$_2$OH

IC-57: R$^{1C}$—[phenyl]—[phenyl]—[2,3-difluorophenyl]—CH$_2$CH$_2$OH

IC-58: R$^{1C}$—[phenyl]—[phenyl]—[2,3-difluorophenyl]—CH$_2$CH$_2$CH$_2$OH

IC-59: R$^{1C}$—[phenyl]—[phenyl]—[2,3-difluorophenyl]—CH$_2$CH$_2$CH$_2$CH$_2$OH IC-60: R$^{1C}$—[phenyl]—[phenyl]—[2,3-difluorophenyl]—CH$_2$CH$_2$CH$_2$CH$_2$CH$_2$OH IC-61: [3,4,5-trifluorophenyl]—[phenyl]—[phenyl]—OH IC-62: [3,4,5-trifluorophenyl]—[phenyl]—[phenyl]—CH$_2$OH IC-63: [3,4,5-trifluorophenyl]—[phenyl]—[phenyl]—CH$_2$CH$_2$OH IC-64: [3,4,5-trifluorophenyl]—[phenyl]—[phenyl]—CH$_2$CH$_2$OH IC-65: [3,4,5-trifluorophenyl]—[phenyl]—[phenyl]—CH$_2$CH$_2$CH$_2$OH IC-66: [3,4,5-trifluorophenyl]—[phenyl]—[phenyl]—CH$_2$CH$_2$CH$_2$CH$_2$OH IC-67: R$^{1C}$—[phenyl]—[2-methylphenyl]—OH IC-68: R$^{1C}$—[phenyl]—[2-methylphenyl]—CH$_2$OH IC-69: R$^{1C}$—[phenyl]—[2-methylphenyl]—CH$_2$CH$_2$OH IC-70: R$^{1C}$—[phenyl]—[2-methylphenyl]—CH$_2$CH$_2$CH$_2$OH IC-71: R$^{1C}$—[phenyl]—[2-methylphenyl]—CH$_2$CH$_2$CH$_2$CH$_2$OH IC-72: R$^{1C}$—[phenyl]—[2-methylphenyl]—CH$_2$CH$_2$CH$_2$CH$_2$CH$_2$OH IC-73: R$^{1C}$—[phenyl]—[2-ethylphenyl]—OH

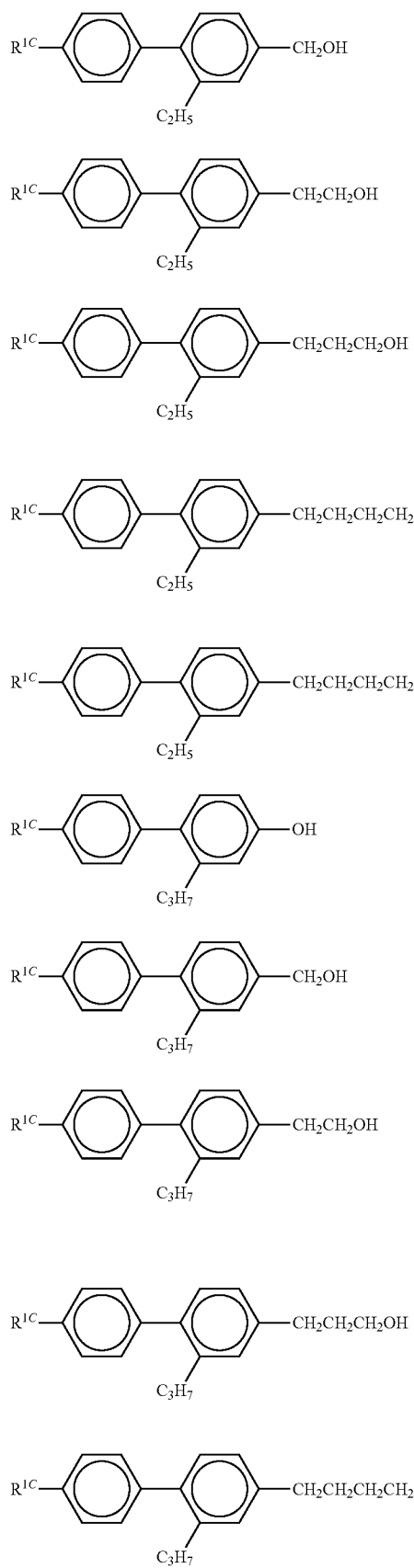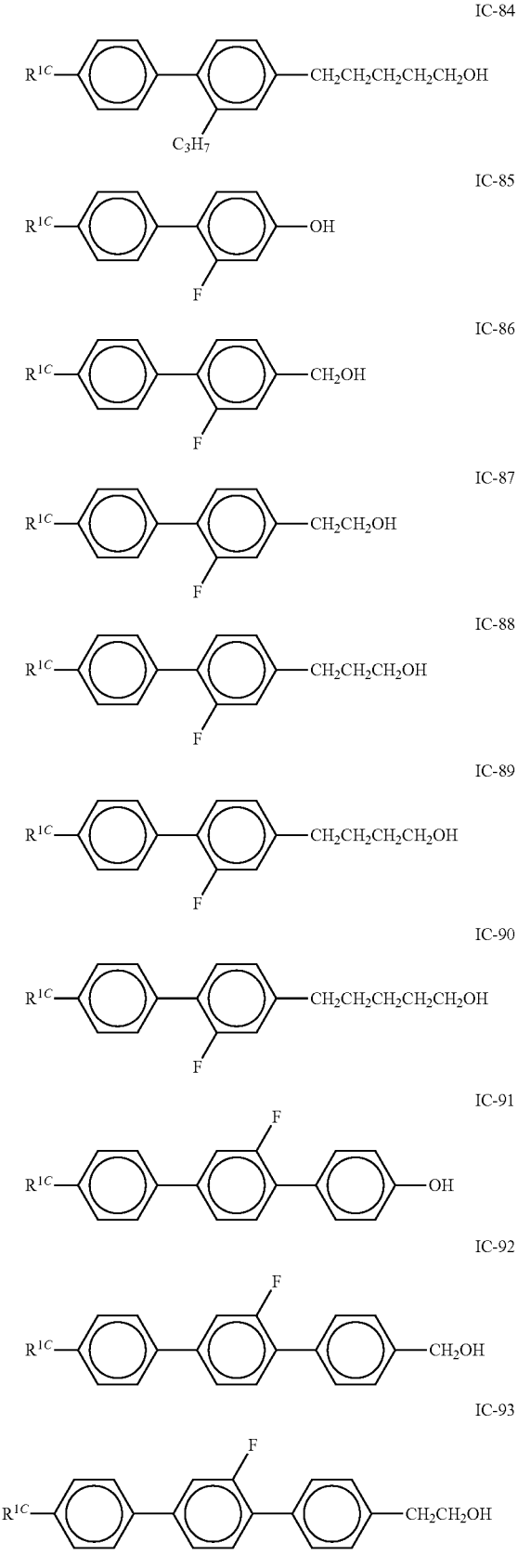

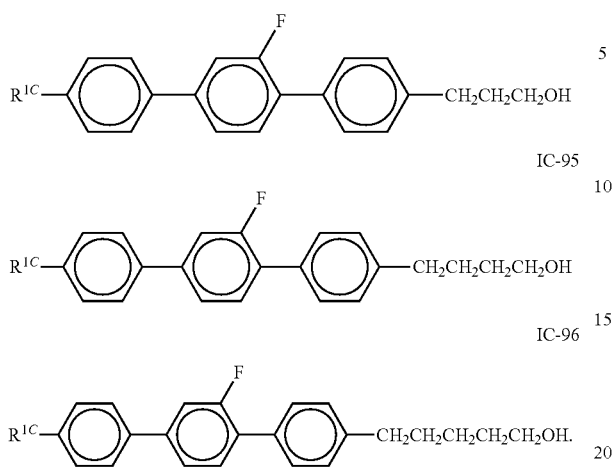
Preferred compounds of the formula ID are the compounds of the sub-formulae ID-1 to ID-18:
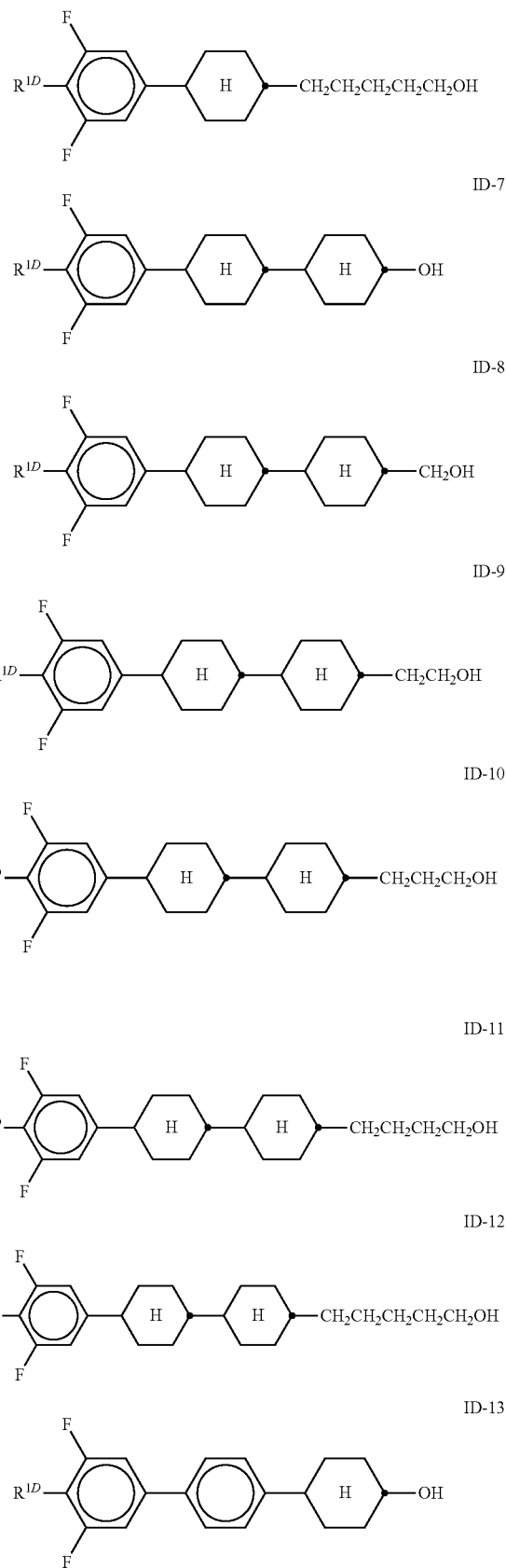

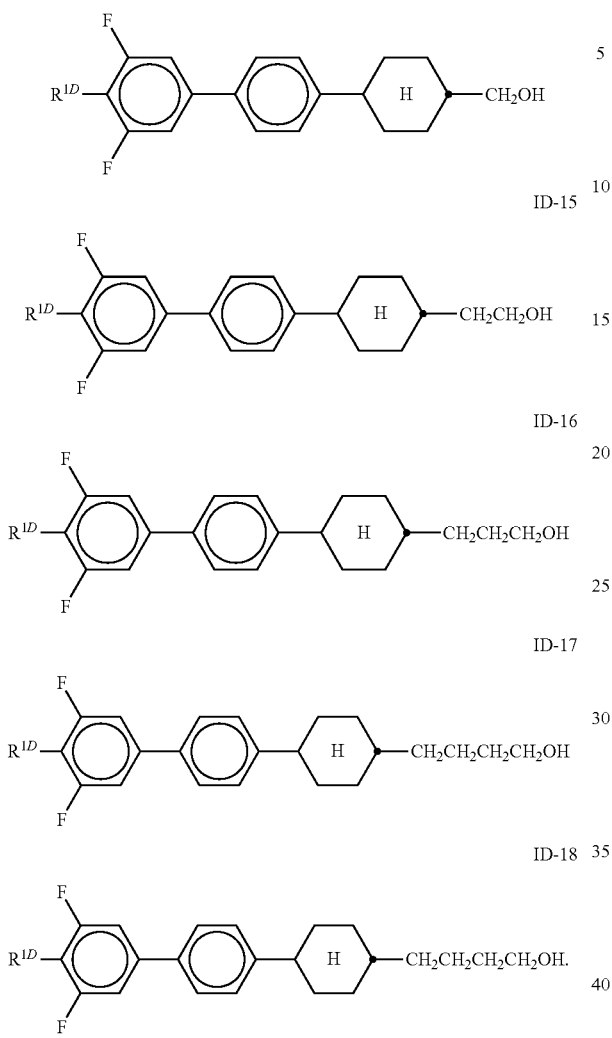

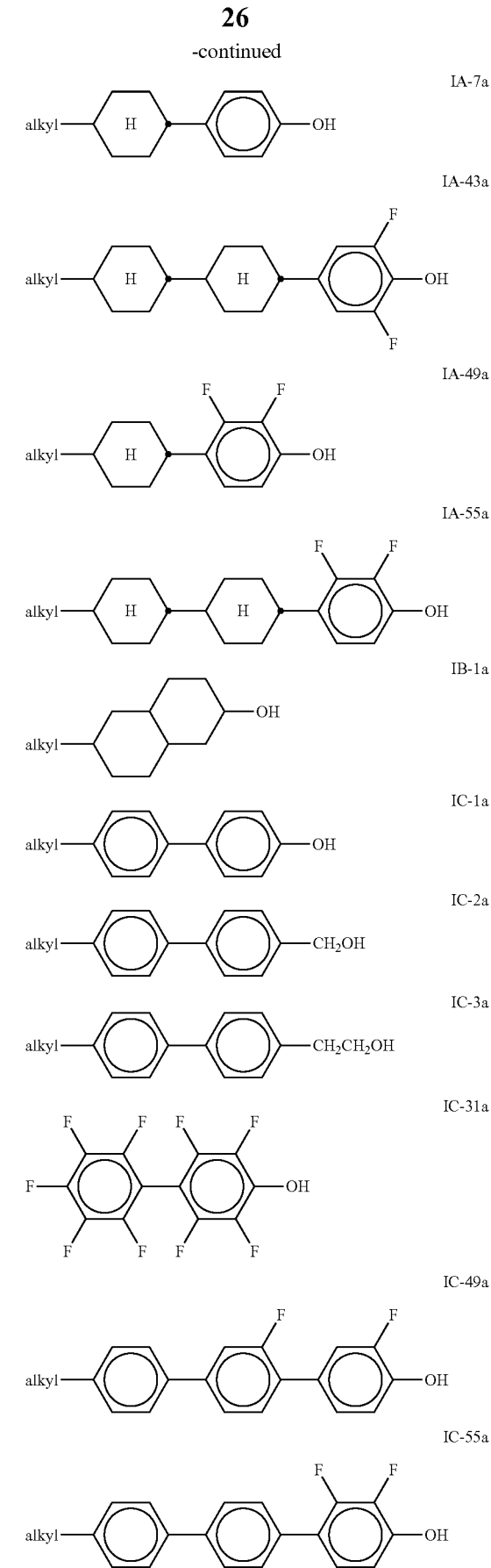

$R^{1A}$, $R^{1B}$ and $R^{1C}$ denote alkyl, alkenyl, alkoxy or alkenyloxy, preferably a straight-chain alkyl radical having 1-6 C atoms. $R^{1A}$ and $R^{1C}$ also denotes in a preferred embodiment halogen, especially preferred F or Cl. Alkyl denotes a straight-chain alkyl radical having 1-6 C atoms.

The mixture according to the invention very particularly contains at least one self-aligning additive selected from the following group of compounds of the sub-formulae -continued

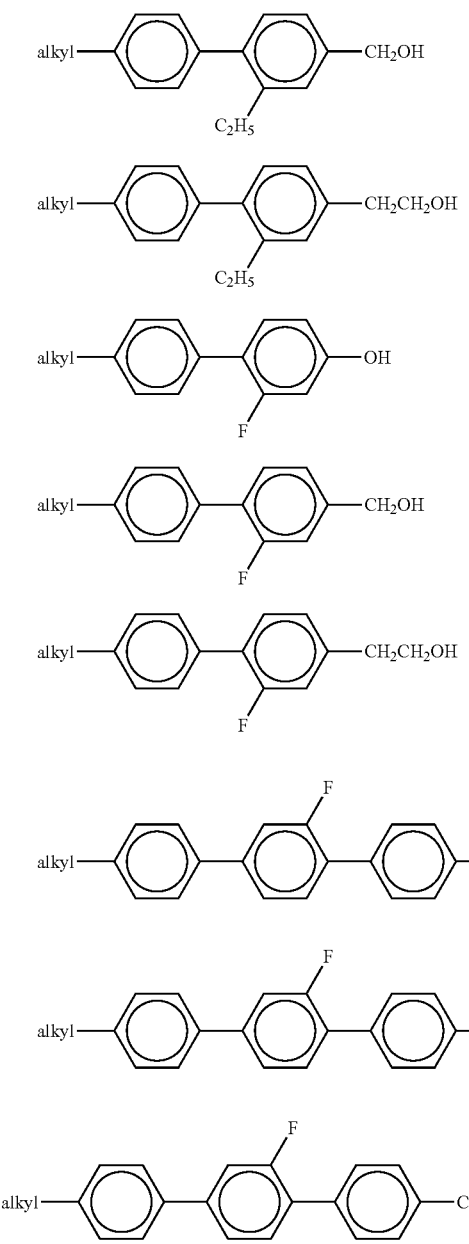

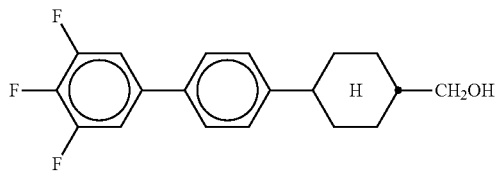

in which
alkyl denotes a straight-chain alkyl radical having 1 to 7 carbon atoms, preferably $C_2H_5$, $n-C_3H_7$, $n-C_4H_9$, $n-C_5H_{11}$, $n-C_6H_{13}$ or $n-C_7H_{15}$; especially preferred alkyl denotes $n-C_3H_7$ or $n-C_5H_{11}$.

The compounds of the formulae IA, IB, IC, ID can be prepared by methods known per se, which are described in standard works for organic chemistry as such, for example, Houben-Weyl, Methoden der organischen Chemie, Thieme-Verlag, Stuttgart.

The compounds of the formula IA and IC can be prepared for example as follows:

Phenols are common intermediates in the synthesis of liquid crystals, e.g. 1 (DE 26 36 684), 2 (WO 92/13928) or 3 (WO 2003 7062286).

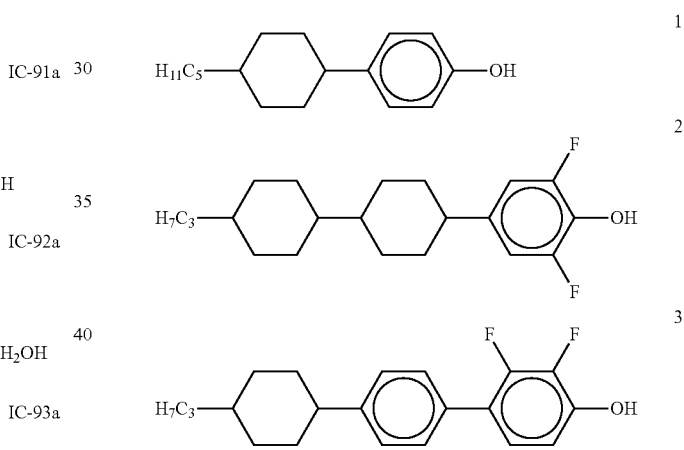

Starting from such phenols a practical way of introducing hydroxyalkyl groups is their conversion into triflates followed by transition metal catalysed reactions as exemplified by phenyl trifluorosulfonate (4) in scheme 1.

Scheme 1

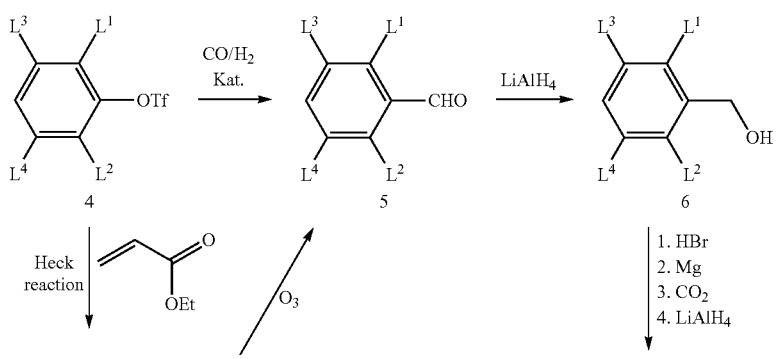

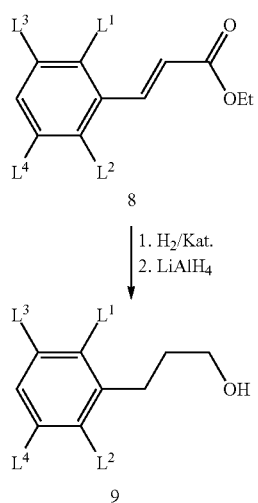

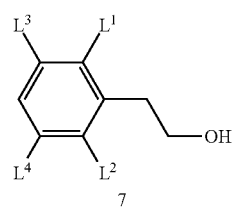

The compounds of the formula IB and ID can be prepared for example as follows:

Cycloaliphatic compounds are accessible from phenols 10 as described in *Chemie Ingenieur Technik* 2002, 74(6), 800-804, scheme 2.

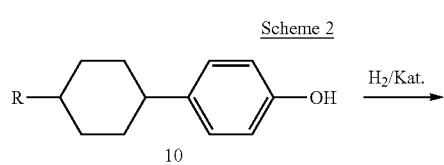

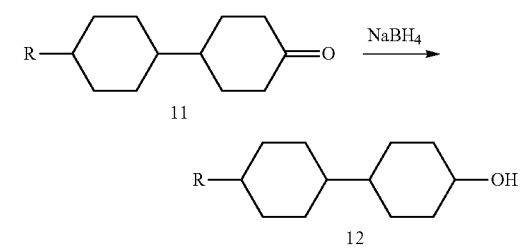

(R has the meanings of $R^{14}$.)

Wittig reaction of the ketones 11 with methoxymethylene-triphenyl-$\lambda^5$-phosphane and subsequent hydrolysis of the enol ethers thus obtained yields the aldehydes 13 which can be converted into alcohols 14.

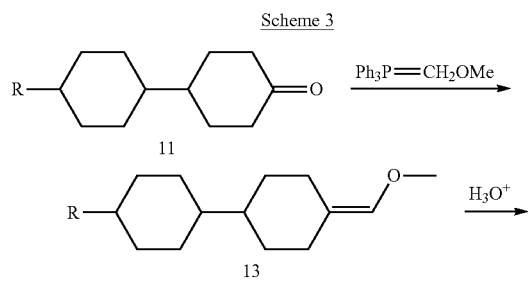

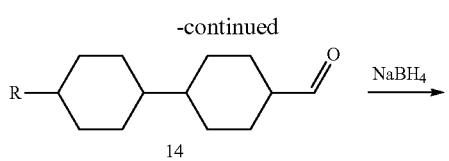

(R has the meanings of $R^{14}$.)

The alcohols 15 are suitable starting materials for a chain elongation as depicted in scheme 4.

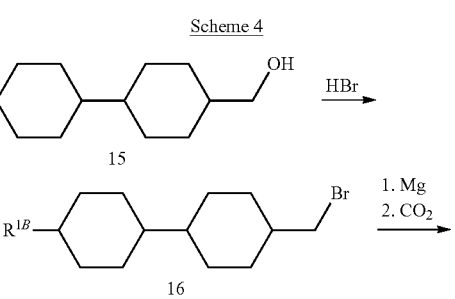

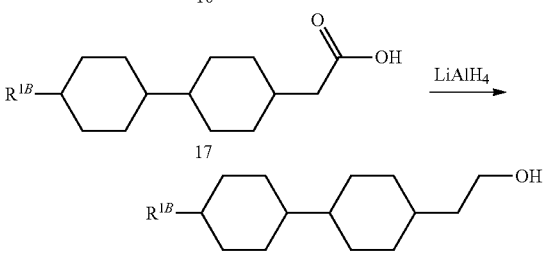

In JP4421060 the synthesis of decaline derivatives from naphthols (19) is disclosed. The alcohols can be derivatised in a similar fashion as described in the above schemes.

Scheme 5

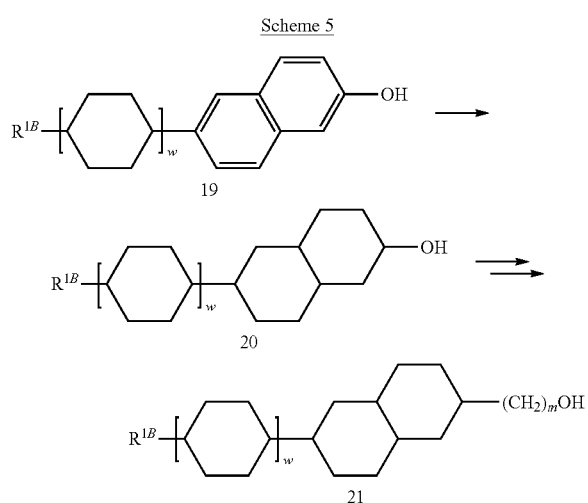

Analogously, reduction of ketone 22 (cf. JP 2001-039902) yields the cyclohexanol derivative 23.

Scheme 6

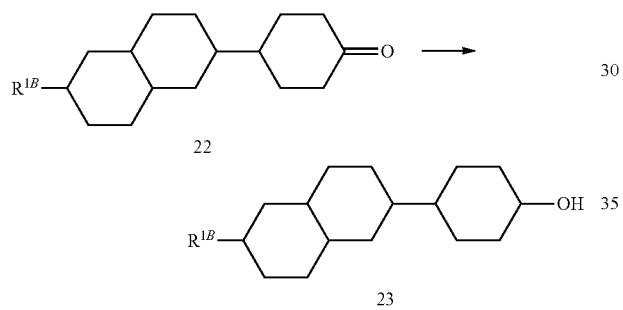

Key precursors for the synthesis of compounds ID are monoketals 24 and 25.

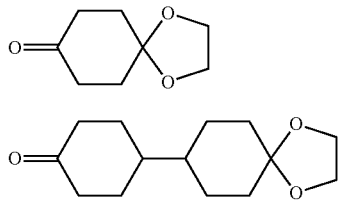

The ketals can be converted e.g. by aryl grignard addition followed by dehydration and subsequent hydrogenation (scheme 7). Deprotection gives the ketones 29.

Scheme 7

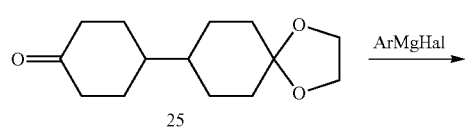

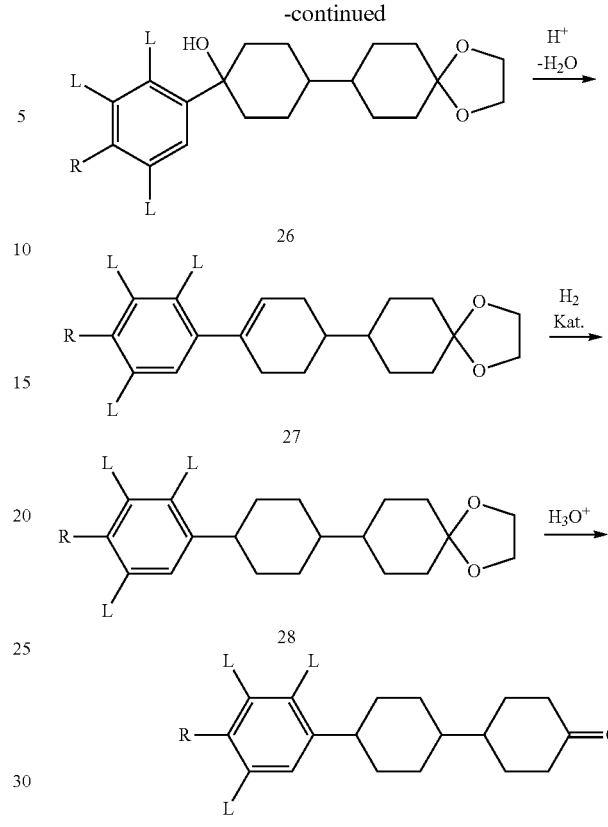

R has the meanings of $R^{1D}$ and L has the meanings of $L^{1-3}$.

The same reaction sequence can be applied to cyclohexanedionmonoketal 24. The ketones can then be converted into alcohols as described above.

Scheme 8

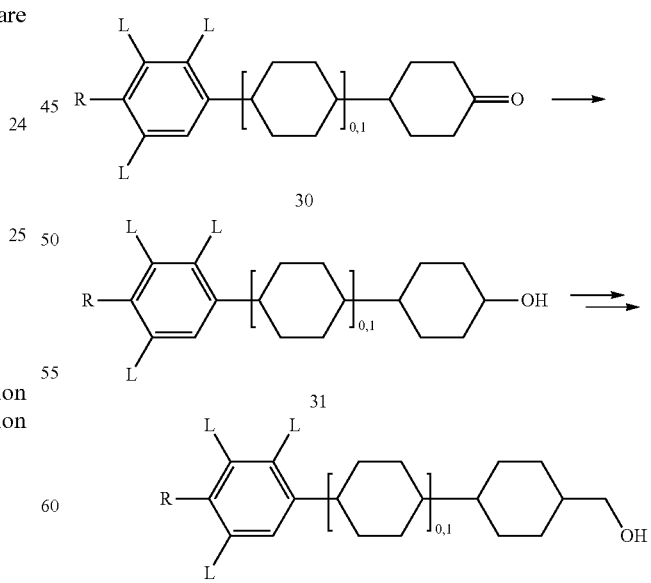

R has the meanings of $R^{1D}$ and L has the meanings of $L^{1-3}$.

The media according to the invention preferably contain one, two, three, four or more, preferably one, self-aligning additive, preferably selected from the compounds of the formulae IA, IB, IC and ID.

The self-aligning additives of the formula IA, IB, IC and/or ID are preferably employed in the liquid-crystalline medium in amounts of ≥0.01% by weight, preferably ≥1% by weight, based on the mixture as a whole. Particular preference is given to liquid-crystalline media which contain 0.01-5%, preferably 0.1-3%, by weight of one or more self-aligning additives, based on the total mixture, especially additives which are selected from the group of compounds of the formula IA, IB, IC and ID.

Preferred embodiments of the liquid-crystalline medium according to the invention are indicated below:

a) Liquid-crystalline medium which additionally comprises one or more compounds selected from the group of the compounds of the formulae IIA, IIB and IIC:

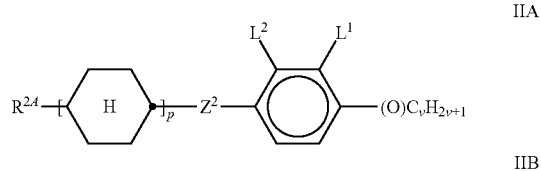

IIA

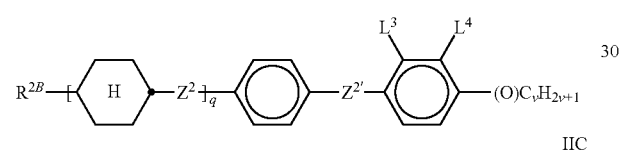

IIB

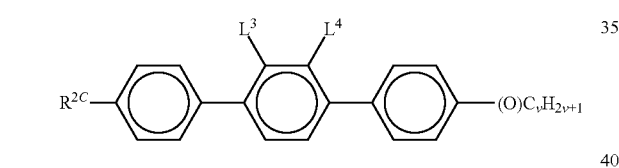

IIC in which
$R^{2A}$, $R^{2B}$ and $R^{2C}$ each, independently of one another, denote H, an alkyl radical having up to 15 C atoms which is unsubstituted, monosubstituted by CN or $CF_3$ or at least monosubstituted by halogen, where, in addition, one or more $CH_2$ groups in these radicals may be replaced by —O—, —S—,

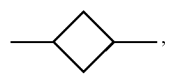

—C≡C—, —$CF_2$O—, —O$CF_2$—, —OC—O— or —O—CO— in such a way that O atoms are not linked directly to one another, $L^{1-4}$ each, independently of one another, denote F, Cl, $CF_3$ or $CHF_2$, $Z^2$ and $Z^{2'}$ each, independently of one another, denote a single bond, —$CH_2CH_2$—, —CH=CH—, —$CF_2$O—, —O$CF_2$—, —$CH_2$O—, —O$CH_2$—, —COO—, —OCO—, —$C_2F_4$—, —CF=CF—, —CH=CHCH$_2$O—, p denotes 1 or 2,
q denotes 0 or 1, and
v denotes 1 to 6.

In the compounds of the formulae IIA and IIB, $Z^2$ may have identical or different meanings. In the compounds of the formula IIB, $Z^2$ and $Z^{2'}$ may have identical or different meanings.

In the compounds of the formulae IIA, IIB and IIC, $R^{2A}$, $R^{2B}$ and $R^{2C}$ each preferably denote alkyl having 1-6 C atoms, in particular $CH_3$, $C_2H_5$, n-$C_3H_7$, n-$C_4H_9$, n-$C_5H_{11}$.

In the compounds of the formulae IIA and IIB, $L^1$, $L^2$, $L^3$ and $L^4$ preferably denote $L^1$=$L^2$=F and $L^3$=$L^4$=F, furthermore $L^1$=F and $L^2$=Cl, $L^1$=Cl and $L^2$=F, $L^3$=F and $L^4$=Cl, $L^3$=Cl and $L^4$=F. $Z^2$ and $Z^{2'}$ in the formulae IIA and IIB preferably each, independently of one another, denote a single bond, furthermore a —$C_2H_4$— bridge. If in the formula IIB $Z^2$=—$C_2H_4$—, $Z^{2'}$ is preferably a single bond or, if $Z^{2'}$=—$C_2H_4$—, $Z^2$ is preferably a single bond. In the compounds of the formulae IIA and IIB, (O)$C_vH_{2v+1}$ preferably denotes O$C_vH_{2v+1}$, furthermore $C_vH_{2v+1}$. In the compounds of the formula IIC, (O)$C_vH_{2v+1}$ preferably denotes $C_vH_{2v+1}$. In the compounds of the formula IIC, $L^3$ and $L^4$ preferably each denote F.

Preferred compounds of the formulae IIA, IIB and IIC are indicated below:

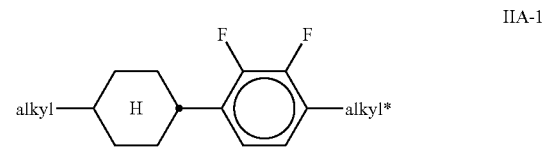

IIA-1

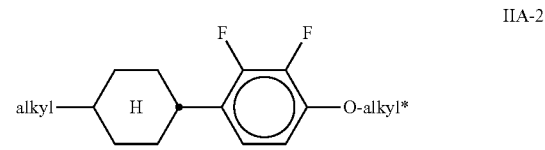

IIA-2

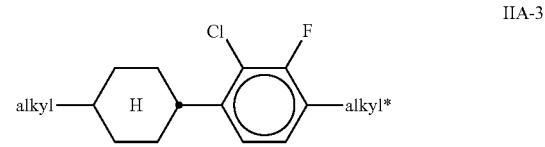

IIA-3

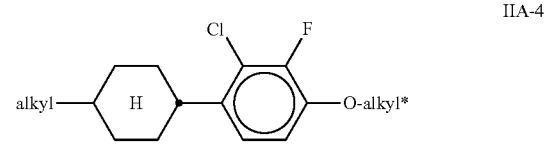

IIA-4

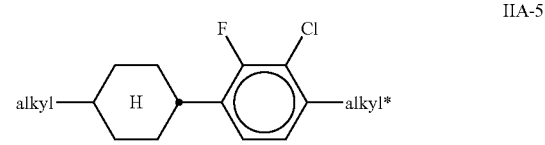

IIA-5

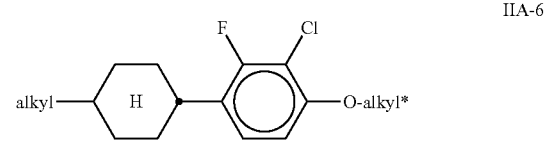

IIA-6

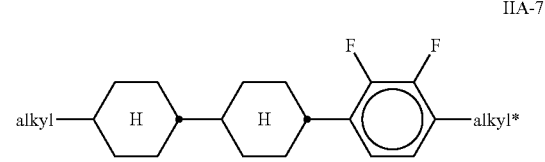

IIA-7

-continued
IIA-8
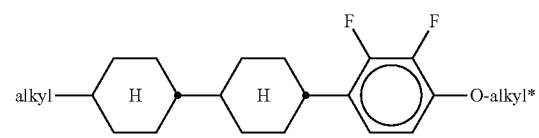
IIA-9
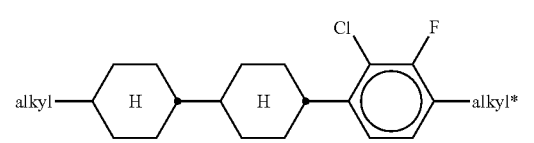
IIA-10
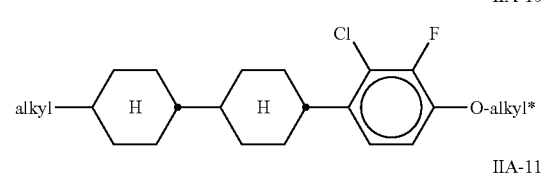
IIA-11
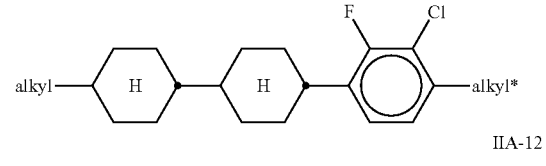
IIA-12
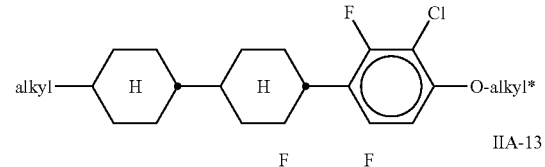
IIA-13
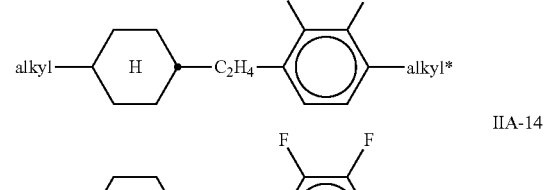
IIA-14
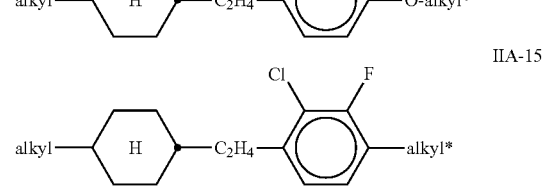
IIA-15
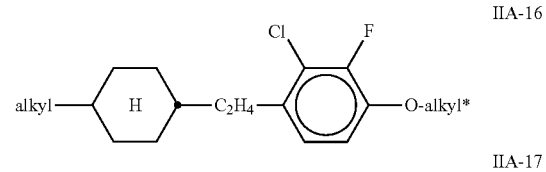
IIA-16
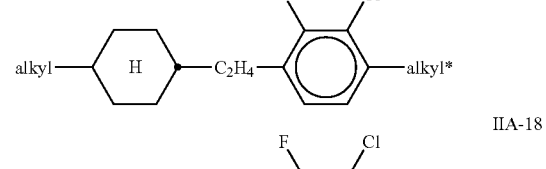
IIA-17
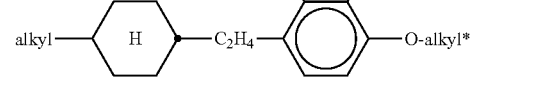
IIA-18
-continued
IIA-19
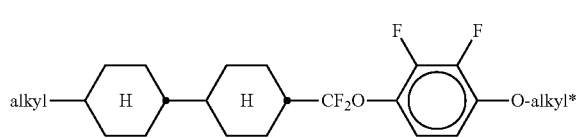
IIA-20
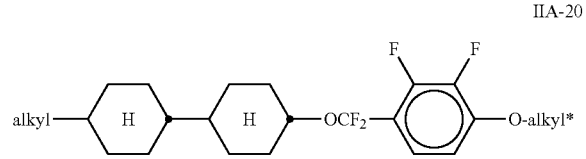
IIA-21
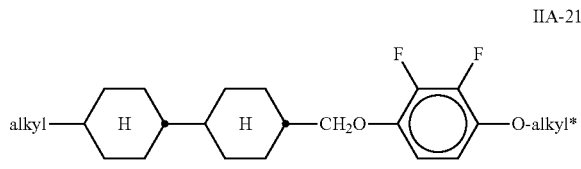
IIA-22
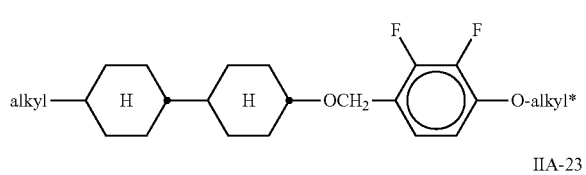
IIA-23
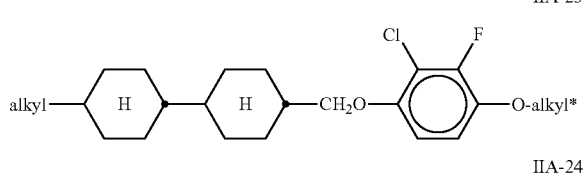
IIA-24
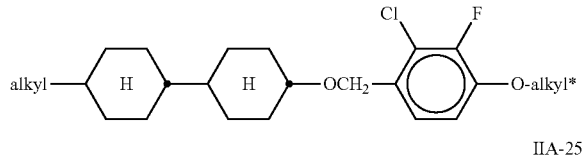
IIA-25
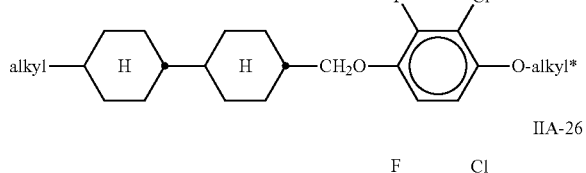
IIA-26
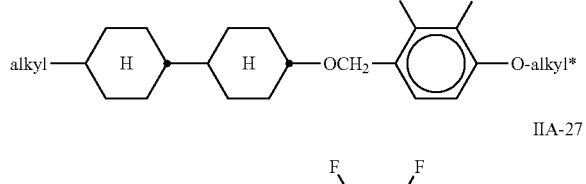
IIA-27
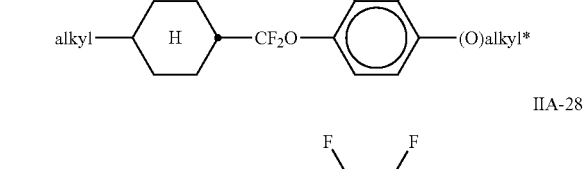
IIA-28
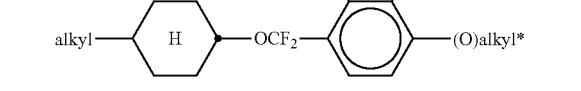

IIA-29
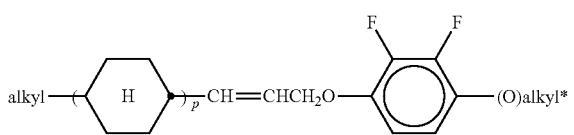
IIA-30
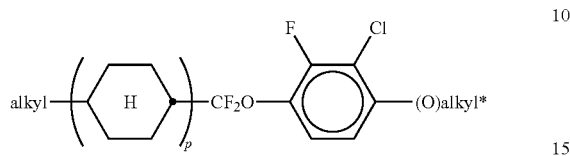
IIA-31
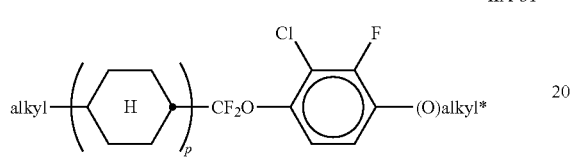
IIA-32
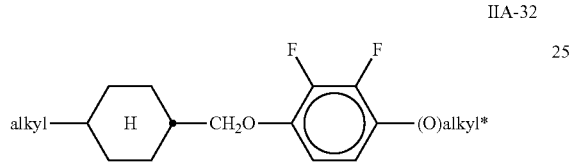
IIA-33
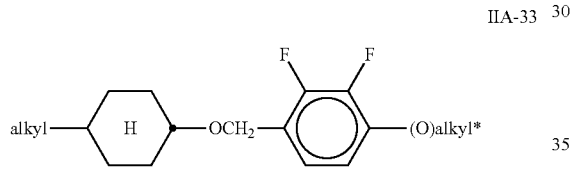
IIA-34
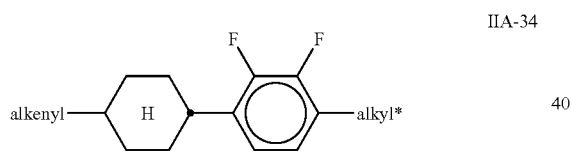
IIA-35
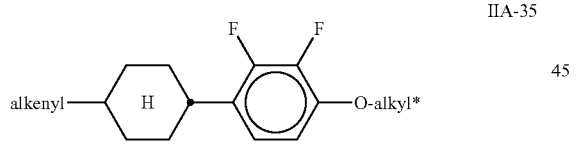
IIA-36
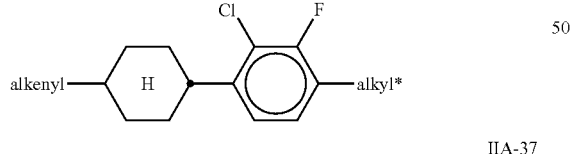
IIA-37
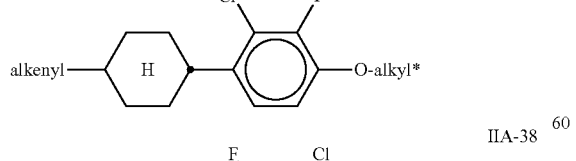
IIA-38
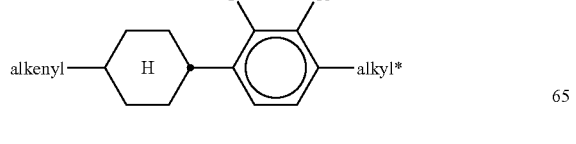
IIA-39
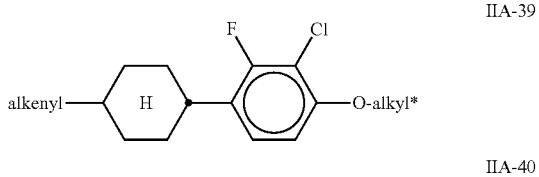
IIA-40
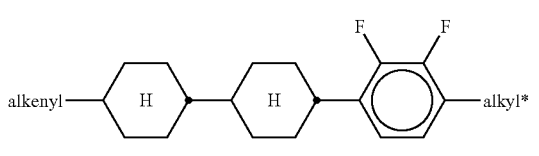
IIA-41
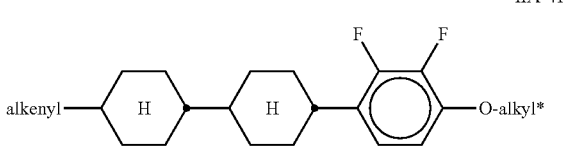
IIA-42
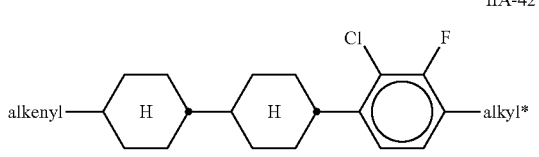
IIA-43
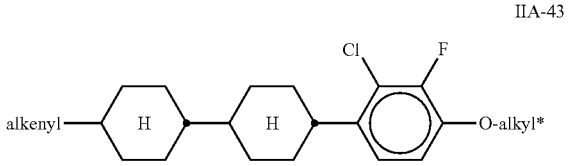
IIA-44
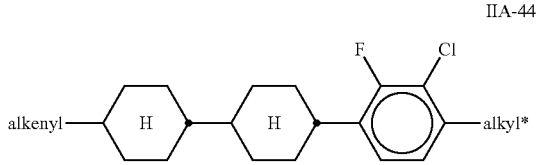
IIA-45
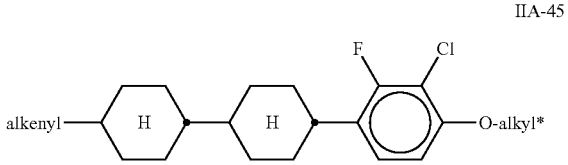
IIA-46
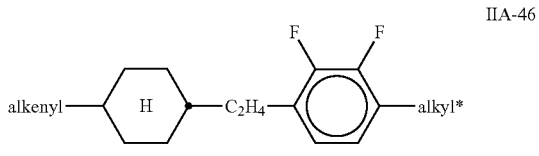
IIA-47
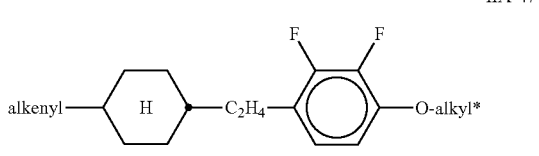
IIA-48
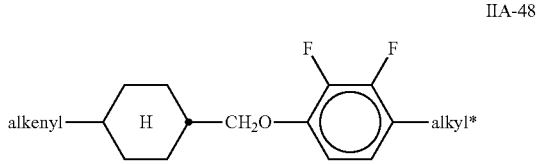

IIA-49
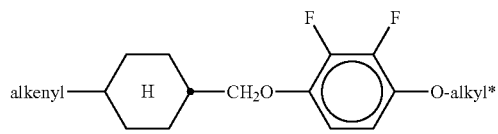
IIA-50
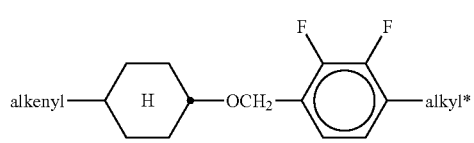
IIA-51
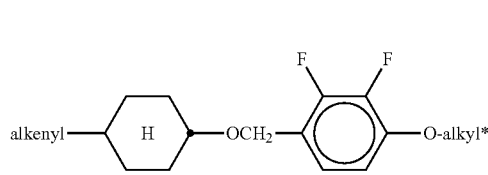
IIA-52
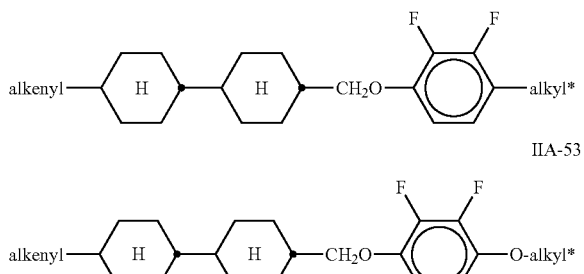
IIA-53
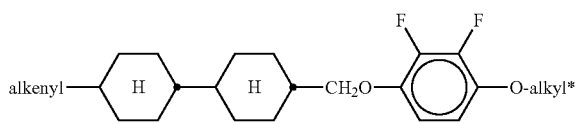
IIA-54
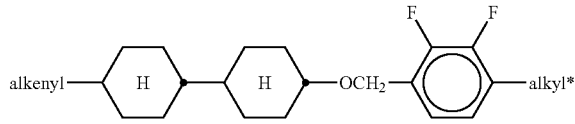
IIA-55
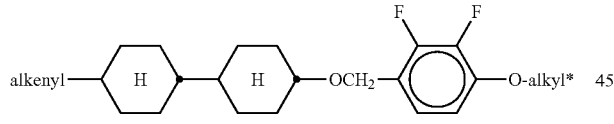
IIA-56
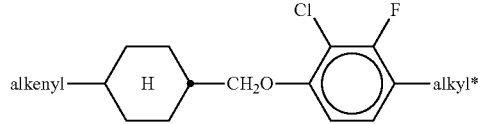
IIA-57
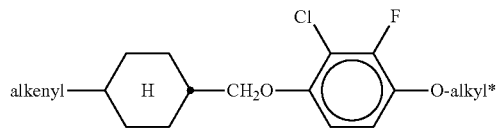
IIA-58
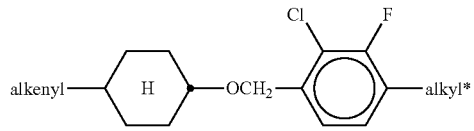
IIA-59
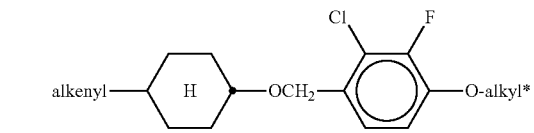
IIA-60
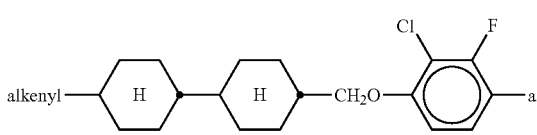
IIA-61
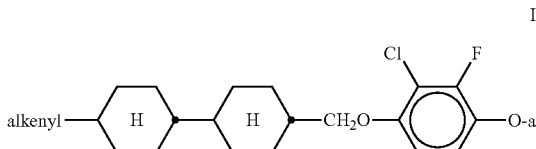
IIA-62
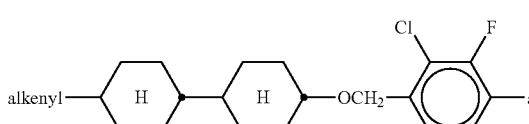
IIA-63
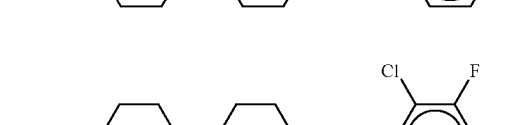
IIA-64
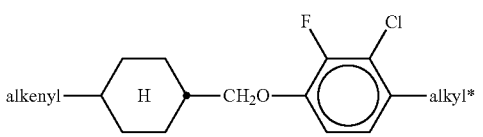
IIA-65
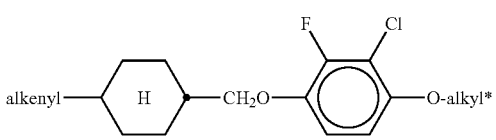
IIA-66
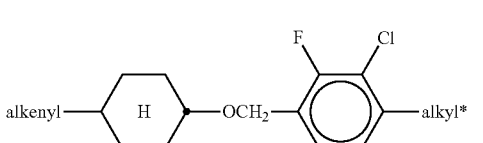
IIA-67
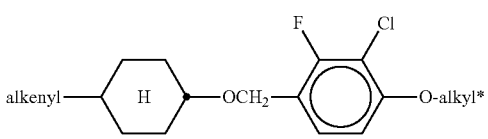
IIA-68
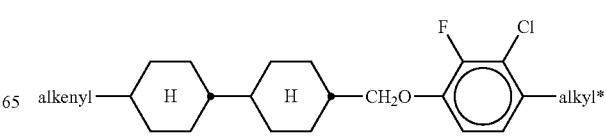

IIA-69
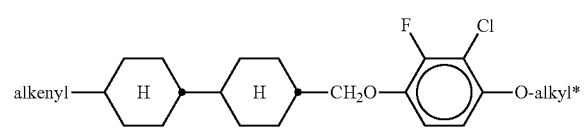
IIA-70
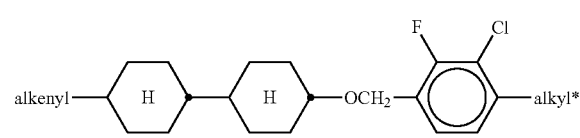
IIA-71
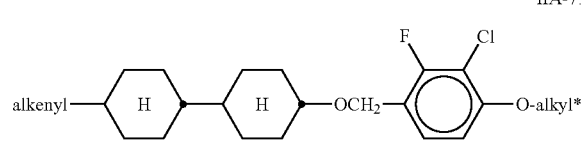
IIB-1
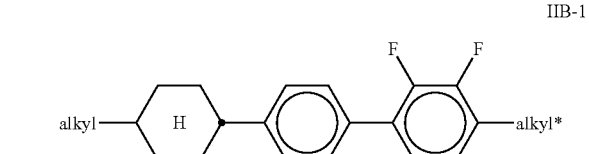
IIB-2
IIB-3
IIB-4
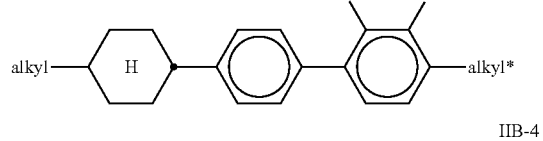
IIB-5
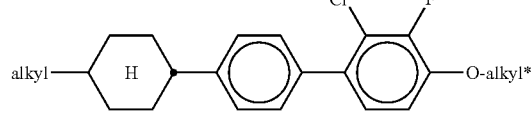
IIB-6
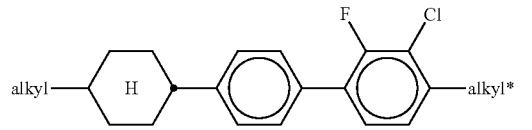
IIB-7
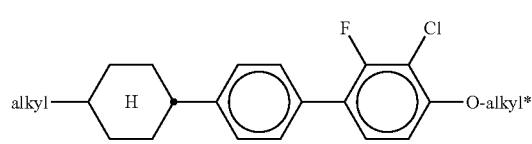
IIB-8
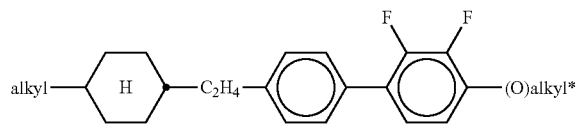
IIB-9
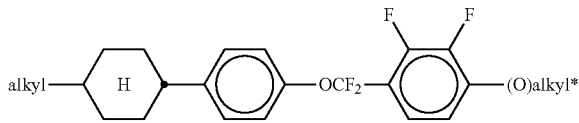
IIB-10
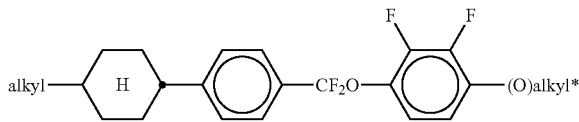
IIB-11
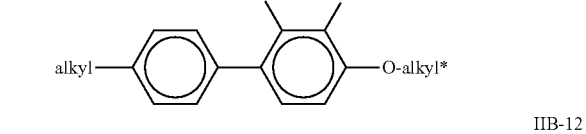
IIB-12
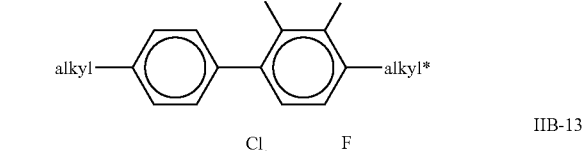
IIB-13
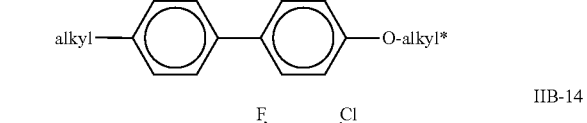
IIB-14
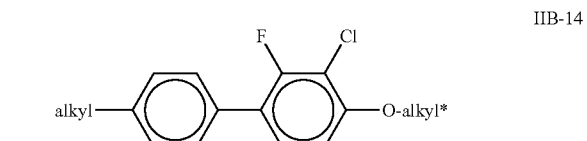
IIB-15
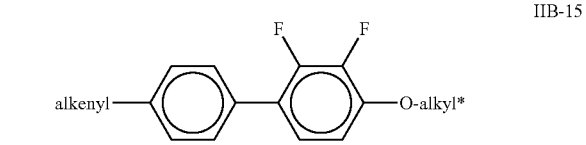
IIB-16
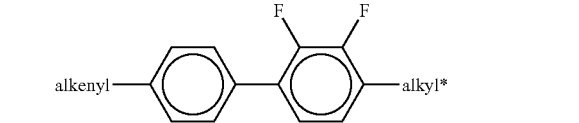
IIB-17
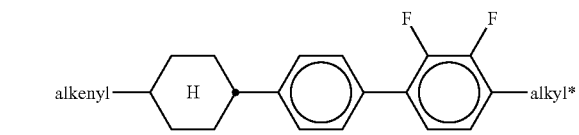
IIB-18
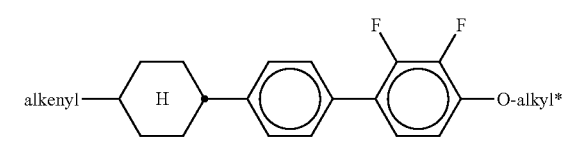

IIC-1

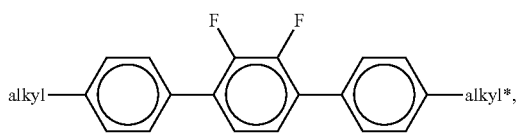

in which alkyl and alkyl* each, independently of one another, denote a straight-chain alkyl radical having 1-6 C atoms.

Particularly preferred mixtures according to the invention comprise one or more compounds of the formulae IIA-2, IIA-8, IIA-14, IIA-29, IIA-35, IIB-2, IIB-11, IIB-16 and IIC-1.

The proportion of compounds of the formulae IIA and/or IIB in the mixture as a whole is preferably at least 20% by weight.

Particularly preferred media according to the invention comprise at least one compound of the formula IIC-1,

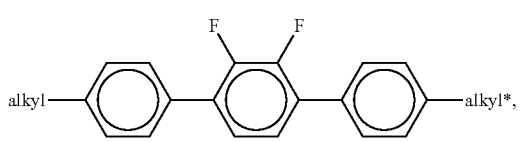

in which alkyl and alkyl* have the meanings indicated above, preferably in amounts of >3% by weight, in particular >5% by weight and particularly preferably 5-25% by weight.

b) Liquid-crystalline medium which additionally comprises one or more compounds of the formula III,

III

R$^{31}$—[H]—Z$^3$—[A]—R$^{32}$ in which

R$^{31}$ and R$^{32}$ each, independently of one another, denote a straight-chain alkyl, alkoxyalkyl or alkoxy radical having up to 12 C atoms, and

—[A]— denotes

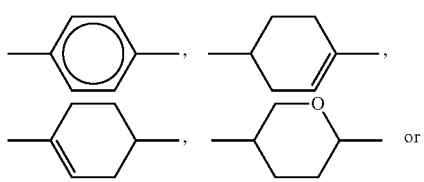 or $Z^3$ denotes a single bond, —CH$_2$CH$_2$—, —CH=CH—, —CF$_2$O—, —OCF$_2$—, —CH$_2$O—, —OCH$_2$—, —COO—, —OCO—, —C$_2$F$_4$—, —C$_4$H$_8$—, —CF=CF—.

Preferred compounds of the formula III are indicated below:

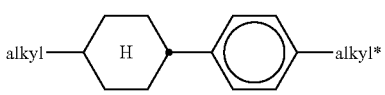

IIIa

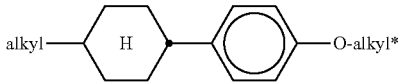

IIIb

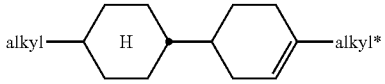

IIIc

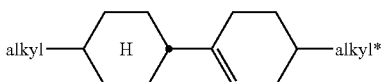

IIId in which
alkyl and
alkyl* each, independently of one another, denote a straight-chain alkyl radical having 1-6 C atoms.

The medium according to the invention preferably comprises at least one compound of the formula IIIa and/or formula IIIb.

The proportion of compounds of the formula III in the mixture as a whole is preferably at least 5% by weight.

c) Liquid-crystalline medium additionally comprising a compound of the formula

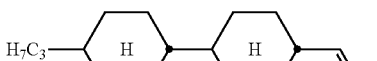 and/or

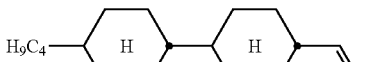 and/or

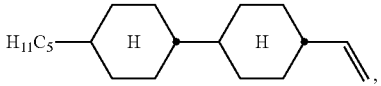, preferably in total amounts of 5% by weight, in particular 10% by weight.

Preference is furthermore given to mixtures according to the invention comprising the compound

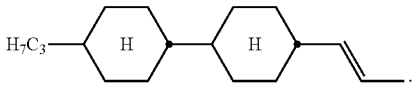.

d) Liquid-crystalline medium which additionally comprises one or more tetracyclic compounds of the formulae

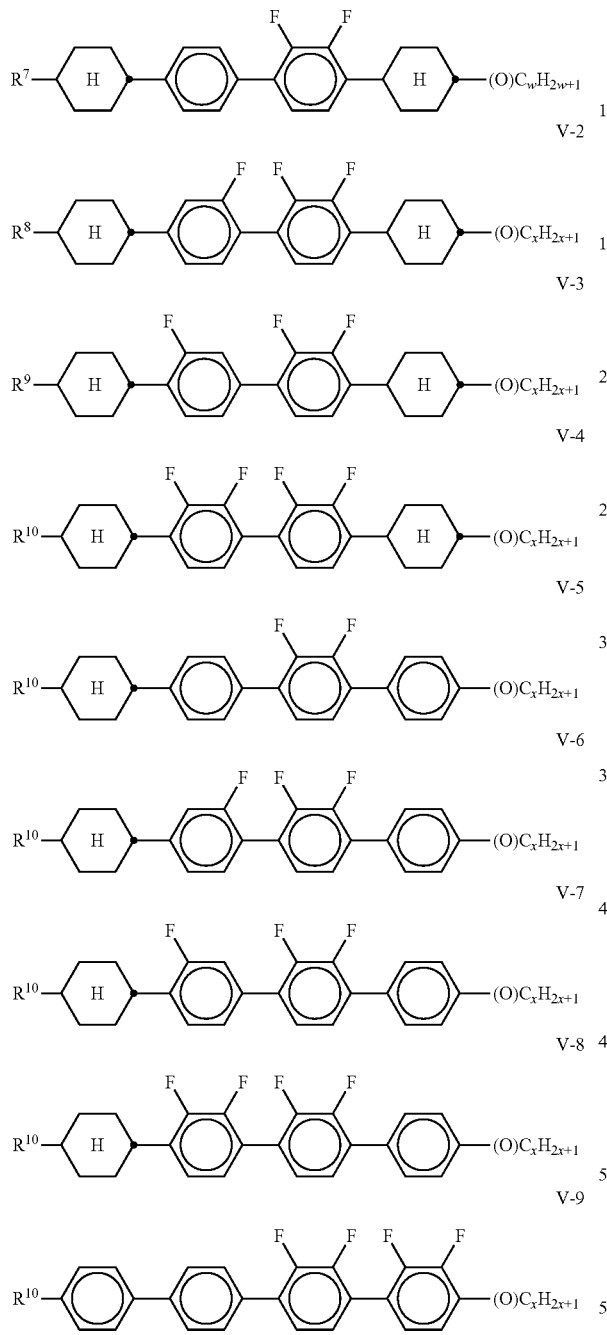

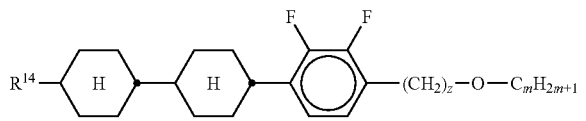

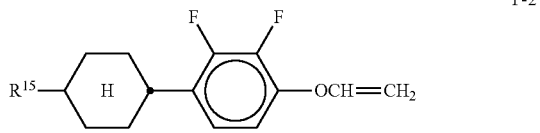

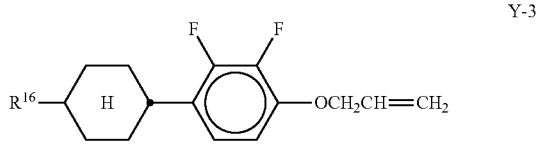

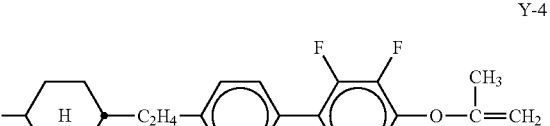

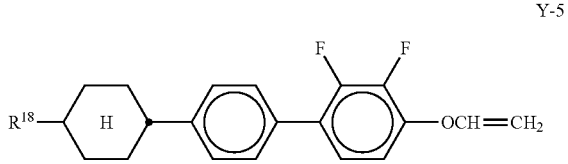

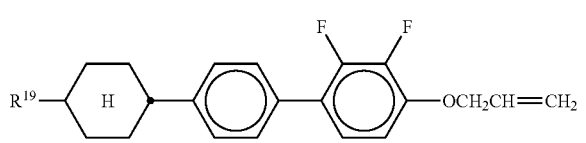

in which
- $R^{7-10}$ each, independently of one another, have one of the meanings indicated for $R^{2A}$, and
- w and x each, independently of one another, denote 1 to 6.

Particular preference is given to mixtures comprising at least one compound of the formula V-9.

e) Liquid-crystalline medium which additionally comprises one or more compounds of the formulae Y-1 to Y-6, in which $R^{14}$-$R^{19}$ each, independently of one another, denote an alkyl or alkoxy radical having 1-6 C atoms; z and m each, independently of one another, denote 1-6; x denotes 0, 1, 2 or 3.

The medium according to the invention particularly preferably comprises one or more compounds of the formulae Y-1 to Y-6, preferably in amounts of ≥5% by weight.

f) Liquid-crystalline medium additionally comprising one or more fluorinated terphenyls of the formulae T-1 to T-21,

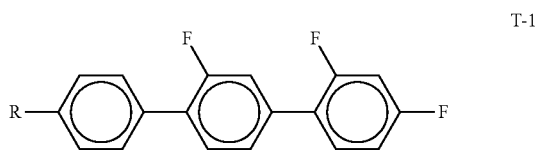

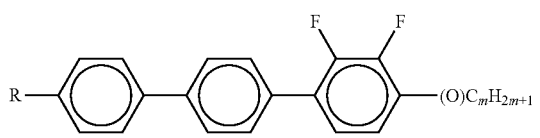

-continued
T-3
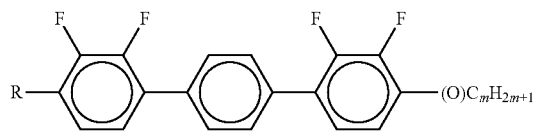
T-4
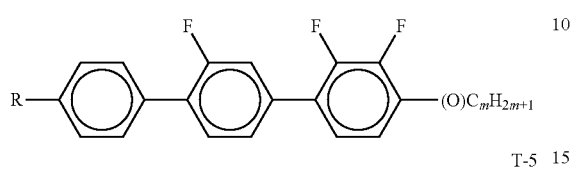
T-5
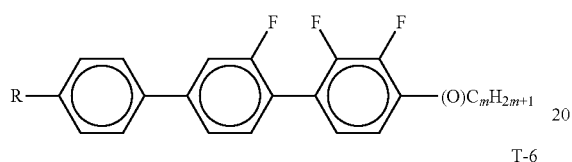
T-6
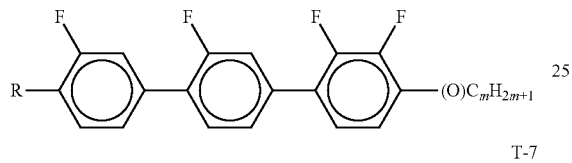
T-7
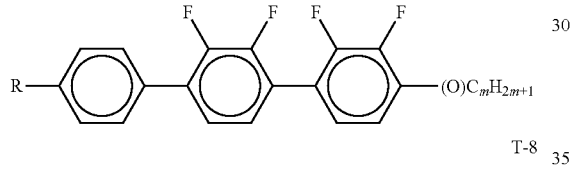
T-8
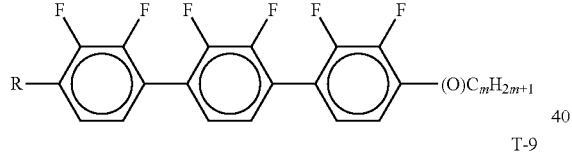
T-9
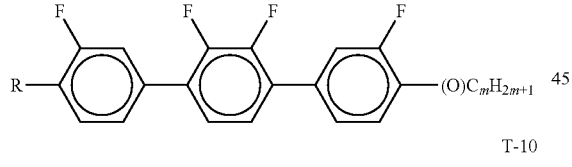
T-10
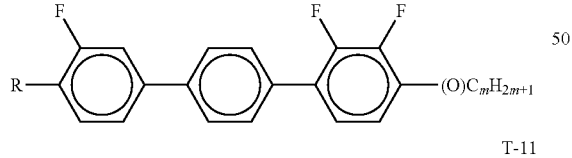
T-11
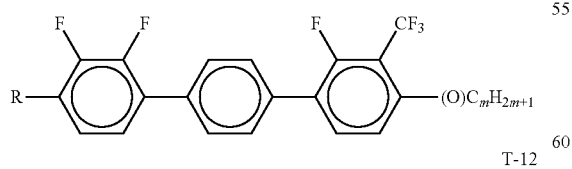
T-12
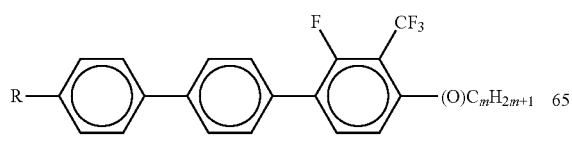
T-13
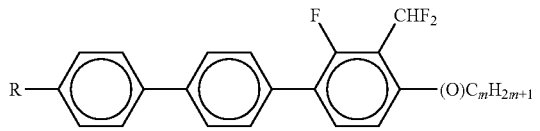
T-14
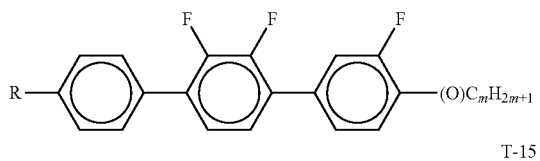
T-15
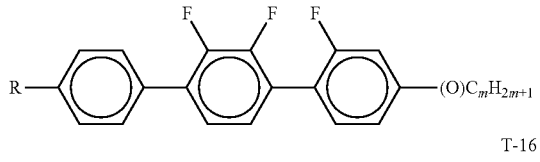
T-16
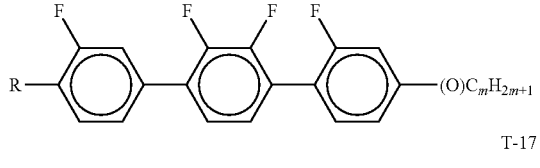
T-17
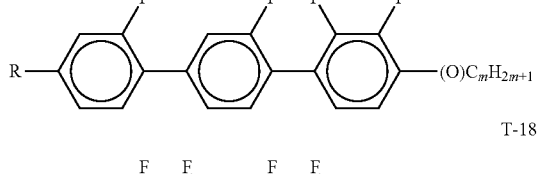
T-18
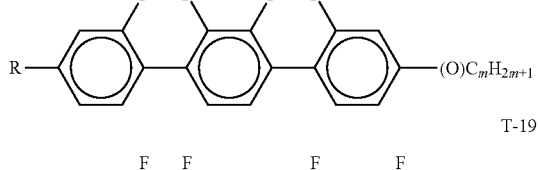
T-19
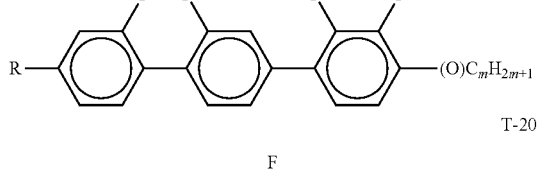
T-20
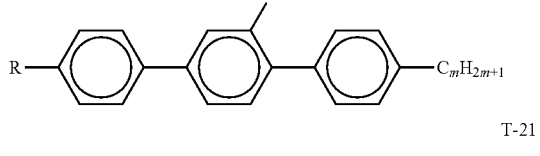
T-21
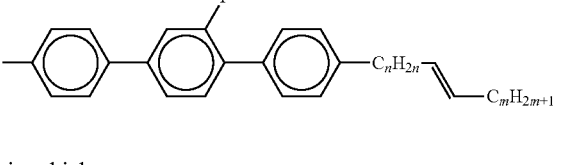
in which
R denotes a straight-chain alkyl or alkoxy radical having 1-7 C atoms, and m=0, 1, 2, 3, 4, 5 or 6 and n denotes 0, 1, 2, 3 or 4.
R preferably denotes methyl, ethyl, propyl, butyl, pentyl, hexyl, methoxy, ethoxy, propoxy, butoxy, pentoxy.

The medium according to the invention preferably comprises the terphenyls of the formulae T-1 to T-21 in amounts of 2-30% by weight, in particular 5-20% by weight.

Particular preference is given to compounds of the formulae T-1, T-2, T-20 and T-21. In these compounds, R preferably denotes alkyl, furthermore alkoxy, each having 1-5 C atoms. In the compounds of the formula T-20, R preferably denotes alkyl or alkenyl, in particular alkyl. In the compound of the formula T-21, R preferably denotes alkyl.

The terphenyls are preferably employed in the mixtures according to the invention if the Δn value of the mixture is to be ≥0.1. Preferred mixtures comprise 2-20% by weight of one or more terphenyl compounds selected from the group of the compounds T-1 to T-21.

g) Liquid-crystalline medium additionally comprising one or more biphenyls of the formulae B-1 to B-3,

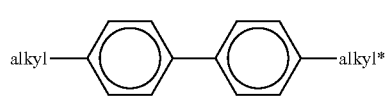
B-1

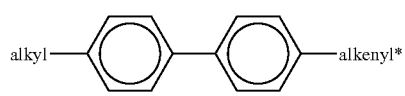
B-2

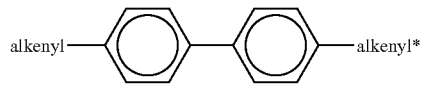
B-3 in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms.

The proportion of the biphenyls of the formulae B-1 to B-3 in the mixture as a whole is preferably at least 3% by weight, in particular ≥5% by weight.

Of the compounds of the formulae B-1 to B-3, the compounds of the formula B-2 are particularly preferred.

Particularly preferred biphenyls are

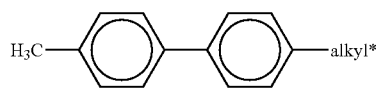
B-1a

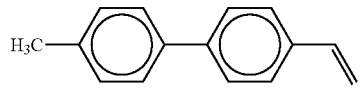
B-2a

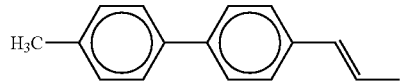
B-2b

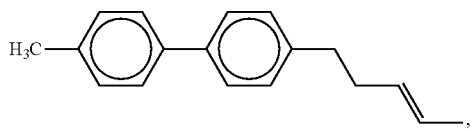
B-2c in which alkyl* denotes an alkyl radical having 1-6 C atoms. The medium according to the invention particularly preferably comprises one or more compounds of the formulae B-1a and/or B-2c.

h) Liquid-crystalline medium comprising at least one compound of the formulae Z-1 to Z-7,

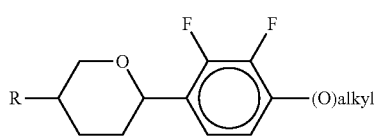
Z-1

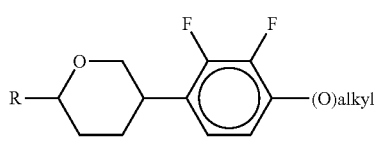
Z-2

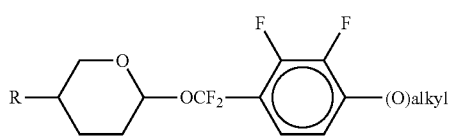
Z-3

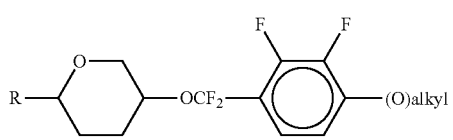
Z-4

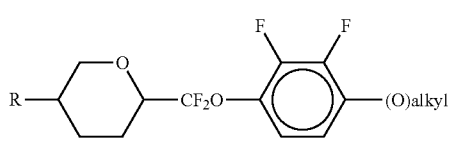
Z-5

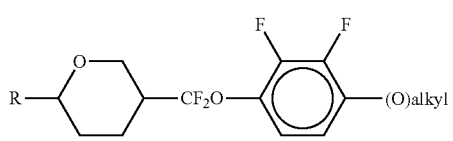
Z-6

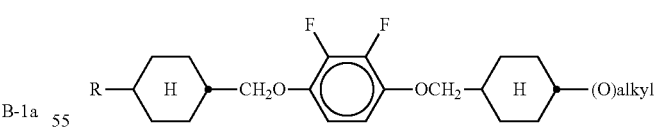
Z-7 in which R and alkyl have the meanings indicated above.

i) Liquid-crystalline medium comprising at least one compound of the formulae O-1 to O-16,

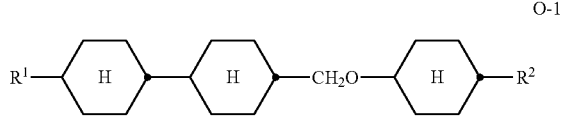
O-1

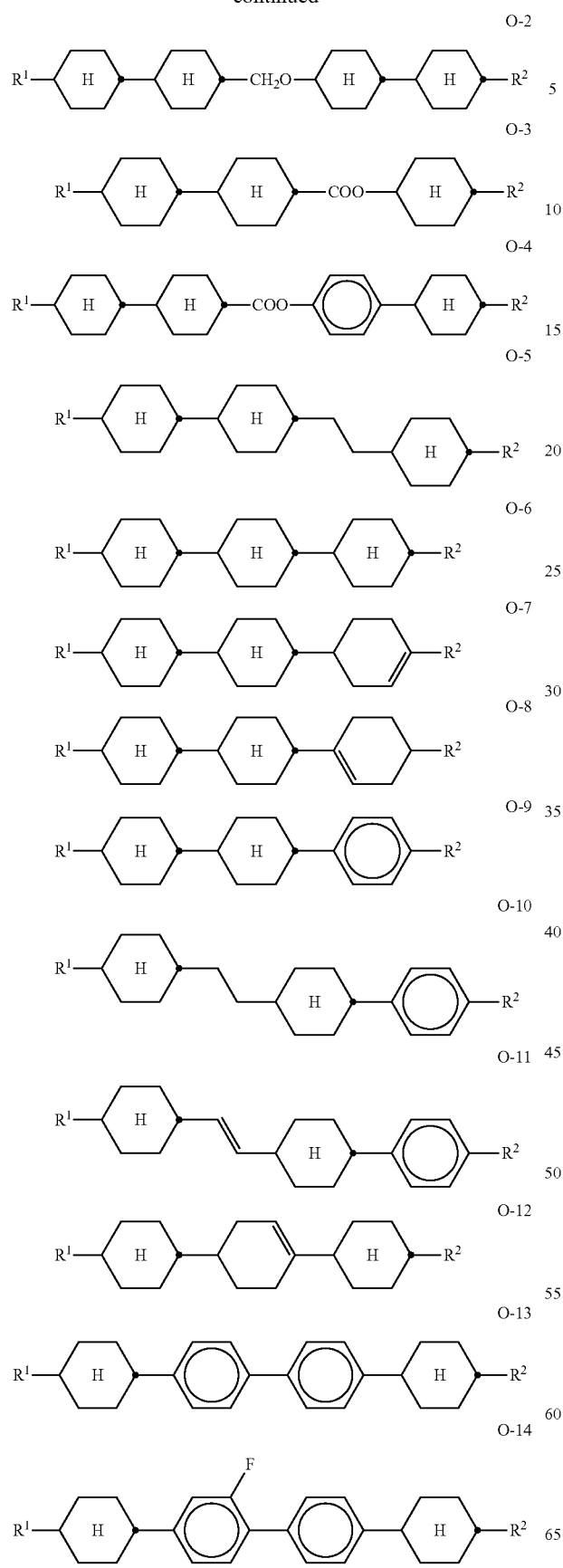

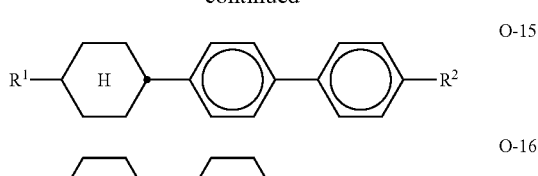

in which $R^1$ and $R^2$ have the meanings indicated for $R^{2,4}$. $R^1$ and $R^2$ preferably each, independently of one another, denote straight-chain alkyl.

Preferred media comprise one or more compounds of the formulae O-1, O-3, O-4, O-5, O-9, O-13, O-14, O-15 and/or O-16.

Mixtures according to the invention very particularly preferably comprise the compounds of the formula O-9, O-15 and/or O-16, in particular in amounts of 5-30%.

Preferred compounds of the formulae O-15 and O-16 are indicated below:

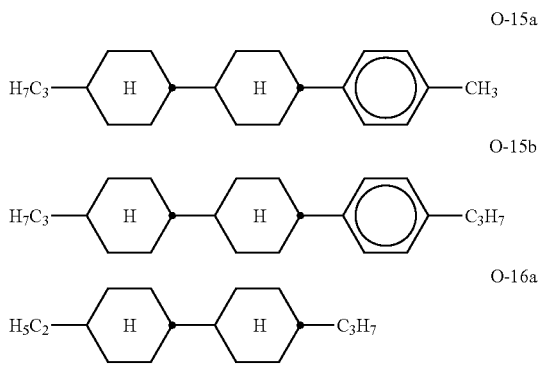

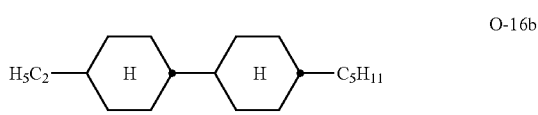

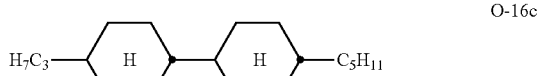

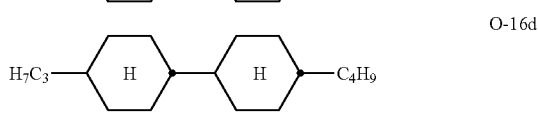

The medium according to the invention particularly preferably comprises the tricyclic compounds of the formula O-15a and/or of the formula O-15b in combination with one or more bicyclic compounds of the formulae O-16a to O-16d. The total proportion of the compounds of the formulae O-15a and/or O-15b in combination with one or more compounds selected from the bicyclic compounds of the formulae O-16a to O-16d is 5-40%, very particularly preferably 15-35%.

Very particularly preferred mixtures comprise compounds O-15a and O-16a:

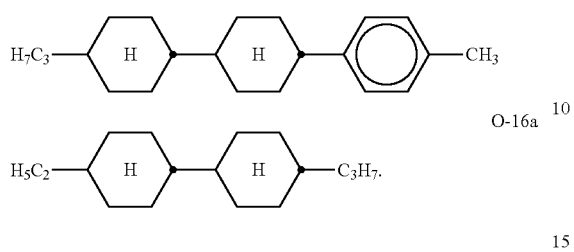

Compounds O-15a and O-16a are preferably present in the mixture in a concentration of 15-35%, particularly preferably 15-25% and especially preferably 18-22%, based on the mixture as a whole.

Very particularly preferred mixtures comprise compounds O-15b and O-16a:

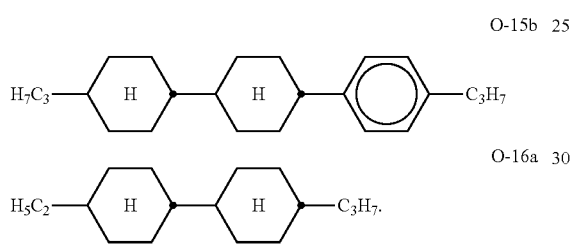

Compounds O-15b and O-16a are preferably present in the mixture in a concentration of 15-35%, particularly preferably 15-25% and especially preferably 18-22%, based on the mixture as a whole.

Very particularly preferred mixtures comprise the following three compounds:

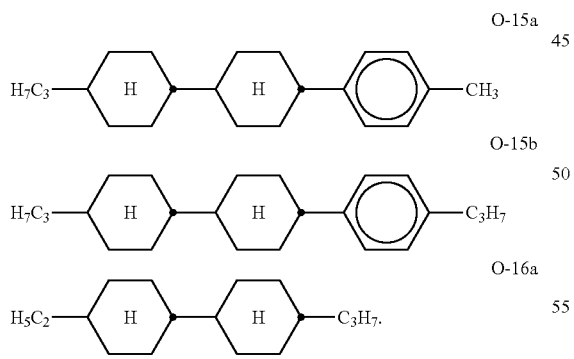

Compounds O-15a, O-15b and O-16a are preferably present in the mixture in a concentration of 15-35%, particularly preferably 15-25% and especially preferably 18-22%, based on the mixture as a whole.

j) Preferred liquid-crystalline media according to the invention comprise one or more substances which contain a tetrahydronaphthyl or naphthyl unit, such as, for example, the compounds of the formulae N-1 to N-5,

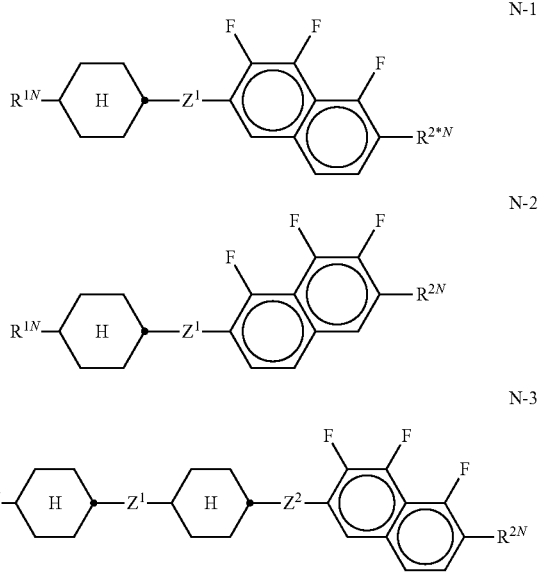

in which $R^{1N}$ and $R^{2N}$ each, independently of one another, have the meanings indicated for $R^{2A}$, preferably denote straight-chain alkyl, straight-chain alkoxy or straight-chain alkenyl, and $Z^1$ and $Z^2$ each, independently of one another, denote —$C_2H_4$—, —CH=CH—, —$(CH_2)_4$—, —$(CH_2)_3O$—, —$O(CH_2)_3$—, —CH=CHCH$_2$CH$_2$—, —CH$_2$CH$_2$CH=CH—, —CH$_2$O—, —OCH$_2$—, —COO—, —OCO—, —$C_2F_4$—, —CF=CF—, —CF=CH—, —CH=CF—, —CF$_2$O—, —OCF$_2$—, —CH$_2$— or a single bond.

k) Preferred mixtures comprise one or more compounds selected from the group of the difluorodibenzochroman compounds of the formula BC, chromans of the formula CR, fluorinated phenanthrenes of the formulae PH-1 and PH-2, fluorinated dibenzofurans of the formula BF,

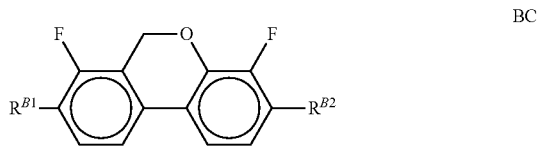

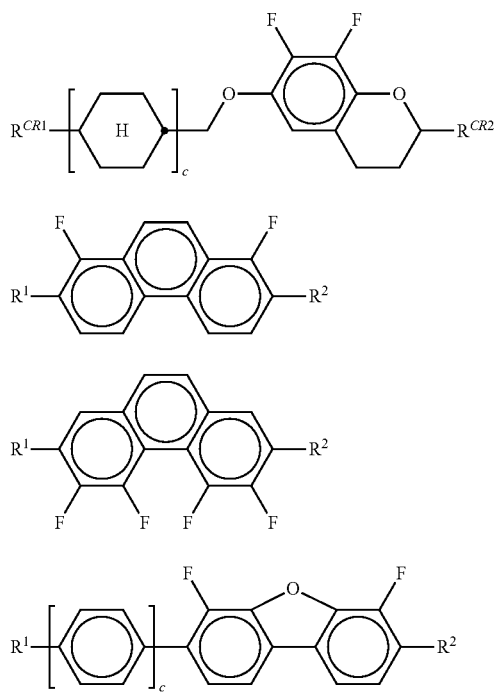

CR

PH-1

PH-2

BF in which
$R^{B1}$, $R^{B2}$, $R^{CR1}$, $R^{CR2}$, $R^1$, $R^2$ each, independently of one another, have the meaning of $R^{2A}$. c is 0, 1 or 2.

The mixtures according to the invention preferably comprise the compounds of the formulae BC, CR, PH-1, PH-2 and/or BF in amounts of 3 to 20% by weight, in particular in amounts of 3 to 15% by weight. Particularly preferred compounds of the formulae BC and CR are the compounds BC-1 to BC-7 and CR-1 to CR-5,

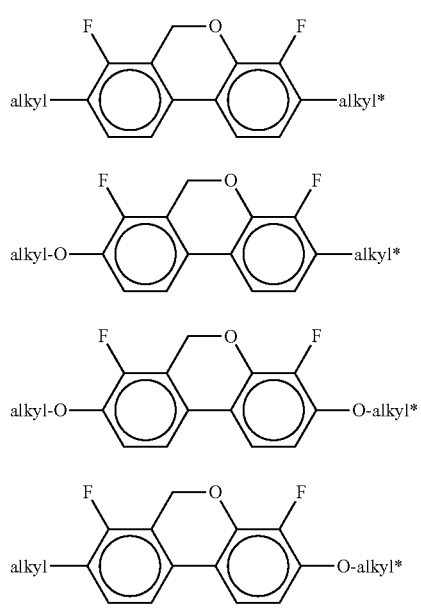

BC-1

BC-2

BC-3

BC-4

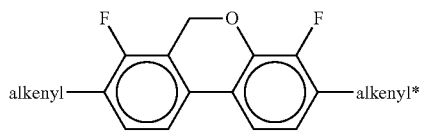

BC-5

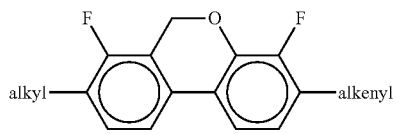

BC-6

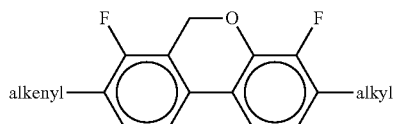

BC-7

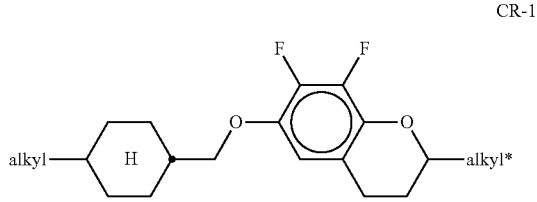

CR-1

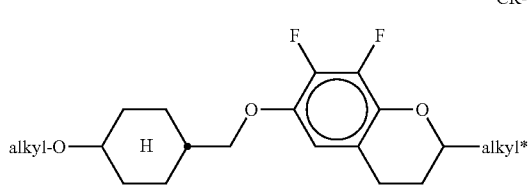

CR-2

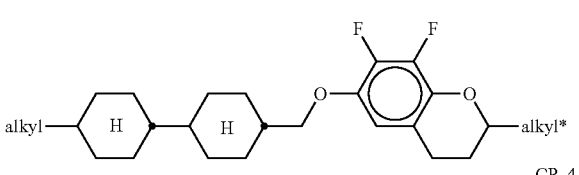

CR-3

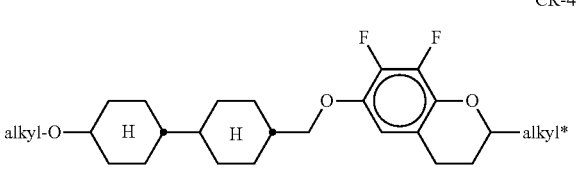

CR-4

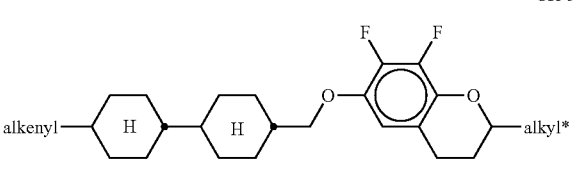

CR-5 in which
alkyl and alkyl* each, independently of one another, denote a straight-chain alkyl radical having 1-6 C atoms, and alkenyl and alkenyl* each, independently of one another, denote a straight-chain alkenyl radical having 2-6 C atoms.

Very particular preference is given to mixtures comprising one, two or three compounds of the formula BC-2.

l) Preferred mixtures comprise one or more indane compounds of the formula In,

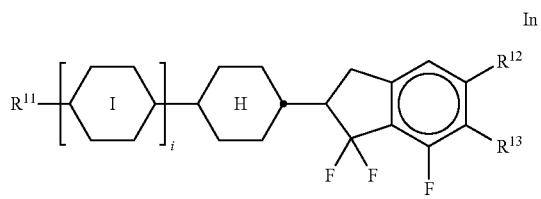
in which
R[11], R[12],
R[13] each, independently of one another, denote a straight-chain alkyl, alkoxy, alkoxyalkyl or alkenyl radical having 1-6 C atoms,
R[12] and R[13] additionally denote H or halogen,
denotes
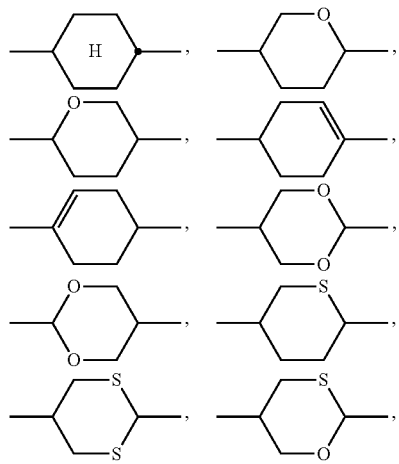
i denotes 0, 1 or 2.
In the case that R[12] and/or R[13] denote halogen, halogen is preferably F.
Preferred compounds of the formula In are the compounds of the formulae In-1 to In-16 indicated below:
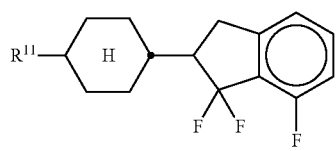
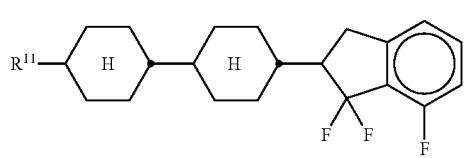
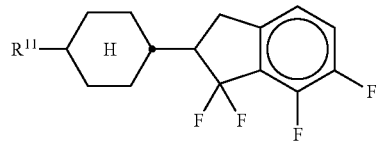
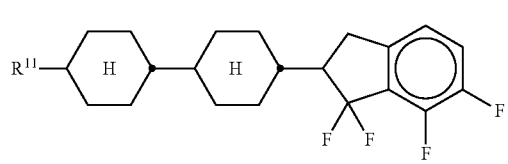
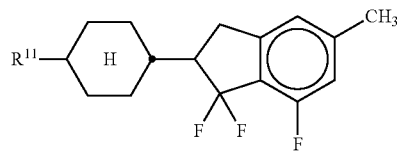
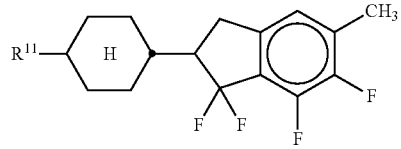
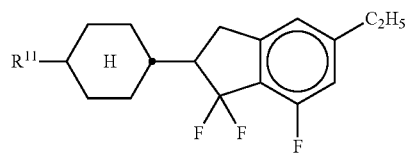
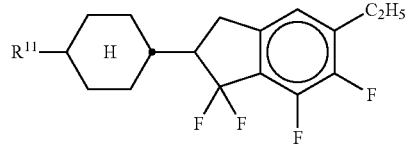
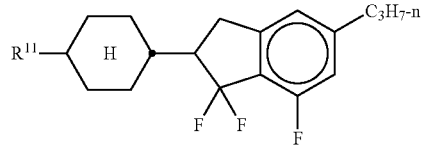
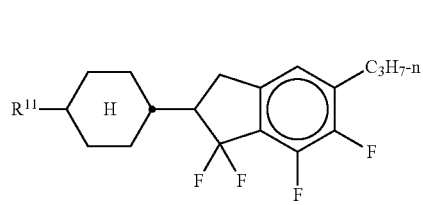
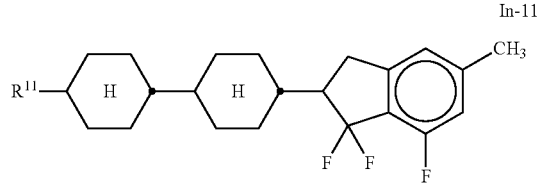

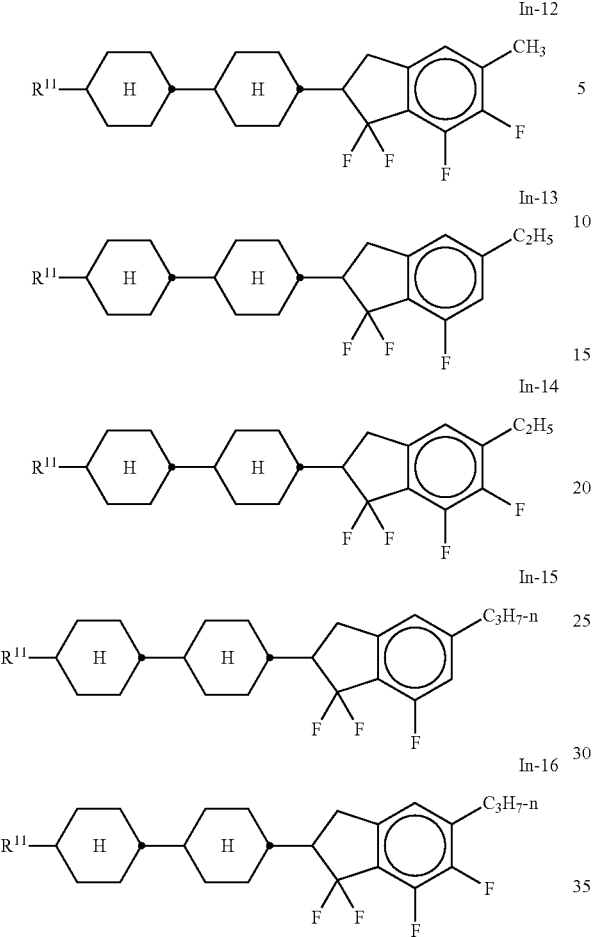
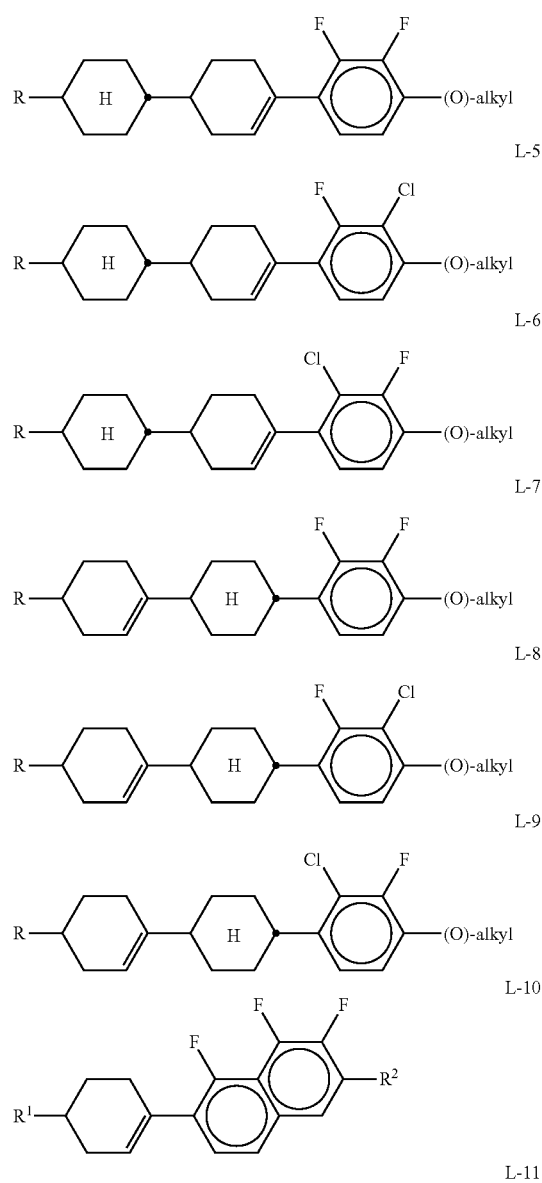

Particular preference is given to the compounds of the formulae In-1, In-2, In-3 and In-4.

The compounds of the formula In and the sub-formulae In-1 to In-16 are preferably employed in the mixtures according to the invention in concentrations ≥5% by weight, in particular 5-30% by weight and very particularly preferably 5-25% by weight.

m) Preferred mixtures additionally comprise one or more compounds of the formulae L-1 to L-11,

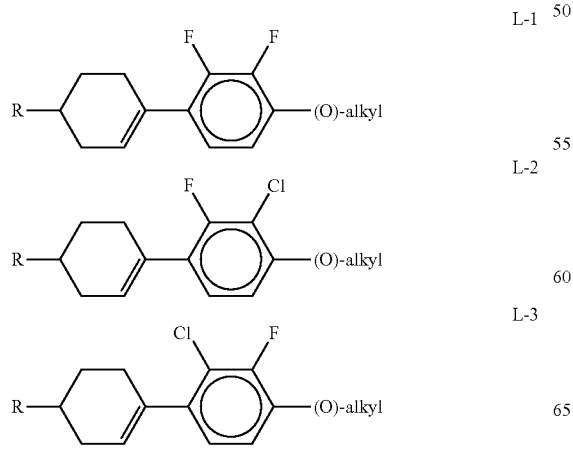

in which

R, $R^1$ and $R^2$ each, independently of one another, have the meanings indicated for $R^{2A}$, and alkyl denotes an alkyl radical having 1-6 C atoms. s denotes 1 or 2.

Particular preference is given to the compounds of the formulae L-1 and L-4, in particular L-4.

The compounds of the formulae L-1 to L-11 are preferably employed in concentrations of 5-50% by weight, in particular 5-40% by weight and very particularly preferably 10-40% by weight.

Particularly preferred mixture concepts are indicated below: (the acronyms used are explained in Table A. n and m here each denote, independently of one another, 1-6).

The mixture according to the invention preferably contains at least one self-aligning additive selected from the following group of compounds

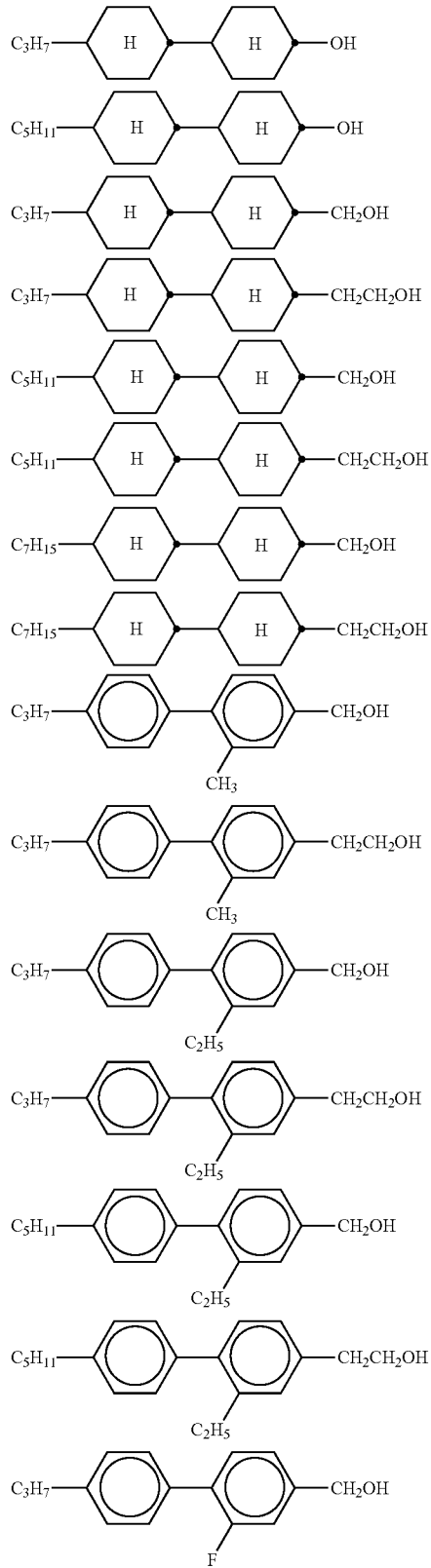

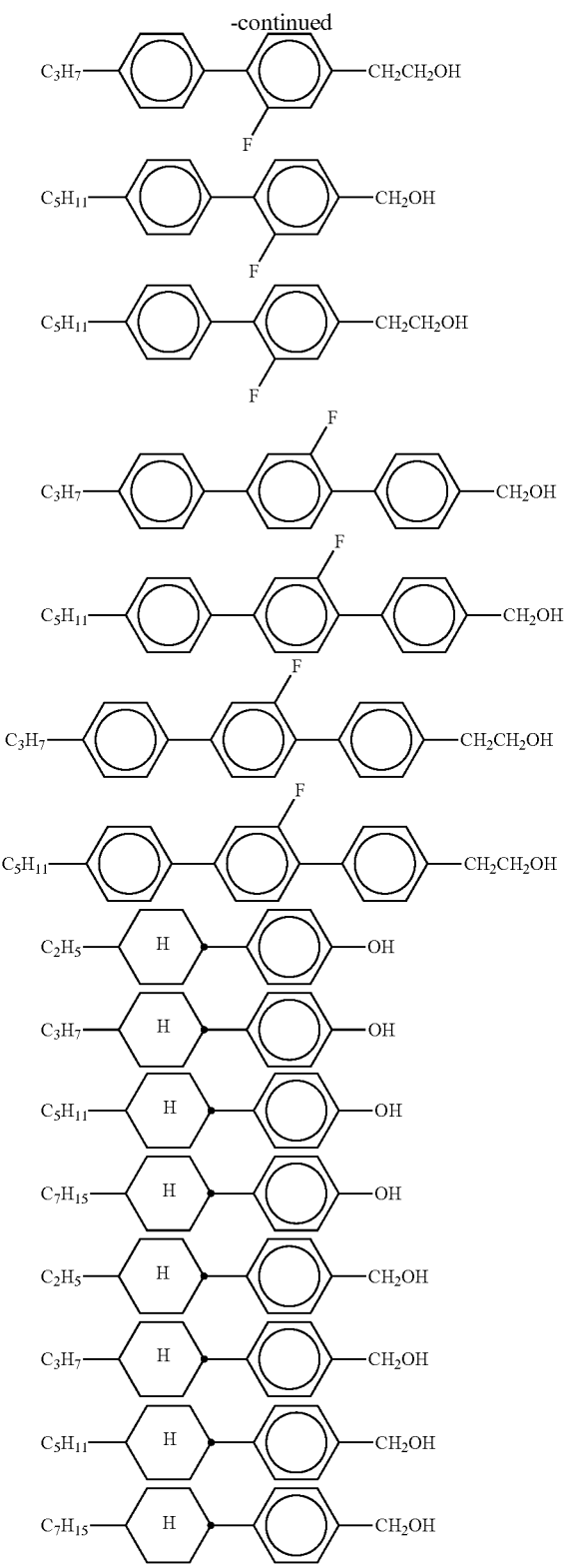

CPY-n-Om, in particular CPY-2-O2, CPY-3-O2 and/or CPY-5-O2, preferably in concentrations >5%, in particular 10-30%, based on the mixture as a whole, and/or CY-n-Om, preferably CY-3-O2, CY-3-O4, CY-5-O2 and/or CY-5-O4, preferably in concentrations >5%, in particular 15-50%, based on the mixture as a whole, and/or
- CCY-n-Om, preferably CCY-4-O2, CCY-3-O2, CCY-3-O3, CCY-3-O1 and/or CCY-5-O2, preferably in concentrations >5%, in particular 10-30%, based on the mixture as a whole, and/or
- CLY-n-Om, preferably CLY-2-O4, CLY-3-O2 and/or CLY-3-O3, preferably in concentrations >5%, in particular 10-30%, based on the mixture as a whole, and/or
- CK-n-F, preferably CK-3-F, CK-4-F and/or CK-5-F, preferably in concentrations of >5%, in particular 5-25%, based on the mixture as a whole.

Preference is furthermore given to mixtures according to the invention which comprise the following mixture concepts:

(n and m each denote, independently of one another, 1-6.)
- CPY-n-Om and CY-n-Om, preferably in concentrations of 10-80%, based on the mixture as a whole, and/or
- CPY-n-Om and CK-n-F, preferably in concentrations of 10-70%, based on the mixture as a whole, and/or
- CPY-n-Om and CLY-n-Om, preferably in concentrations of 10-80%, based on the mixture as a whole.

and/or
- PYP-n-m, preferably one, two or three compounds, preferably in concentrations of 1-20% of the mixture as a whole.

and/or
- PY-n-Om, preferably one, two or three compounds, preferably in concentrations of 1-20% of the mixture as a whole.

The invention furthermore relates to an electro-optical display, preferably a PI-free display, having active-matrix addressing based on the ECB, VA, PS-VA, PSA, characterised in that it contains, as dielectric, a liquid-crystalline medium based on a mixture of polar compounds having a negative dielectric anisotropy characterized in that it contains at least one self-aligning additive.

The liquid-crystalline medium according to the invention preferably has a nematic phase from $\leq-20°$ C. to $\geq 70°$ C., particularly preferably from $\leq -30°$ C. to $\geq 80°$ C., very particularly preferably from $\leq -40°$ C. to $\geq 90°$ C.

The expression "have a nematic phase" here means on the one hand that no smectic phase and no crystallisation are observed at low temperatures at the corresponding temperature and on the other hand that clearing still does not occur on heating from the nematic phase. The investigation at low temperatures is carried out in a flow viscometer at the corresponding temperature and checked by storage in test cells having a layer thickness corresponding to the electro-optical use for at least 100 hours. If the storage stability at a temperature of $-20°$ C. in a corresponding test cell is 1000 h or more, the medium is referred to as stable at this temperature. At temperatures of $-30°$ C. and $-40°$ C., the corresponding times are 500 h and 250 h respectively. At high temperatures, the clearing point is measured by conventional methods in capillaries.

The liquid-crystal mixture preferably has a nematic phase range of at least 60 K and a flow viscosity $v_{20}$ of at most 30 $mm^2 \cdot s^{-1}$ at 20° C.

The values of the birefringence $\Delta n$ in the liquid-crystal mixture are generally between 0.07 and 0.16, preferably between 0.08 and 0.12.

The liquid-crystal mixture according to the invention has a $\Delta\varepsilon$ of $-0.5$ to $-8.0$, in particular $-2.5$ to $-6.0$, where $\Delta\varepsilon$ denotes the dielectric anisotropy. The rotational viscosity $\gamma_1$ at 20° C. is preferably $\leq 165$ mPa·s, in particular $\leq 140$ mPa·s.

The liquid-crystal media according to the invention have relatively low values for the threshold voltage ($V_0$). They are preferably in the range from 1.7 V to 3.0 V, particularly preferably $\leq 2.5$ V and very particularly preferably $\leq 2.3$ V.

For the present invention, the term "threshold voltage" relates to the capacitive threshold ($V_0$), also known as the Freedericks threshold, unless explicitly indicated otherwise.

In addition, the liquid-crystal media according to the invention have high values for the voltage holding ratio in liquid-crystal cells.

In general, liquid-crystal media having a low addressing voltage or threshold voltage exhibit a lower voltage holding ratio than those having a higher addressing voltage or threshold voltage and vice versa.

For the present invention, the term "dielectrically positive compounds" denotes compounds having a $\Delta\varepsilon>1.5$, the term "dielectrically neutral compounds" denotes those having $-1.5\leq\Delta\varepsilon\leq 1.5$ and the term "dielectrically negative compounds" denotes those having $\Delta\varepsilon<-1.5$. The dielectric anisotropy of the compounds is determined here by dissolving 10% of the compounds in a liquid-crystalline host and determining the capacitance of the resultant mixture in at least one test cell in each case having a layer thickness of 20 μm with homeotropic and with homogeneous surface alignment at 1 kHz. The measurement voltage is typically 0.5 V to 1.0 V, but is always lower than the capacitive threshold of the respective liquid-crystal mixture investigated.

All temperature values indicated for the present invention are in ° C.

The mixtures according to the invention are suitable for all VA-TFT applications, such as, for example, VAN, MVA, (S)-PVA, ASV, PSA (polymer sustained VA) and PS-VA (polymer stabilized VA).

The nematic liquid-crystal mixtures in the displays according to the invention generally comprise two components A and B, which themselves consist of one or more individual compounds.

Component A has significantly negative dielectric anisotropy and gives the nematic phase a dielectric anisotropy of $\leq -0.5$. Preferably component A comprises the compounds of the formulae IIA, IIB and/or IIC, furthermore compounds of the formula III.

The proportion of component A is preferably between 45 and 100%, in particular between 60 and 100%.

For component A, one (or more) individual compound(s) which has (have) a value of $\Delta\varepsilon \leq -0.8$ is (are) preferably selected. This value must be more negative, the smaller the proportion A in the mixture as a whole.

Component B has pronounced nematogeneity and a flow viscosity of not greater than 30 $mm^2 \cdot s^{-1}$, preferably not greater than 25 $mm^2 \cdot s^{-1}$, at 20° C.

Particularly preferred individual compounds in component B are extremely low-viscosity nematic liquid crystals having a flow viscosity of not greater than 18 $mm^2 \cdot s^{-1}$, preferably not greater than 12 $mm^2 \cdot s^{-1}$, at 20° C.

Component B is monotropically or enantiotropically nematic, has no smectic phases and is able to prevent the occurrence of smectic phases down to very low temperatures in liquid-crystal mixtures. For example, if various materials of high nematogeneity are added to a smectic liquid-crystal mixture, the nematogeneity of these materials can be compared through the degree of suppression of smectic phases that is achieved.

The mixture may optionally also comprise a component C, comprising compounds having a dielectric anisotropy of Δε≥1.5. These so-called positive compounds are generally present in a mixture of negative dielectric anisotropy in amounts of 20% by weight, based on the mixture as a whole.

A multiplicity of suitable materials is known to the person skilled in the art from the literature. Particular preference is given to compounds of the formula III.

In addition, these liquid-crystal phases may also comprise more than 18 components, preferably 18 to 25 components.

The mixtures according to the invention contain one or more compounds of the formula IA, IB, IC and/or ID and preferably comprise 4 to 15, in particular 5 to 12, and particularly preferably <10, compounds of the formulae IIA, IIB and/or IIC and optionally III.

Besides compounds of the formula IA, IB, IC and/or ID and the compounds of the formulae IIA, IIB and/or IIC and optionally III, other constituents may also be present, for example in an amount of up to 45% of the mixture as a whole, but preferably up to 35%, in particular up to 10%.

The other constituents are preferably selected from nematic or nematogenic substances, in particular known substances, from the classes of the azoxybenzenes, benzylideneanilines, biphenyls, terphenyls, phenyl or cyclohexyl benzoates, phenyl or cyclohexyl cyclo hexanecarboxylates, phenylcyclohexanes, cyclohexylbiphenyls, cyclohexylcyclohexanes, cyclohexylnaphthalenes, 1,4-biscyclohexylbiphenyls or cyclohexylpyrimidines, phenyl- or cyclohexyldioxanes, optionally halogenated stilbenes, benzyl phenyl ethers, tolans and substituted cinnamic acid esters.

The most important compounds which are suitable as constituents of liquid-crystal phases of this type can be characterised by the formula IV $$R^{20}\text{-L-G-E-}R^{21} \quad \text{IV}$$

in which L and E each denote a carbo- or heterocyclic ring system from the group formed by 1,4-disubstituted benzene and cyclohexane rings, 4,4'-disubstituted biphenyl, phenylcyclohexane and cyclohexylcyclohexane systems, 2,5-disubstituted pyrimidine and 1,3-dioxane rings, 2,6-disubstituted naphthalene, di- and tetrahydronaphthalene, quinazoline and tetrahydroquinazoline,

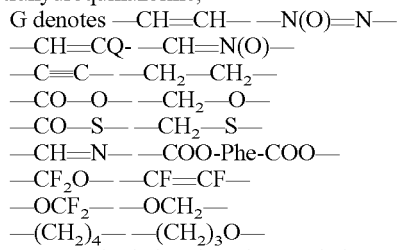

or a C—C single bond, Q denotes halogen, preferably chlorine, or —CN, and $R^{20}$ and $R^{21}$ each denote alkyl, alkenyl, alkoxy, alkoxyalkyl or alkoxycarbonyloxy having up to 18, preferably up to 8, carbon atoms, or one of these radicals alternatively denotes CN, NC, $NO_2$, NCS, $CF_3$, $SF_5$, $OCF_3$, F, Cl or Br.

In most of these compounds, $R^{20}$ and $R^{21}$ are different from one another, one of these radicals usually being an alkyl or alkoxy group. Other variants of the proposed substituents are also common. Many such substances or also mixtures thereof are commercially available. All these substances can be prepared by methods known from the literature.

It goes without saying for the person skilled in the art that the VA mixture according to the invention may also comprise compounds in which, for example, H, N, O, Cl and F have been replaced by the corresponding isotopes.

Polymerisable compounds, so-called reactive mesogens (RMs), for example as disclosed in U.S. Pat. No. 6,861,107, may furthermore be added to the mixtures according to the invention in concentrations of preferably 0.12-5% by weight, particularly preferably 0.2-2% by weight, based on the mixture. These mixtures may optionally also comprise an initiator, as described, for example, in U.S. Pat. No. 6,781,665. The initiator, for example Irganox-1076 from Ciba, is preferably added to the mixture comprising polymerisable compounds in amounts of 0-1%. Mixtures of this type can be used for so-called polymer-stabilised VA modes (PS-VA) or PSA (polymer sustained VA), in which polymerisation of the reactive mesogens is intended to take place in the liquid-crystalline mixture. The prerequisite for this is that the liquid-crystal mixture does not itself comprise any polymerisable components.

In a preferred embodiment of the invention, the polymerisable compounds are selected from the compounds of the formula M, $$R^{Ma}\text{-}A^{M1}\text{-}(Z^{M1}\text{-}A^{M2})_{m1}\text{-}R^{Mb} \quad \text{M}$$

in which the individual radicals have the following meanings:
$R^{Ma}$ and $R^{Mb}$ each, independently of one another, denote P, P-Sp-, H, halogen, $SF_5$, $NO_2$, an alkyl, alkenyl or alkynyl group, where at least one of the radicals $R^{Ma}$ and $R^{Mb}$ preferably denotes or contains a group P or P-Sp-,
P denotes a polymerisable group,
Sp denotes a spacer group or a single bond,
$A^{M1}$ and $A^{M2}$ each, independently of one another, denote an aromatic, heteroaromatic, alicyclic or heterocyclic group, preferably having 4 to 25 ring atoms, preferably C atoms, which may also encompass or contain fused rings, and which may optionally be mono- or polysubstituted by L,
L denotes P, P-Sp-, OH, $CH_2OH$, F, Cl, Br, I, —CN, —$NO_2$, —NCO, —NCS, —OCN, —SCN, —C(=O)N($R^x$)$_2$, —C(C=O)$Y^1$, —C(C=O)$R^x$, —N($R^x$)$_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F, Cl, P or P-Sp-, preferably P, P-Sp-, H, OH, $CH_2OH$, halogen, $SF_5$, $NO_2$, an alkyl, alkenyl or alkynyl group,
$Y^1$ denotes halogen,
$Z^{M1}$ denotes —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—, —COO—, —OCO—CH=CH—, $CR^0R^{00}$ or a single bond,
$R^0$ and $R^{00}$ each, independently of one another, denote H or alkyl having 1 to 12 C atoms,
$R^x$ denotes P, P-Sp-, H, halogen, straight-chain, branched or cyclic alkyl having 1 to 25 C atoms, in which, in addition, one or more non-adjacent CH$_2$ groups may be replaced by —O—, —S—, —CO—, —CO—O—, —O—CO—, —O—CO—O— in such a way that O and/or S atoms are not linked directly to one another, and in which, in addition, one or more H atoms may be replaced by F, Cl, P or P-Sp-, an optionally substituted aryl or aryloxy group having 6 to 40 C atoms, or an optionally substituted heteroaryl or heteroaryloxy group having 2 to 40 C atoms,
m1 denotes 0, 1, 2, 3 or 4, and
n1 denotes 1, 2, 3 or 4,
where at least one, preferably one, two or three, particularly preferably one or two, from the group $R^{Ma}$, $R^{Mb}$ and the substituents L present denotes a group P or P-Sp- or contains at least one group P or P-Sp-.

Particularly preferred compounds of the formula M are those in which $R^{Ma}$ and $R^{Mb}$ each, independently of one another, denote P, P-Sp-, H, F, Cl, Br, I, —CN, —NO$_2$, —NCO, —NCS, —OCN, —SCN, SF$_5$ or straight-chain or branched alkyl having 1 to 25 C atoms, in which, in addition, one or more non-adjacent CH$_2$ groups may each be replaced, independently of one another, by —C(R$^0$)=C(R$^{00}$)—, —C≡C—, —N(R$^{00}$)—, —O—, —S—, —CO—, —CO—O—, —OCO—CO—, —O—CO—O— in such a way that O and/or S atoms are not linked directly to one another, and in which, in addition, one or more H atoms may be replaced by F, Cl, Br, I, CN, P or P-Sp-, where at least one of the radicals $R^{Ma}$ and $R^{Mb}$ preferably denotes or contains a group P or P-Sp-, $A^{M1}$ and $A^{M2}$ each, independently of one another, denote 1,4-phenylene, naphthalene-1,4-diyl, naphthalene-2,6-diyl, phenanthrene-2,7-diyl, anthracene-2,7-diyl, fluorene-2,7-diyl, coumarine, flavone, where, in addition, one or more CH groups in these groups may be replaced by N, cyclohexane-1,4-diyl, in which, in addition, one or more non-adjacent CH$_2$ groups may be replaced by O and/or S, 1,4-cyclohexenylene, bicyclo[1.1.1]-pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl or octahydro-4,7-methanoindane-2,5-diyl, where all these groups may be unsubstituted or mono- or polysubstituted by L, L denotes P, P-Sp-, OH, CH$_2$OH, F, Cl, Br, I, —CN, —NO$_2$, —NCO, —NCS, —OCN, —SCN, —C(=O)N(R$^x$)$_2$, —C(C=O)Y$^1$, —C(C=O)R$^x$, —N(R$^x$)$_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F, Cl, P or P-Sp-, P denotes a polymerisable group, Y$^1$ denotes halogen, R$^x$ denotes P, P-Sp-, H, halogen, straight-chain, branched or cyclic alkyl having 1 to 25 C atoms, in which, in addition, one or more non-adjacent CH$_2$ groups may be replaced by —O—, —S—, —CO—, —CO—O—, —O—CO—, —O—CO—O— in such a way that O and/or S atoms are not linked directly to one another, and in which, in addition, one or more H atoms may be replaced by F, Cl, P or P-Sp-, an optionally substituted aryl or aryloxy group having 6 to 40 C atoms, or an optionally substituted heteroaryl or heteroaryloxy group having 2 to 40 C atoms.

Very particular preference is given to compounds of the formula M in which one of $R^{Ma}$ and $R^{Mb}$ or both denote(s) P or P-Sp-.

Suitable and preferred RMs for use in liquid-crystalline media and PS-VA displays or PSA displays according to the invention are selected, for example, from the following formulae:

M1
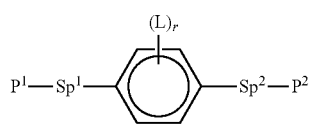

M2
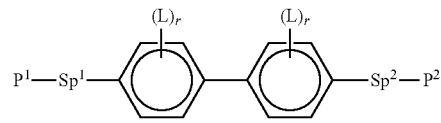

M3
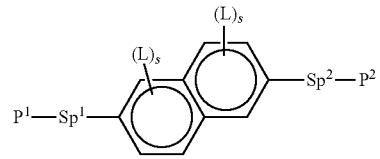

M4
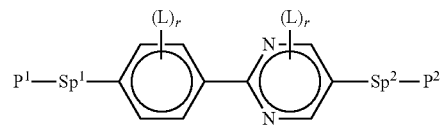

M5
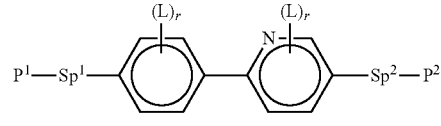

M6
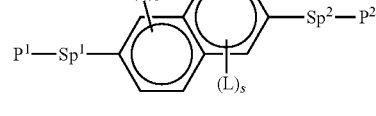

M7
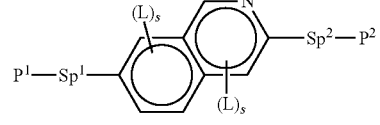

M8
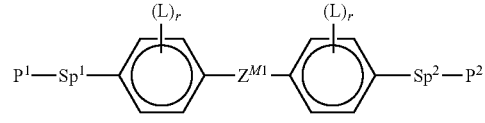

M9
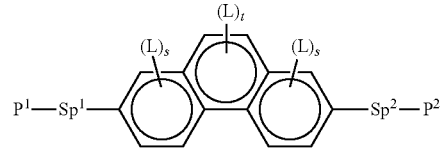

M10
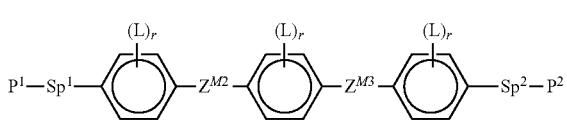

M11
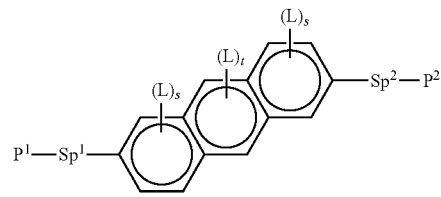

M12
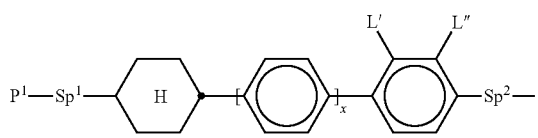

M13
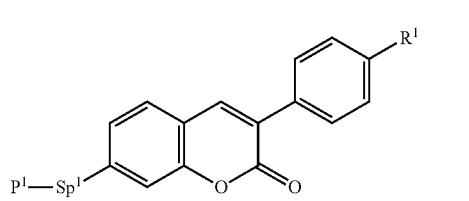

M14
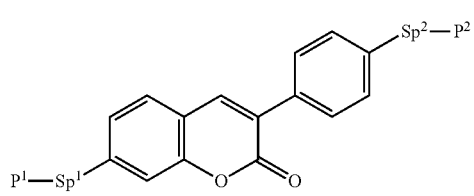

M15
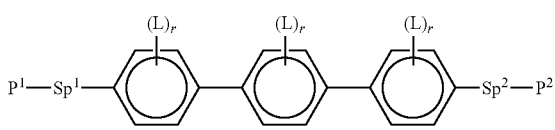

M16

M17
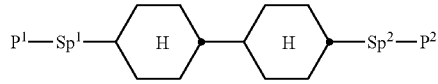

M18
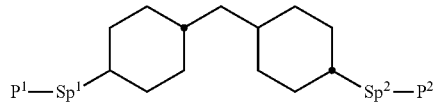

M19
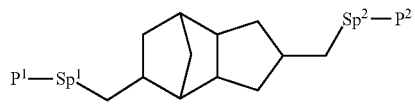

M20

M21
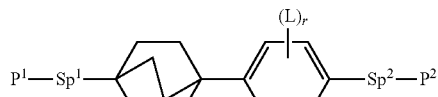

M22
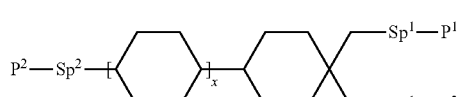

M23
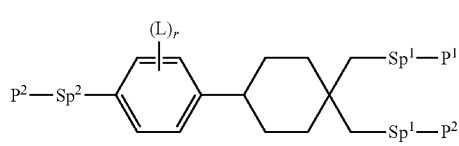

M24
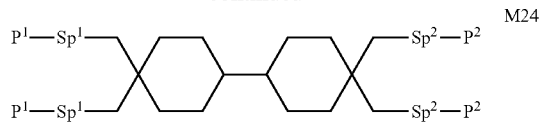

M25
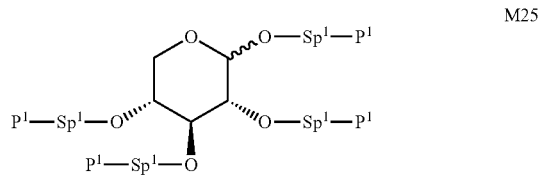

M26
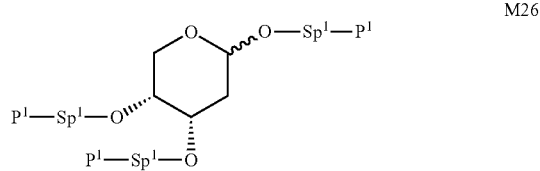

M27
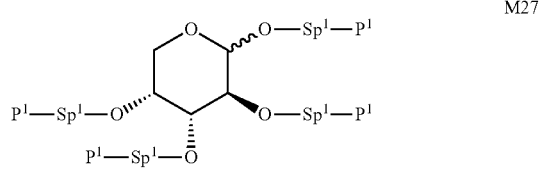

M28
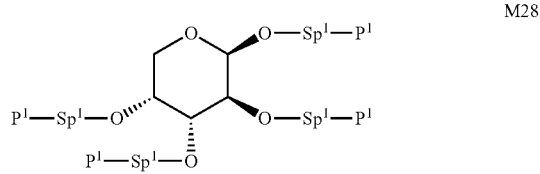

M29
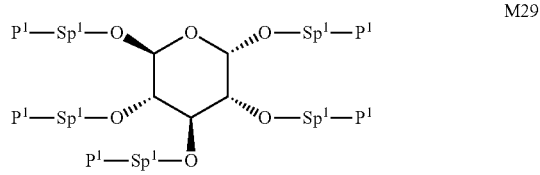

in which the individual radicals have the following meanings:

$P^1$ and $P^2$ each, independently of one another, denote a polymerisable group, preferably having one of the meanings indicated above and below for P, particularly preferably an acrylate, methacrylate, fluoroacrylate, oxetane, vinyloxy or epoxy group, $Sp^1$ and $Sp^2$ each, independently of one another, denote a single bond or a spacer group, preferably having one of the meanings indicated above and below for Sp, and particularly preferably —$(CH_2)_{p1}$—, —$(CH_2)_{p1}$—O—, —$(CH_2)_{p1}$—CO—O— or —$(CH_2)_{p1}$—O—CO—O—, in which p1 is an integer from 1 to 12, and where the linking of the last-mentioned groups to the adjacent ring takes place via the O atom, where one of the radicals $P^1$-$Sp^1$- and $P^2$-$Sp^2$- may also denote $R^{aa}$, $R^{aa}$ denotes H, F, Cl, CN or straight-chain or branched alkyl having 1 to 25 C atoms, in which, in addition, one or more non-adjacent $CH_2$ groups may each be replaced, independently of one another, by —C($R^0$)=C($R^{00}$)—, —C≡C—, —N($R^0$)—, —O—, —S—, —CO—, —CO—O—, —O—CO—, —O—CO—O— in such a way that O and/or S atoms are not linked directly to one another, and in which, in addition, one or more H atoms may be replaced by F, Cl, CN or $P^1$-$Sp^1$-, particularly preferably straight-chain or branched, optionally mono- or polyfluorinated alkyl, alkoxy, alkenyl, alkynyl, alkylcarbonyl, alkoxycarbonyl or alkylcarbonyloxy having 1 to 12 C atoms (where the alkenyl and alkynyl radicals have at least two C atoms and the branched radicals have at least three C atoms), $R^O$, $R^{OO}$ each, independently of one another and on each occurrence identically or differently, denote H or alkyl having 1 to 12 C atoms, $R^y$ and $R^z$ each, independently of one another, denote H, F, $CH_3$ or $CF_3$, $Z^{M1}$ denotes —O—, —CO—, —C($R^y R^z$)— or —$CF_2 CF_2$—, $Z^{M2}$ and $Z^{M3}$ each, independently of one another, denote —CO—O—, —O—CO—, —$CH_2$O—, —O$CH_2$—, —$CF_2$O—, —O$CF_2$— or —($CH_2$)$_n$—, where n is 2, 3 or 4, L on each occurrence, identically or differently, denotes F, Cl, CN, or straight-chain or branched, optionally mono- or polyfluorinated alkyl, alkoxy, alkenyl, alkynyl, alkylcarbonyl, alkoxycarbonyl or alkylcarbonyloxy having 1 to 12 C atoms, preferably F, L' and L" each, independently of one another, denote H, F or Cl, r denotes 0, 1, 2, 3 or 4, s denotes 0, 1, 2 or 3, t denotes 0, 1 or 2, and x denotes 0 or 1.

Suitable polymerisable compounds are furthermore listed, for example, in Table D. LC mixtures containing at least one polymerisable compound listed in Table D are especially preferred.

The liquid-crystalline media in accordance with the present application preferably comprise in total 0.1 to 10%, preferably 0.2 to 4.0%, particularly preferably 0.2 to 2.0%, of polymerisable compounds.

Particular preference is given to the polymerisable compounds of the formula M.

The polymerisable compounds are preferably polymerised by photopolymerisation, for example by UV irradiation, often in the presence of at least one suitable initiator. Suitable conditions for the polymerisation and suitable types and amounts of initiator(s) are known to a person skilled in the art and are described in the literature. Suitable for free-radical polymerisation are, for example, commercially available photoinitiators, for example Irgacure® 651, Irgacure® 184 or Darocure® 1173 (Ciba Specialty Chemicals). The polymerisable compound(s) preferably comprise from 0 to 5% by weight, particularly preferably 0.1 to 3% by weight of one or more photoinitiators.

The combination of at least two liquid crystalline compounds, at least one self-aligning additive and preferably with at least one polymerisable compound, in particular one selected from the formula M and/or the formulae M1 to M25, produces low threshold voltages, low rotational viscosities, very good low temperature stabilities (LTS) in the media but at the same time high clearing points and high HR values, and enables the setting or a pretilt angle in VA displays.

The mixtures according to the invention may furthermore comprise conventional additives, such as, for example, stabilisers, antioxidants, UV absorbers, nanoparticles, microparticles, etc.

The structure of the liquid-crystal displays according to the invention corresponds to the usual geometry, as described, for example, in EP 0 240 379.

The following examples are intended to explain the invention without limiting it. Above and below, percent data denote percent by weight; all temperatures are indicated in degrees Celsius.

Throughout the patent application, 1,4-cyclohexylene rings and 1,4-phenylene rings are depicted as follows:

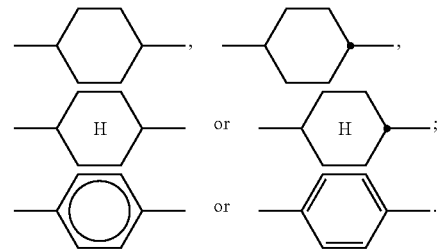

Besides the compounds of the formulae IIA and/or IIB and/or IIC, one or more compounds of the formula I, the mixtures according to the invention preferably comprise one or more of the compounds from Table A indicated below.

TABLE A

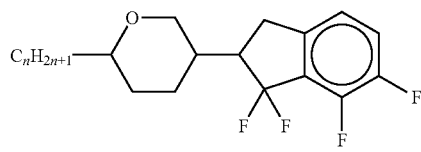

AIK-n-F

BCH-nm

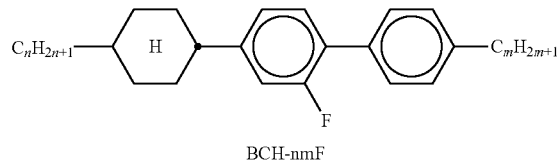

BCH-nmF

TABLE A-continued
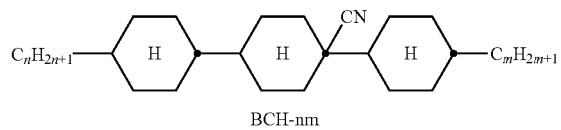
BCH-nm
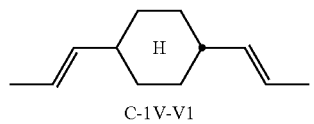
C-1V-V1
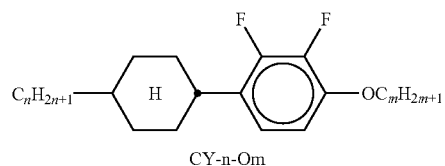
CY-n-Om
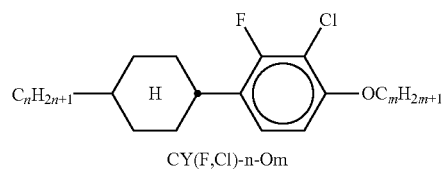
CY(F,Cl)-n-Om
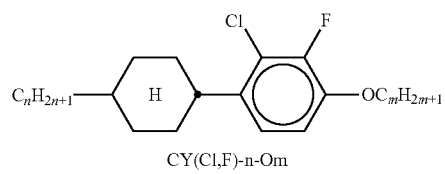
CY(Cl,F)-n-Om
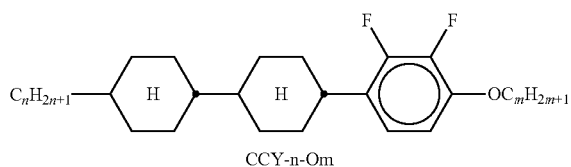
CCY-n-Om
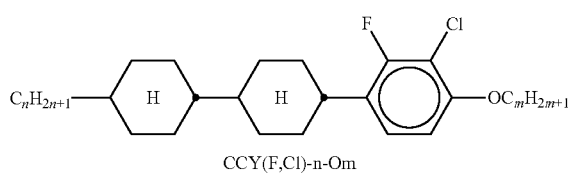
CCY(F,Cl)-n-Om
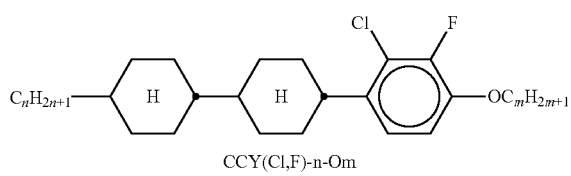
CCY(Cl,F)-n-Om
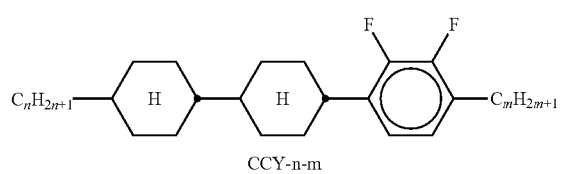
CCY-n-m TABLE A-continued
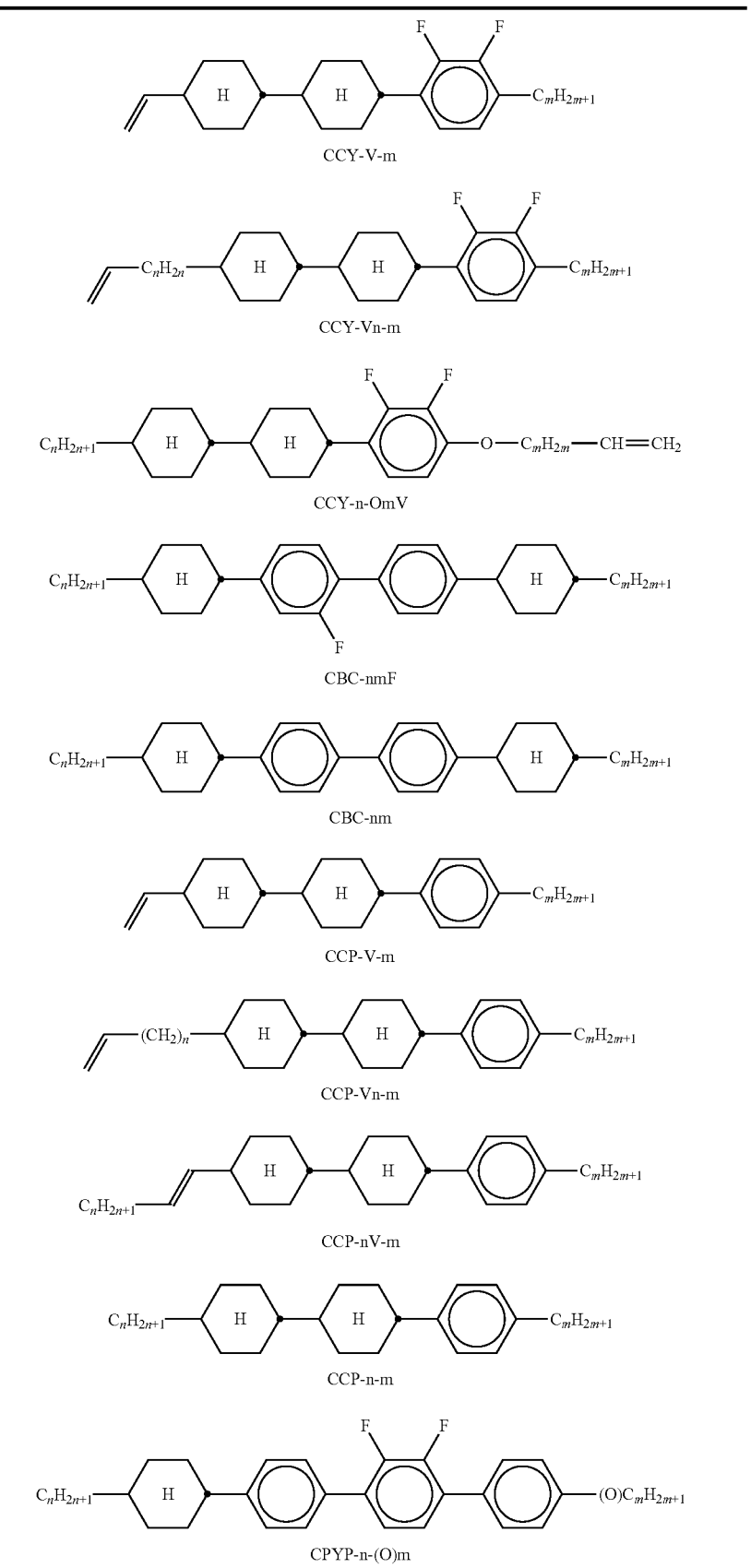

TABLE A-continued
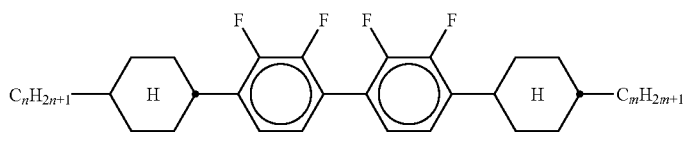
CYYC-n-m
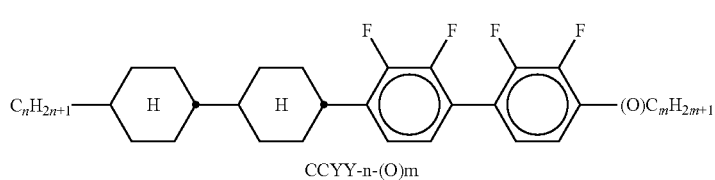
CCYY-n-(O)m
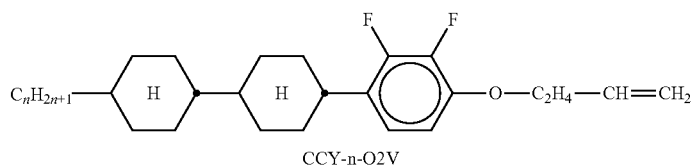
CCY-n-O2V
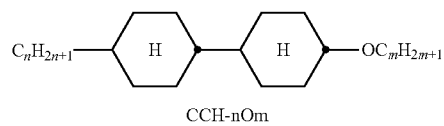
CCH-nOm
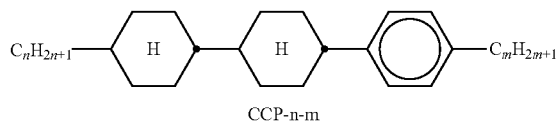
CCP-n-m
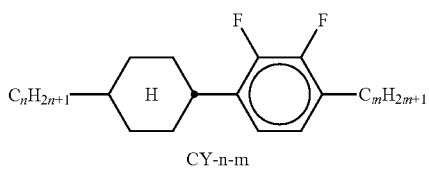
CY-n-m
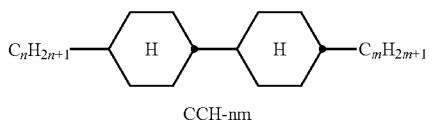
CCH-nm
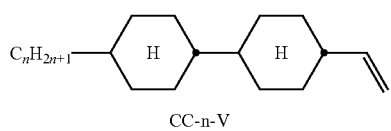
CC-n-V
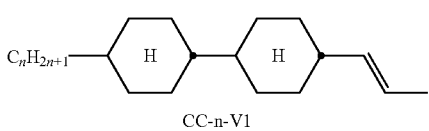
CC-n-V1
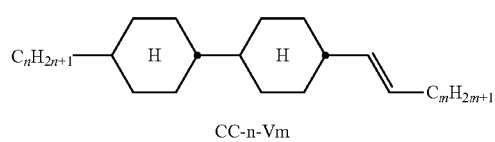
CC-n-Vm TABLE A-continued
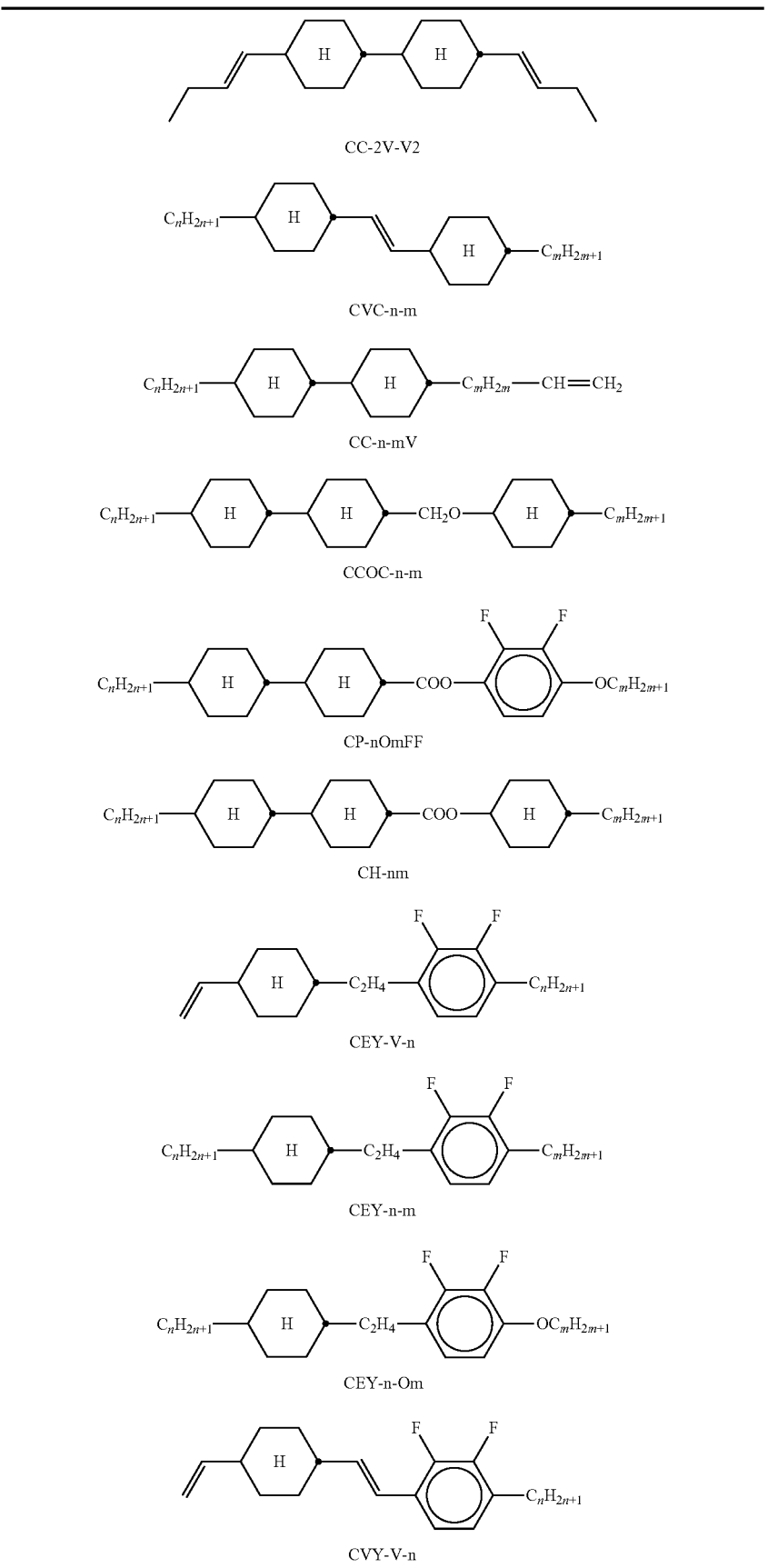

TABLE A-continued
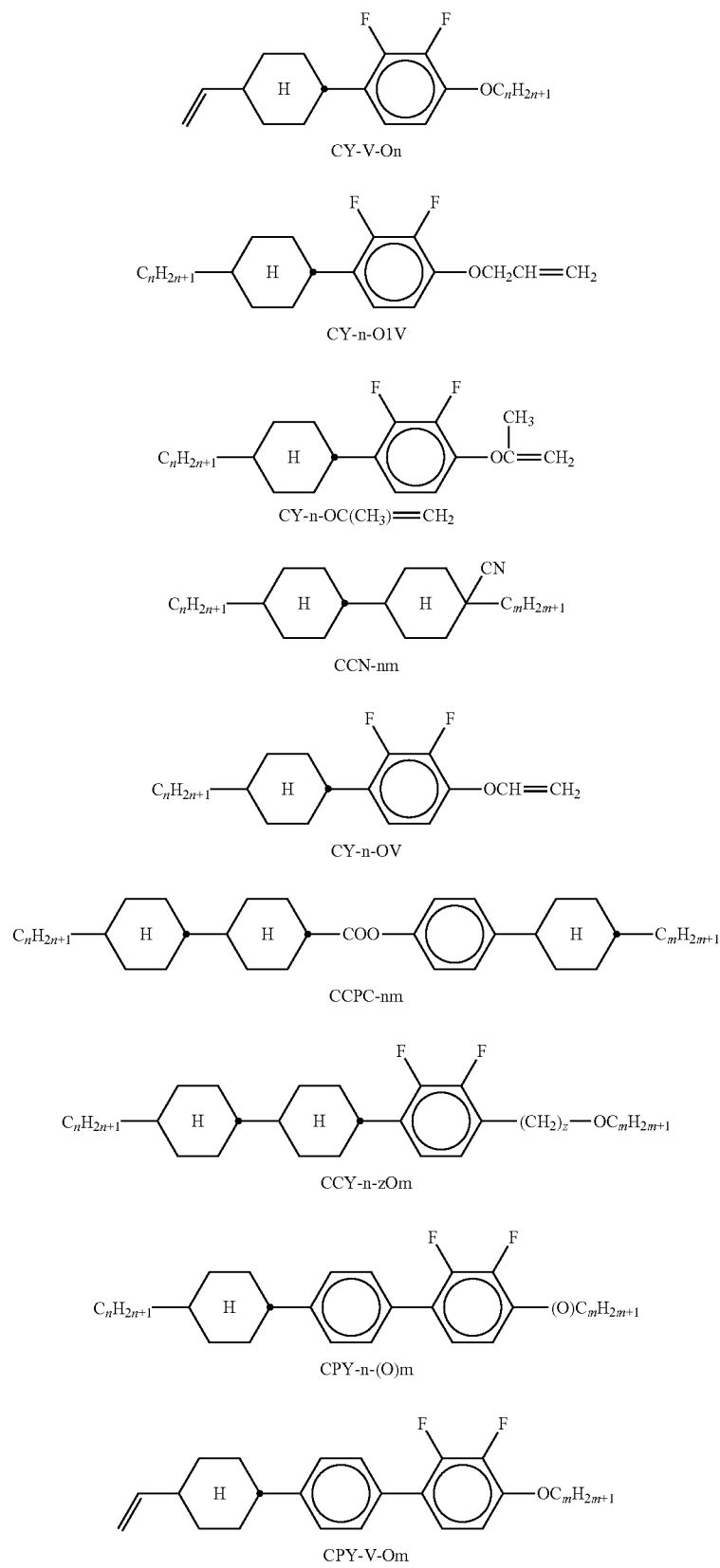

TABLE A-continued
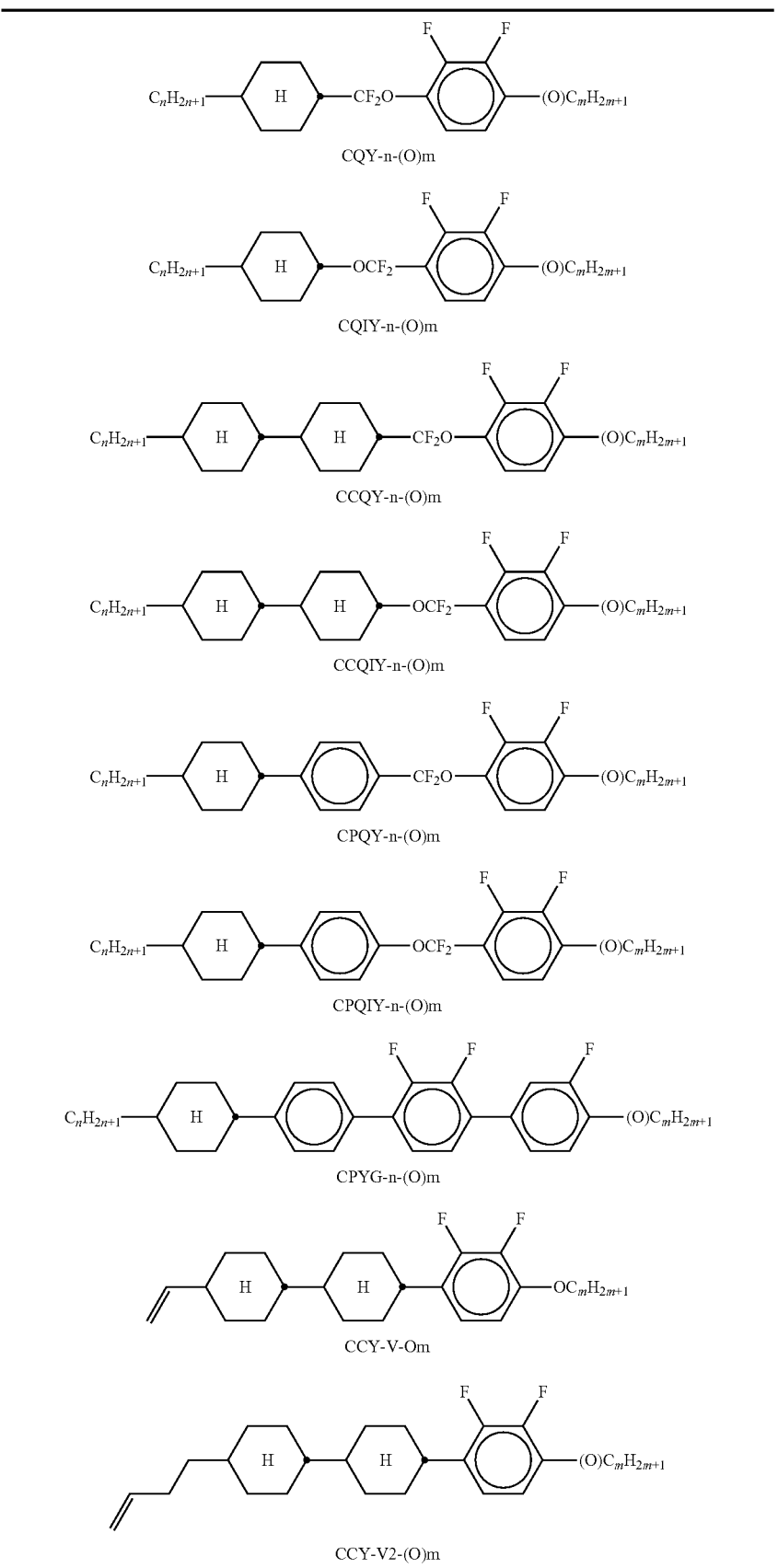

TABLE A-continued
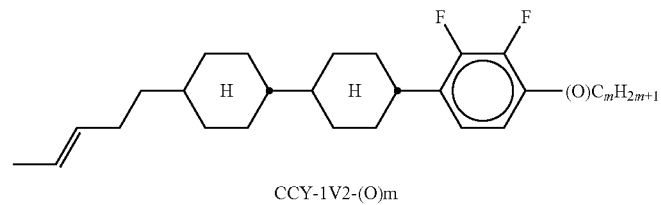
CCY-1V2-(O)m
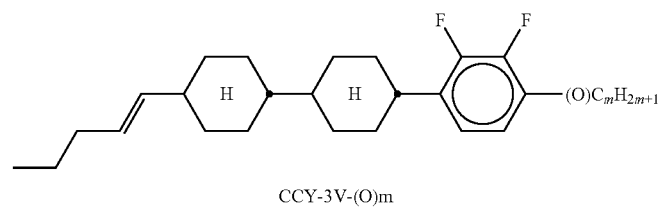
CCY-3V-(O)m
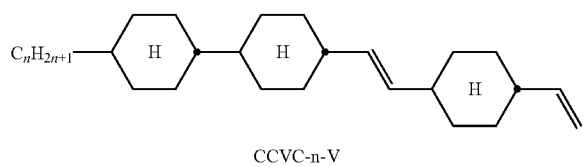
CCVC-n-V
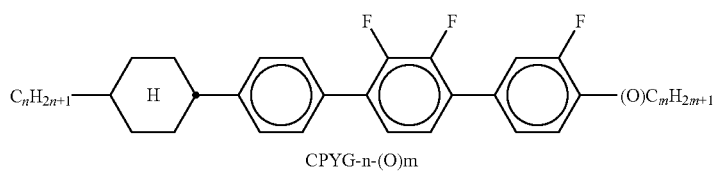
CPYG-n-(O)m
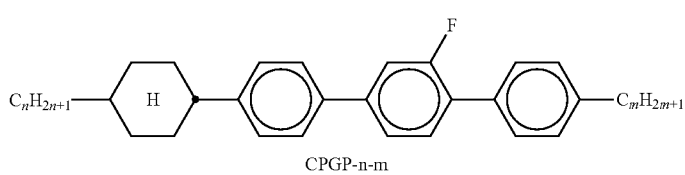
CPGP-n-m
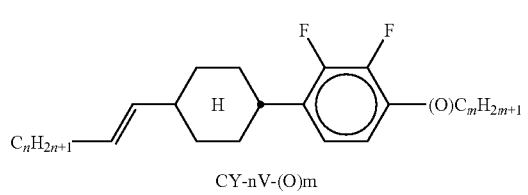
CY-nV-(O)m
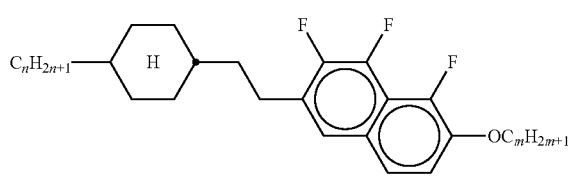
CENaph-n-Om
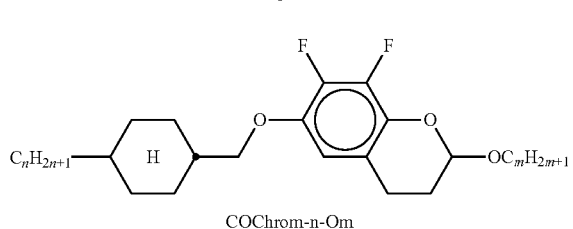
COChrom-n-Om TABLE A-continued
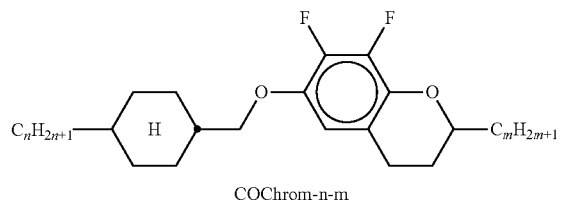
COChrom-n-m
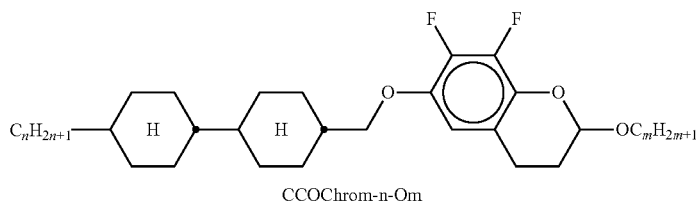
CCOChrom-n-Om
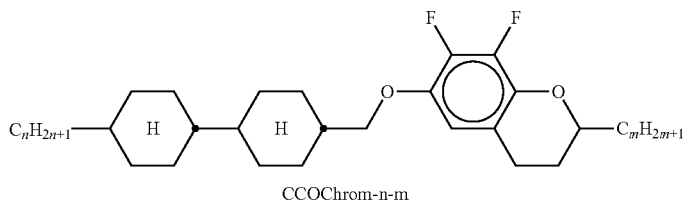
CCOChrom-n-m
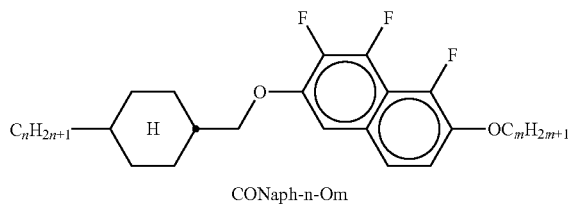
CONaph-n-Om
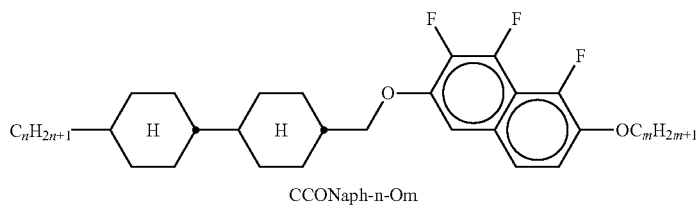
CCONaph-n-Om
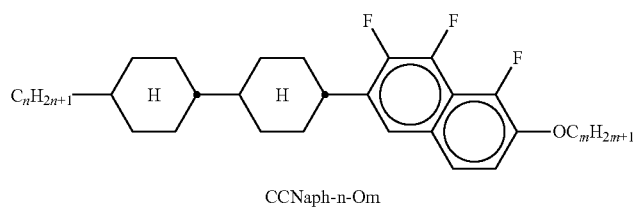
CCNaph-n-Om
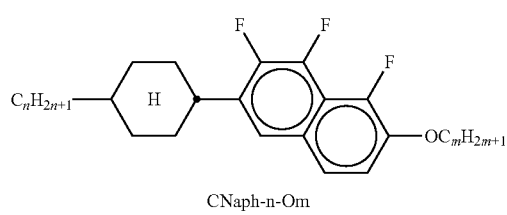
CNaph-n-Om TABLE A-continued
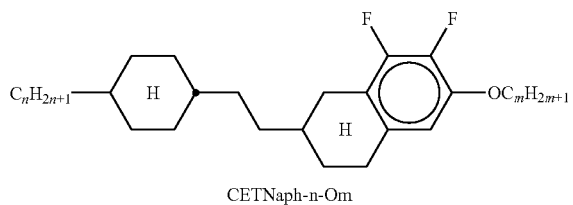
CETNaph-n-Om
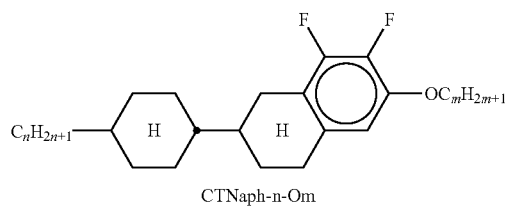
CTNaph-n-Om
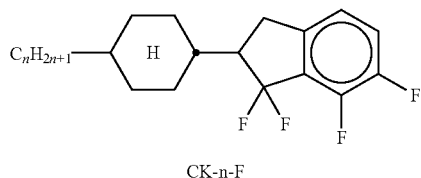
CK-n-F
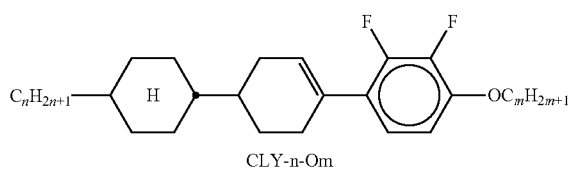
CLY-n-Om
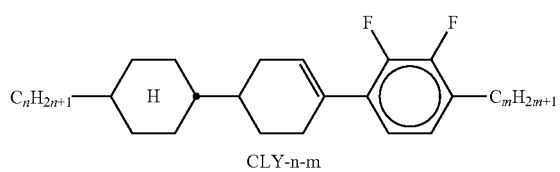
CLY-n-m
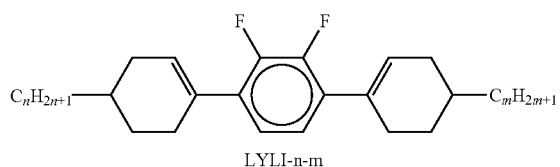
LYLI-n-m
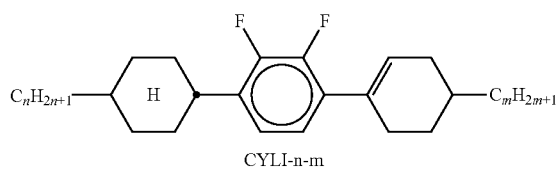
CYLI-n-m
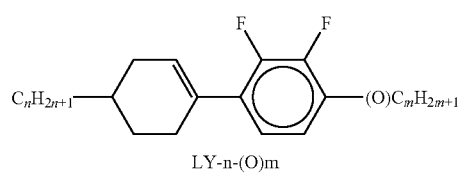
LY-n-(O)m TABLE A-continued
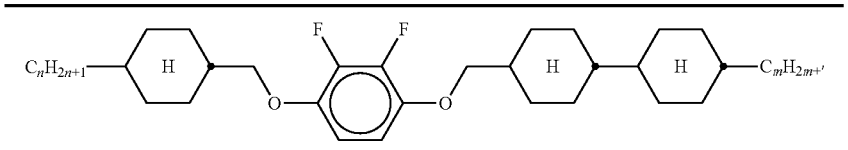
COYOICC-n-m
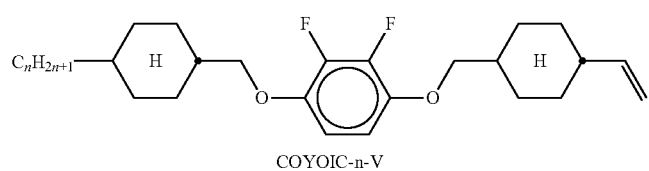
COYOIC-n-V
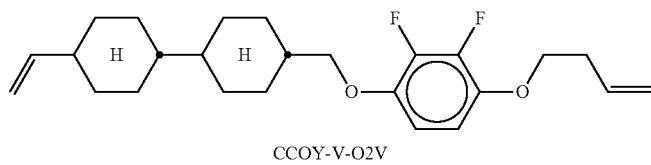
CCOY-V-O2V
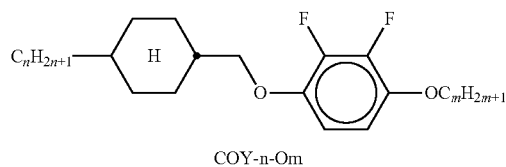
COY-n-Om
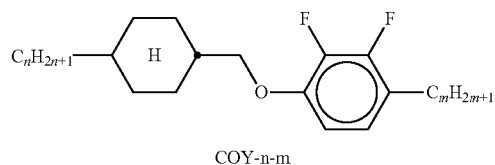
COY-n-m
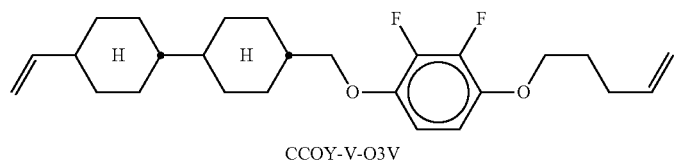
CCOY-V-O3V
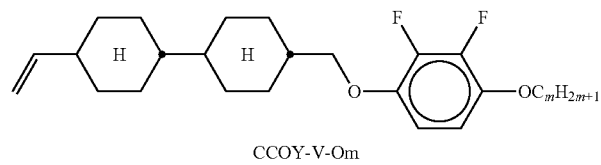
CCOY-V-Om
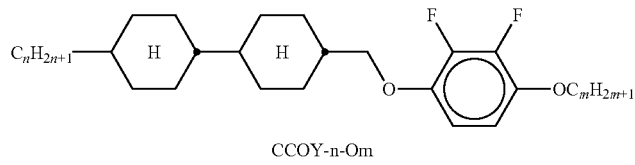
CCOY-n-Om
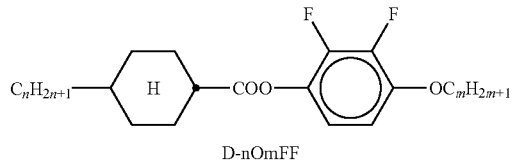
D-nOmFF TABLE A-continued
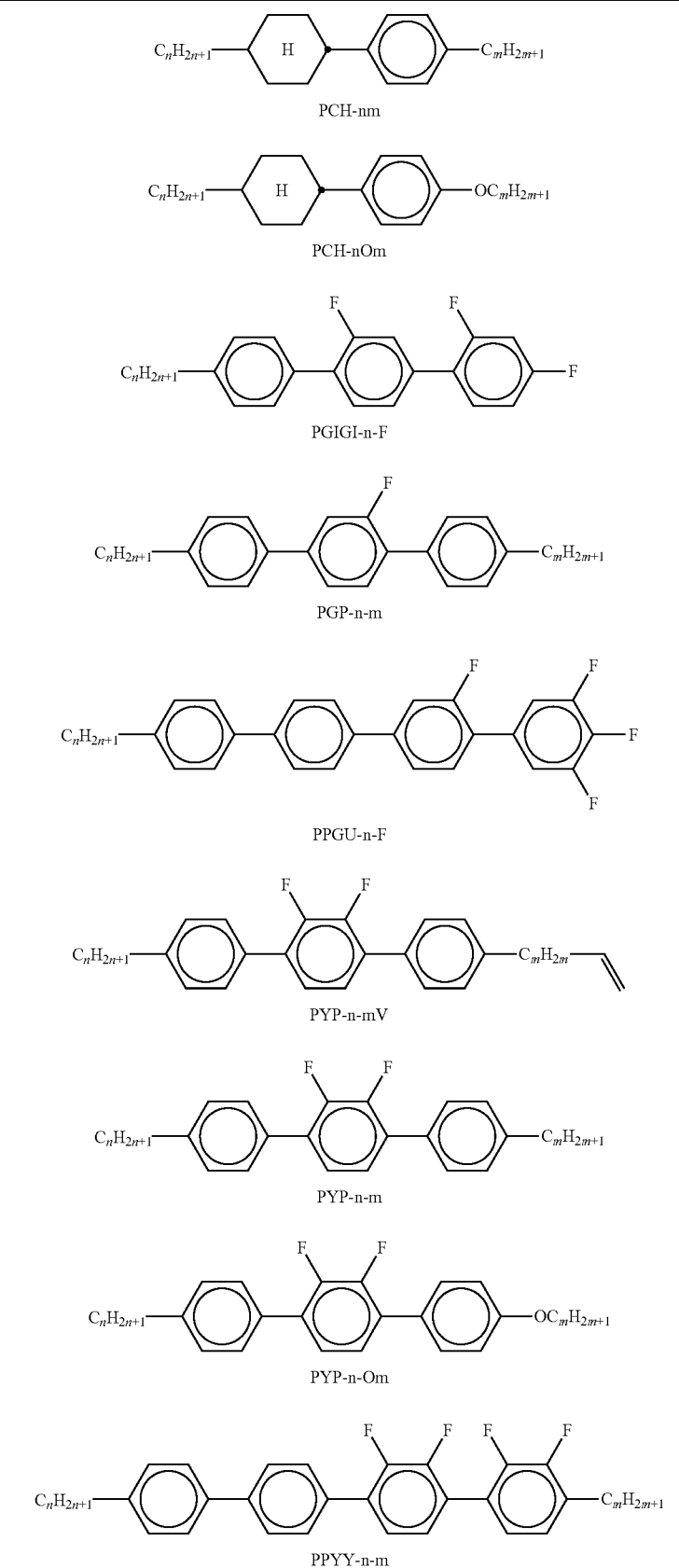

TABLE A-continued
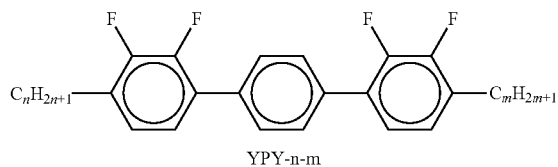
YPY-n-m
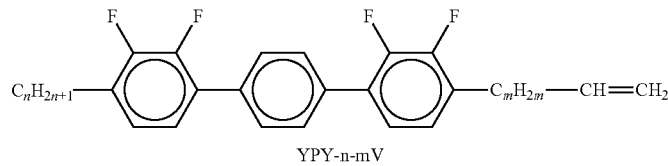
YPY-n-mV
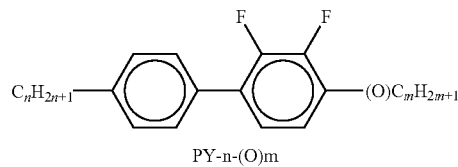
PY-n-(O)m
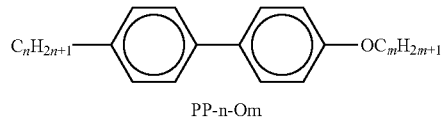
PP-n-Om
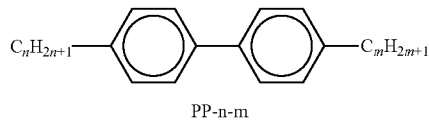
PP-n-m
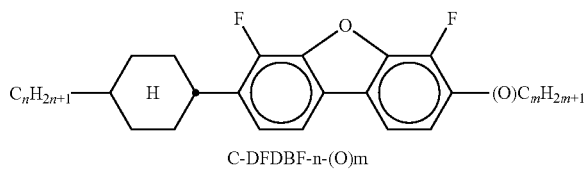
C-DFDBF-n-(O)m
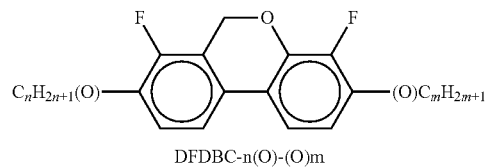
DFDBC-n(O)-(O)m
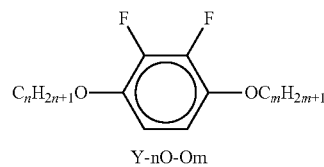
Y-nO-Om
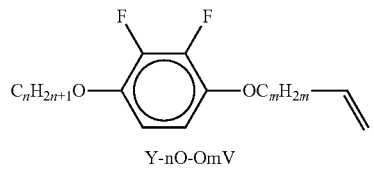
Y-nO-OmV

TABLE A-continued

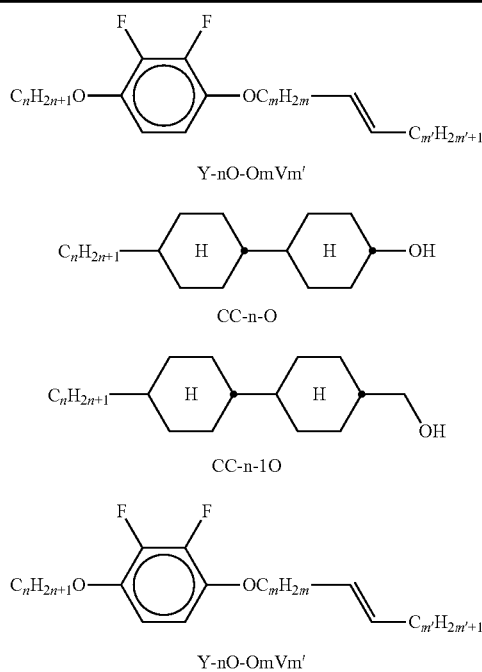

The following abbreviations are used:
(n, m, m', z: each, independently of one another, 1, 2, 3, 4, 5 or 6;
$(O)C_mH_{2m+1}$ means $OC_mH_{2m+1}$ or $C_mH_{2m+1}$)

The liquid-crystal mixtures which can be used in accordance with the invention are prepared in a manner which is conventional per se. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

By means of suitable additives, the liquid-crystal phases according to the invention can be modified in such a way that they can be employed in any type of, for example, ECB, VAN, GH or ASM-VA LCD display that has been disclosed to date.

The dielectrics may also comprise further additives known to the person skilled in the art and described in the literature, such as, for example, UV absorbers, antioxidants, nanoparticles and free-radical scavengers. For example, 0-15% of pleochroic dyes, stabilisers or chiral dopants may be added. Suitable stabilisers for the mixtures according to the invention are, in particular, those listed in Table B.

For example, 0-15% of pleochroic dyes may be added, furthermore conductive salts, preferably ethyldimethyldodecylammonium 4-hexoxybenzoate, tetrabutylammonium tetraphenylboranate or complex salts of crown ethers (cf., for example, Haller et al., Mol. Cryst. Liq. Cryst. Volume 24, pages 249-258 (1973)), may be added in order to improve the conductivity or substances may be added in order to modify the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728. Table B shows possible dopants which can be added to the mixtures according to the invention. If the mixtures comprise a dopant, it is employed in amounts of 0.01-4% by weight, preferably 0.1-1.0% by weight.

TABLE B

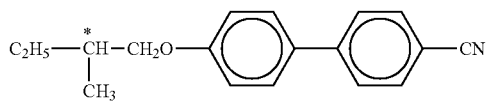

C 15

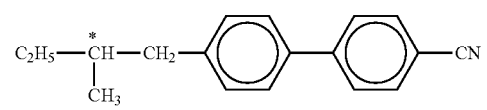

CB 15

TABLE B-continued
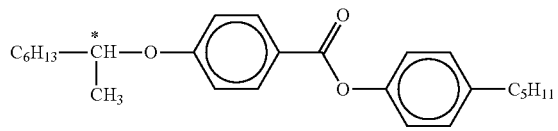
CM 21
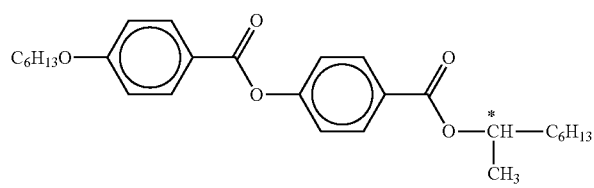
R/S-811
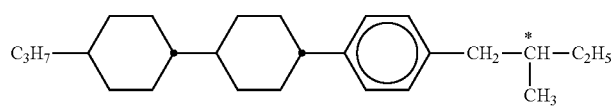
CM 44
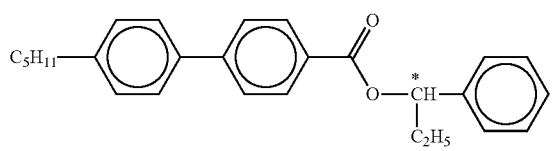
CM 45
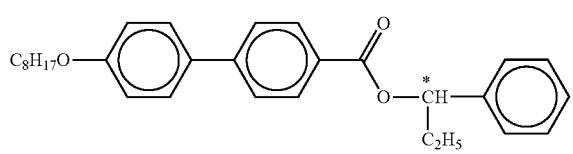
CM 47
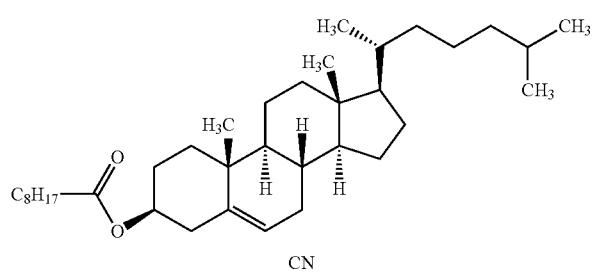
CN
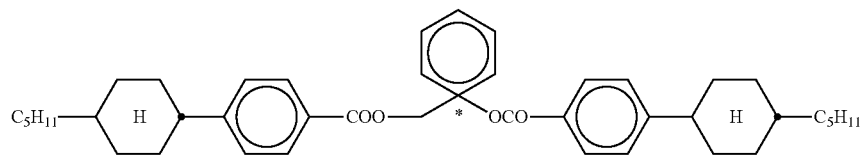
R/S-1011
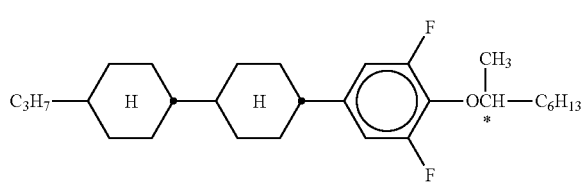
R/S-2011

TABLE B-continued

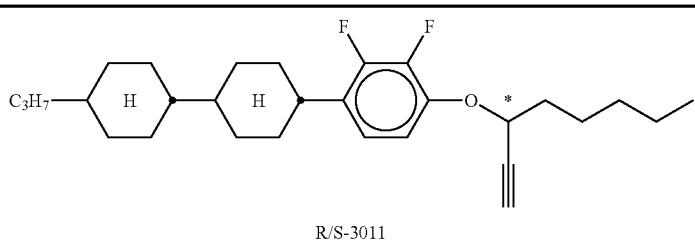

R/S-3011

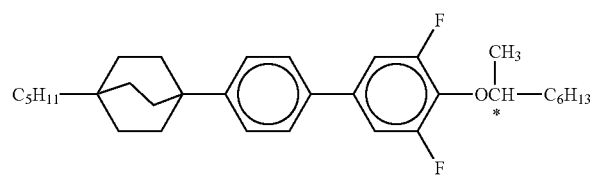

R/S-4011

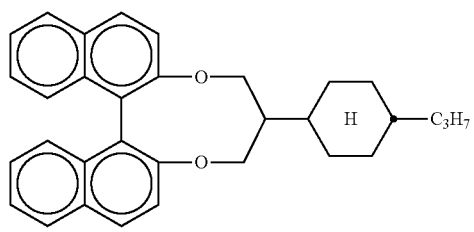

R/S-5011

Stabilisers which can be added, for example, to the mixtures according to the invention in amounts of up to 10% by weight, based on the total amount of the mixture, preferably 0.01 to 6% by weight, in particular 0.1 to 3% by weight, are shown below in Table C. Preferred stabilisers are, in particular, BHT derivatives, for example 2,6-di-tert-butyl-4-alkylphenols, and Tinuvin 770.

TABLE C

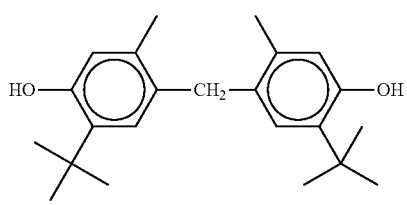

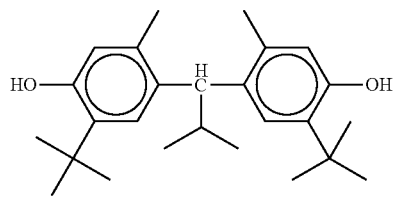

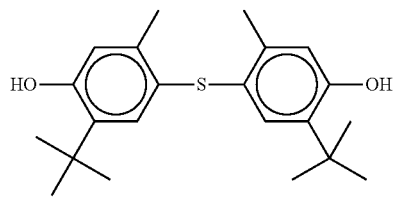

TABLE C-continued
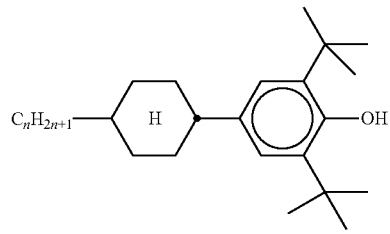
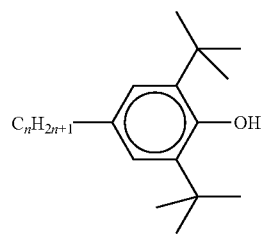
n is preferably 1, 2, 3, 4, 5, 6 or 7
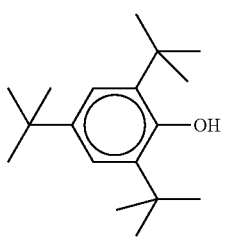
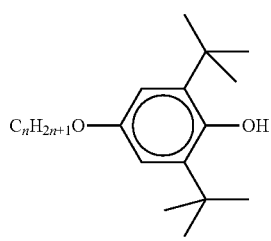
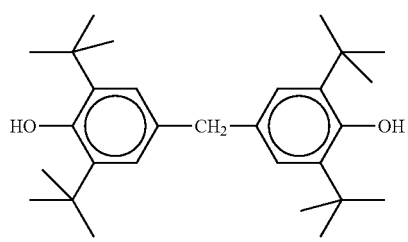
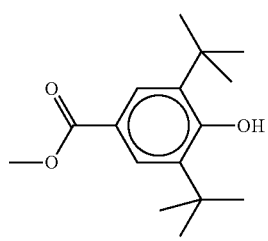

TABLE C-continued
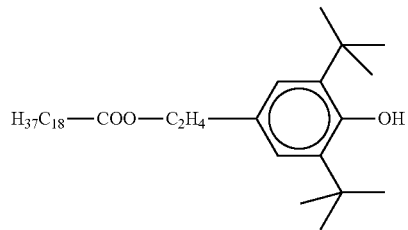
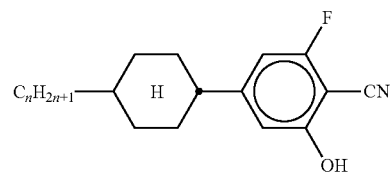
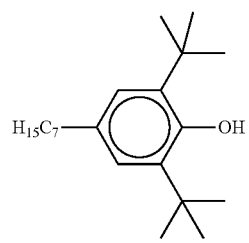
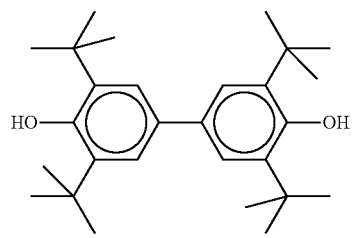
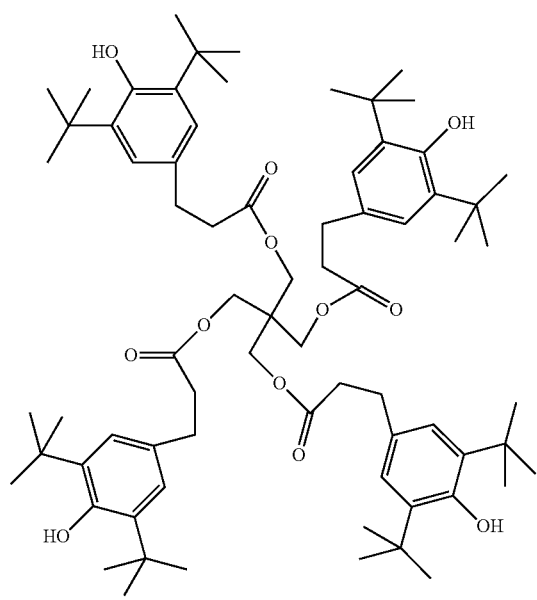 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]

TABLE C-continued
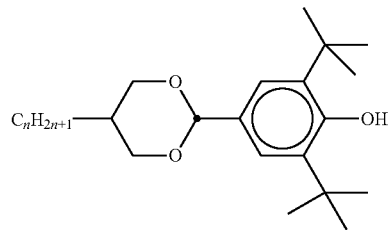
n = 1, 2, 3, 4, 5, 6 or 7
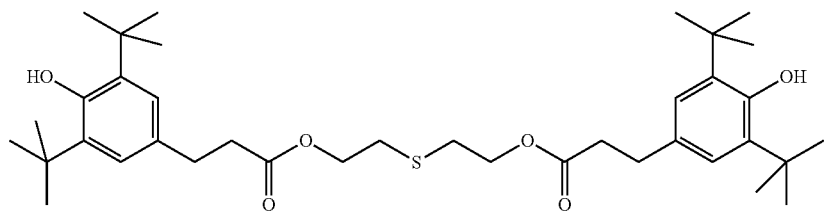 [SMILES: CC(C)(C)c1cc(CCC(=O)OCCSCCOC(=O)CCc2cc(C(C)(C)C)c(O)c(C(C)(C)C)c2)cc(C(C)(C)C)c1O]
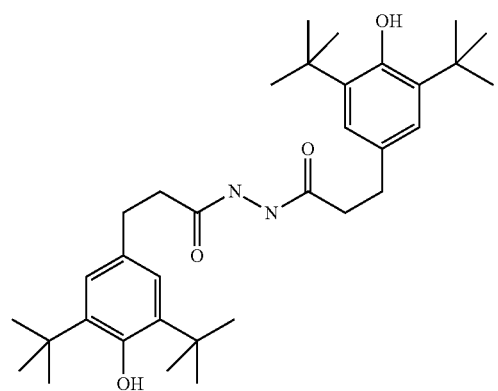 [SMILES: CC(C)(C)c1cc(CCC(=O)NNC(=O)CCc2cc(C(C)(C)C)c(O)c(C(C)(C)C)c2)cc(C(C)(C)C)c1O]
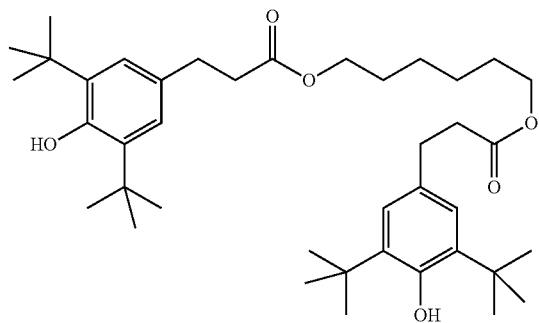 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]
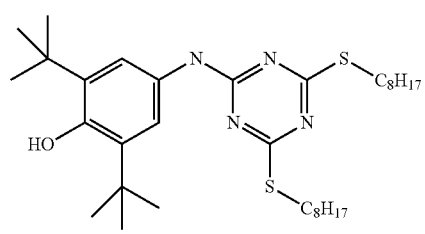

TABLE C-continued
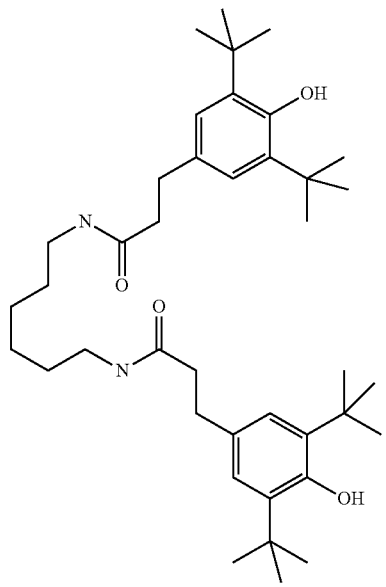 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
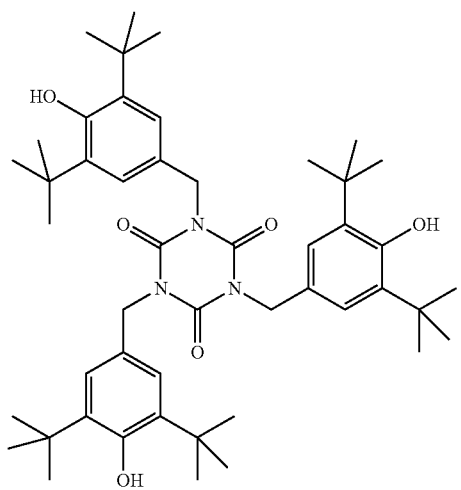 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
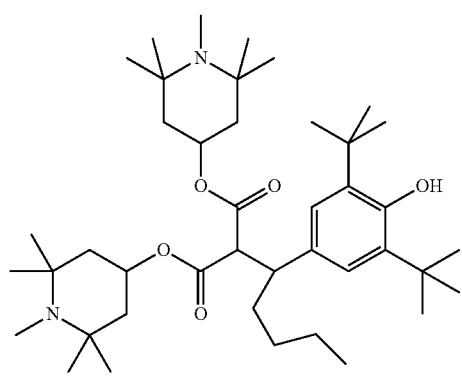 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]

TABLE C-continued
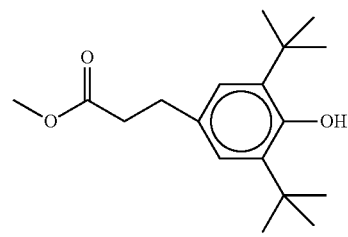
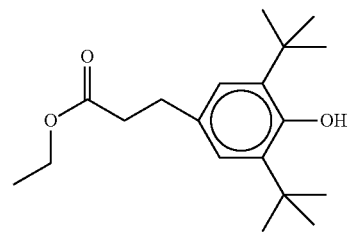
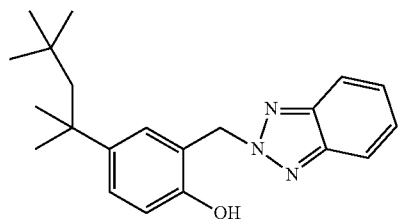 [SMILES: CC(C)(C)CC(C)(C)c1ccc(O)c(Cn2nc3ccccc3n2)c1]
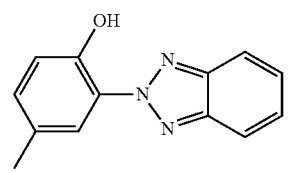 [SMILES: Cc1ccc(O)c(-n2nc3ccccc3n2)c1]
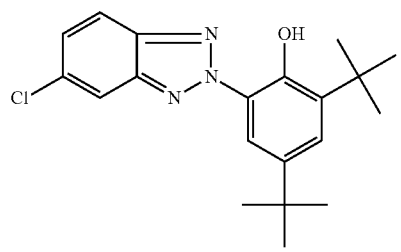 [SMILES: CC(C)(C)c1cc(-n2nc3ccc(Cl)cc3n2)c(O)c(C(C)(C)C)c1]
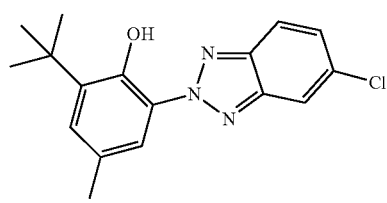 [SMILES: Cc1cc(-n2nc3ccc(Cl)cc3n2)c(O)c(C(C)(C)C)c1]

TABLE C-continued
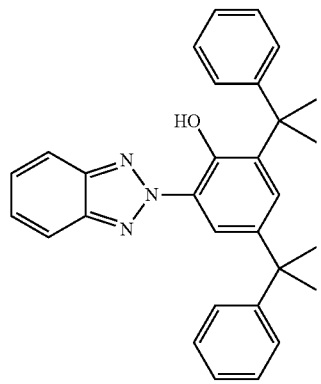 [SMILES: CC(C)(c1ccccc1)c1cc(-n2nc3ccccc3n2)c(O)c(C(C)(C)c2ccccc2)c1]
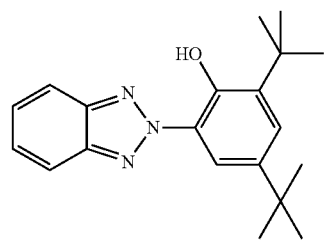 [SMILES: CC(C)(C)c1cc(-n2nc3ccccc3n2)c(O)c(C(C)(C)C)c1]
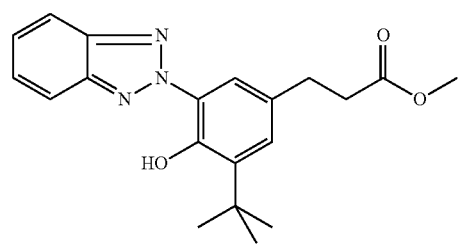 [SMILES: COC(=O)CCc1cc(-n2nc3ccccc3n2)c(O)c(C(C)(C)C)c1]
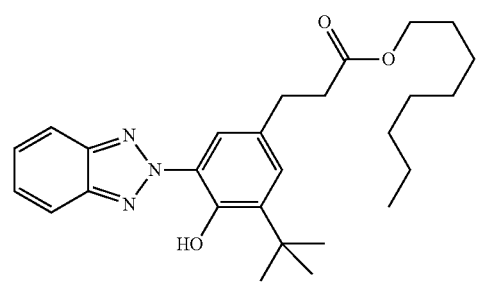 [SMILES: CCCCCCCCOC(=O)CCc1cc(-n2nc3ccccc3n2)c(O)c(C(C)(C)C)c1]

TABLE C-continued
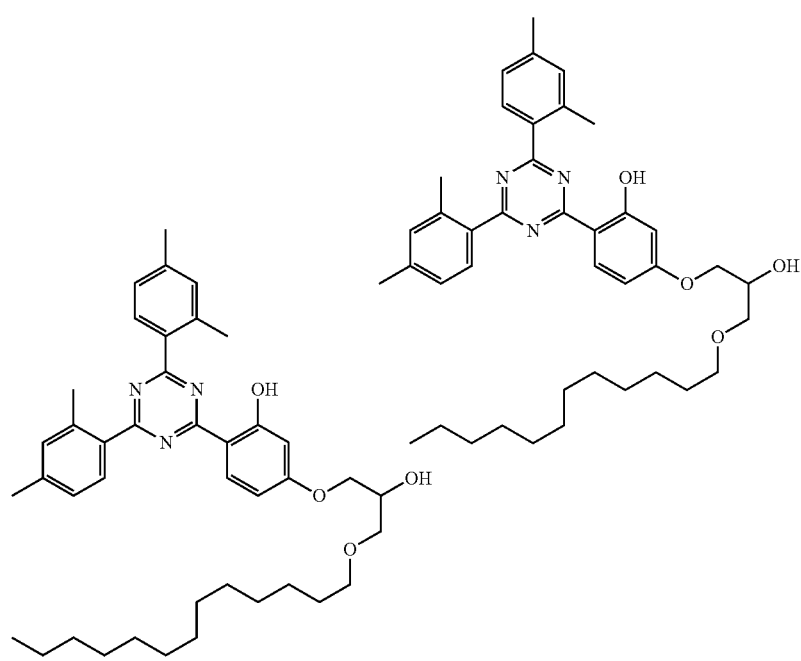
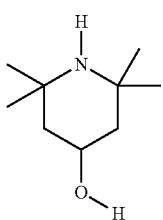
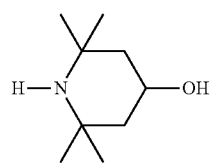
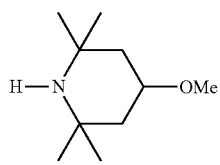
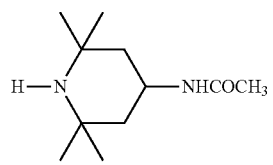
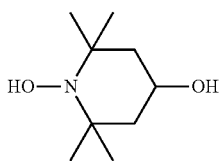

TABLE C-continued
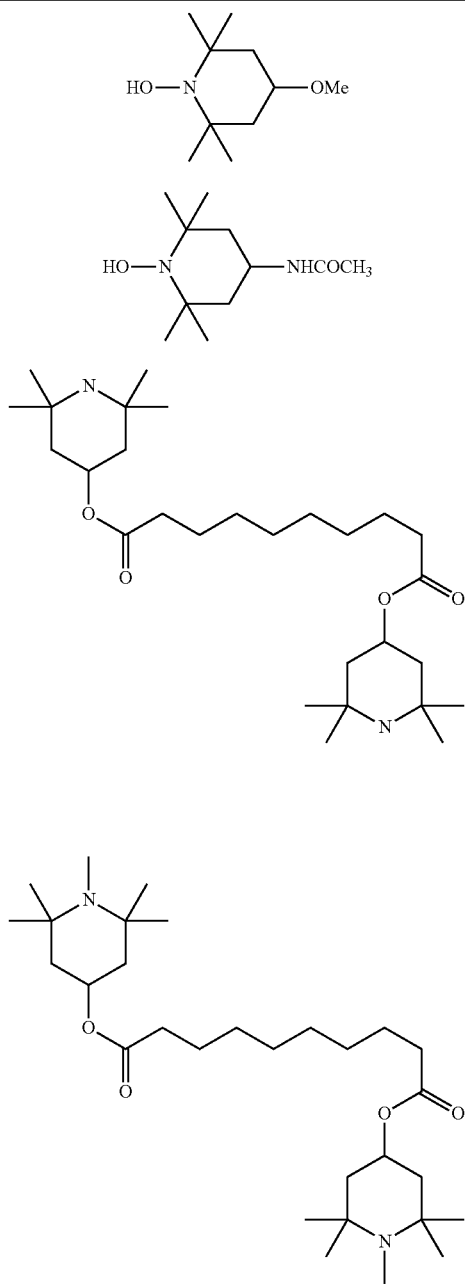
(n = 1-12)
Suitable reactive mesogens for use in the mixtures according to the invention, preferably in PSA and PS-VA applications are shown in Table D below:
TABLE D
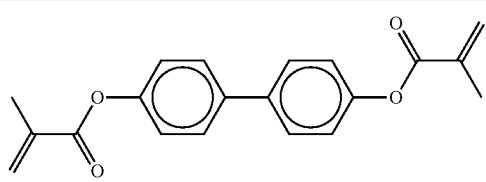
RM-1

TABLE D-continued
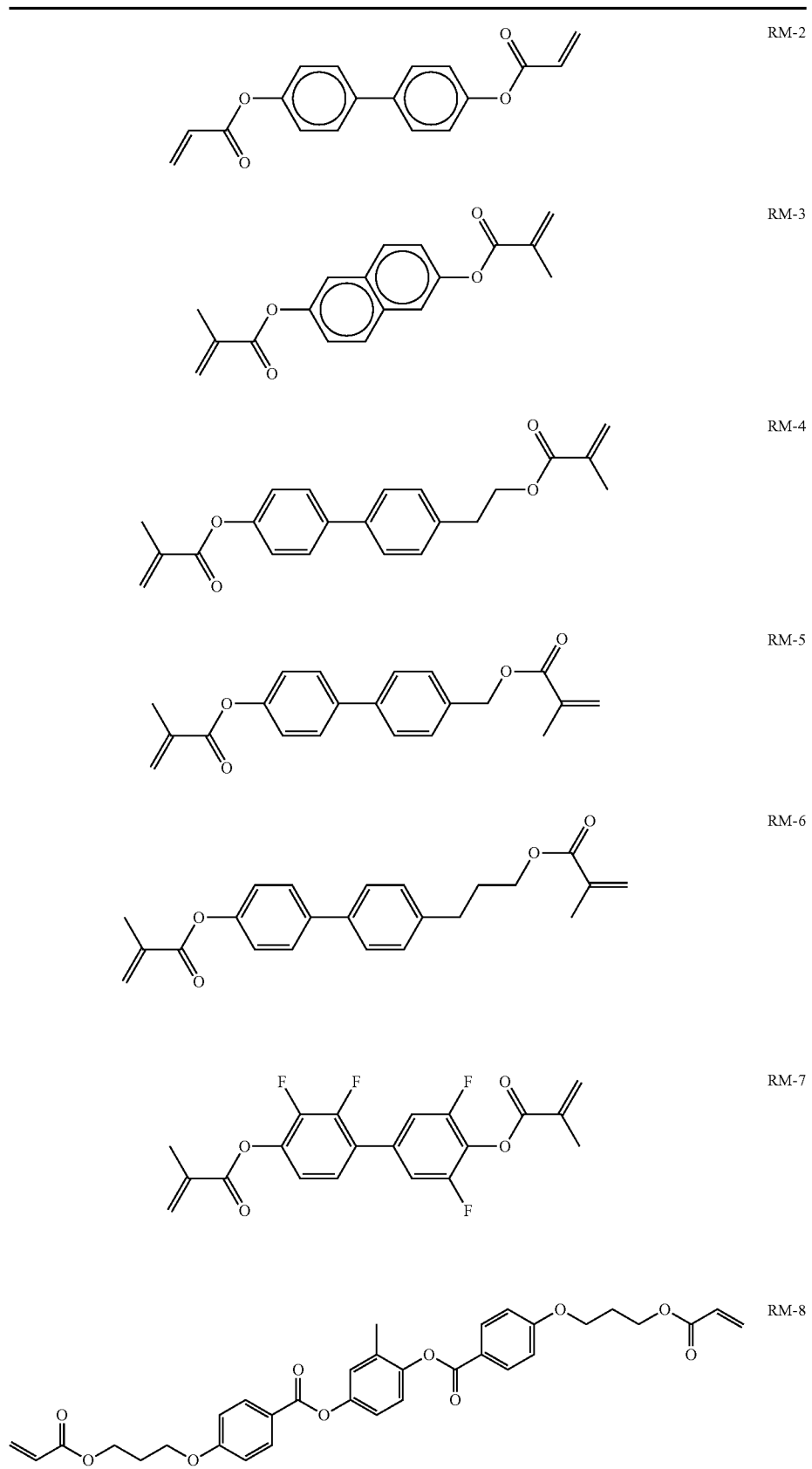

TABLE D-continued
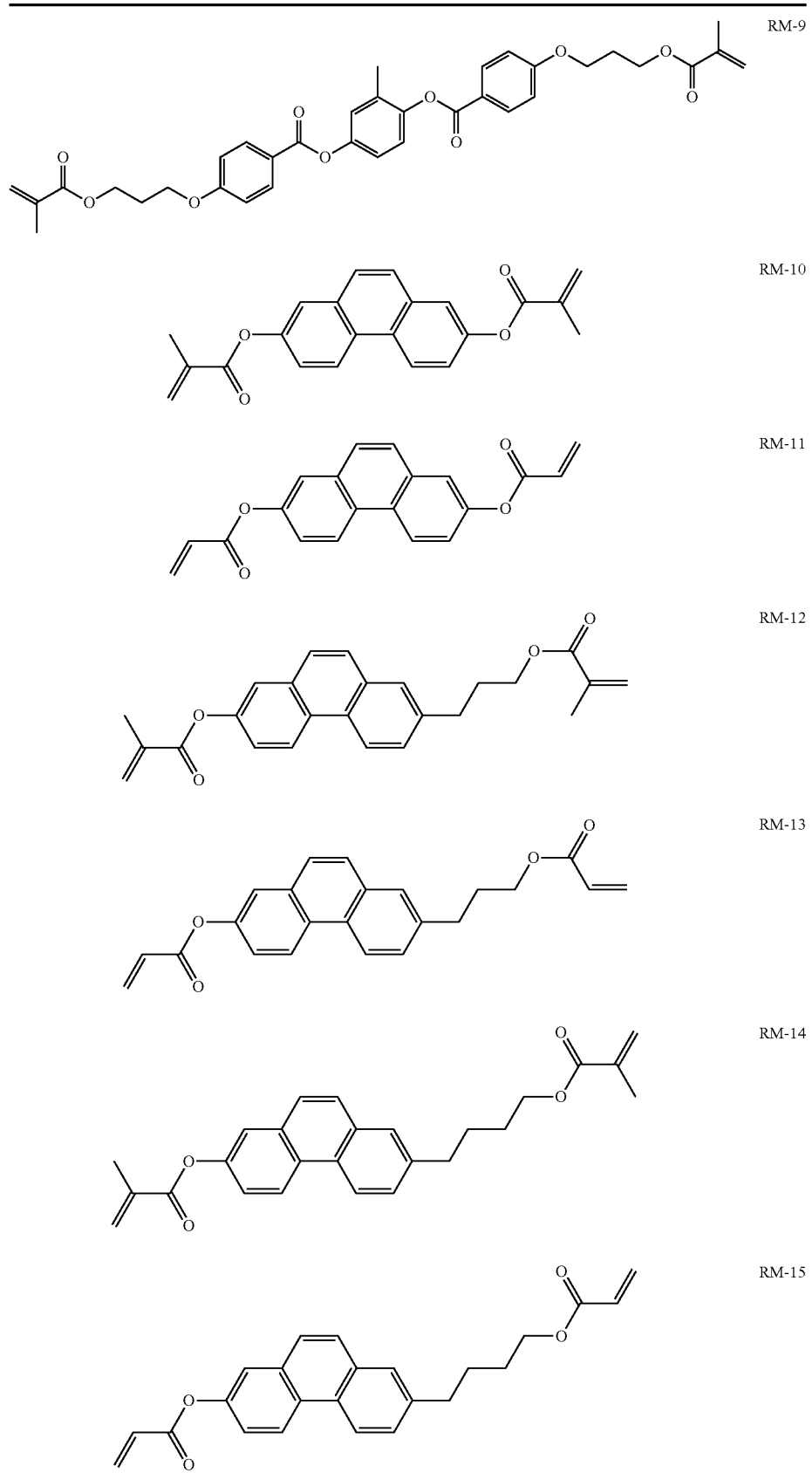

TABLE D-continued
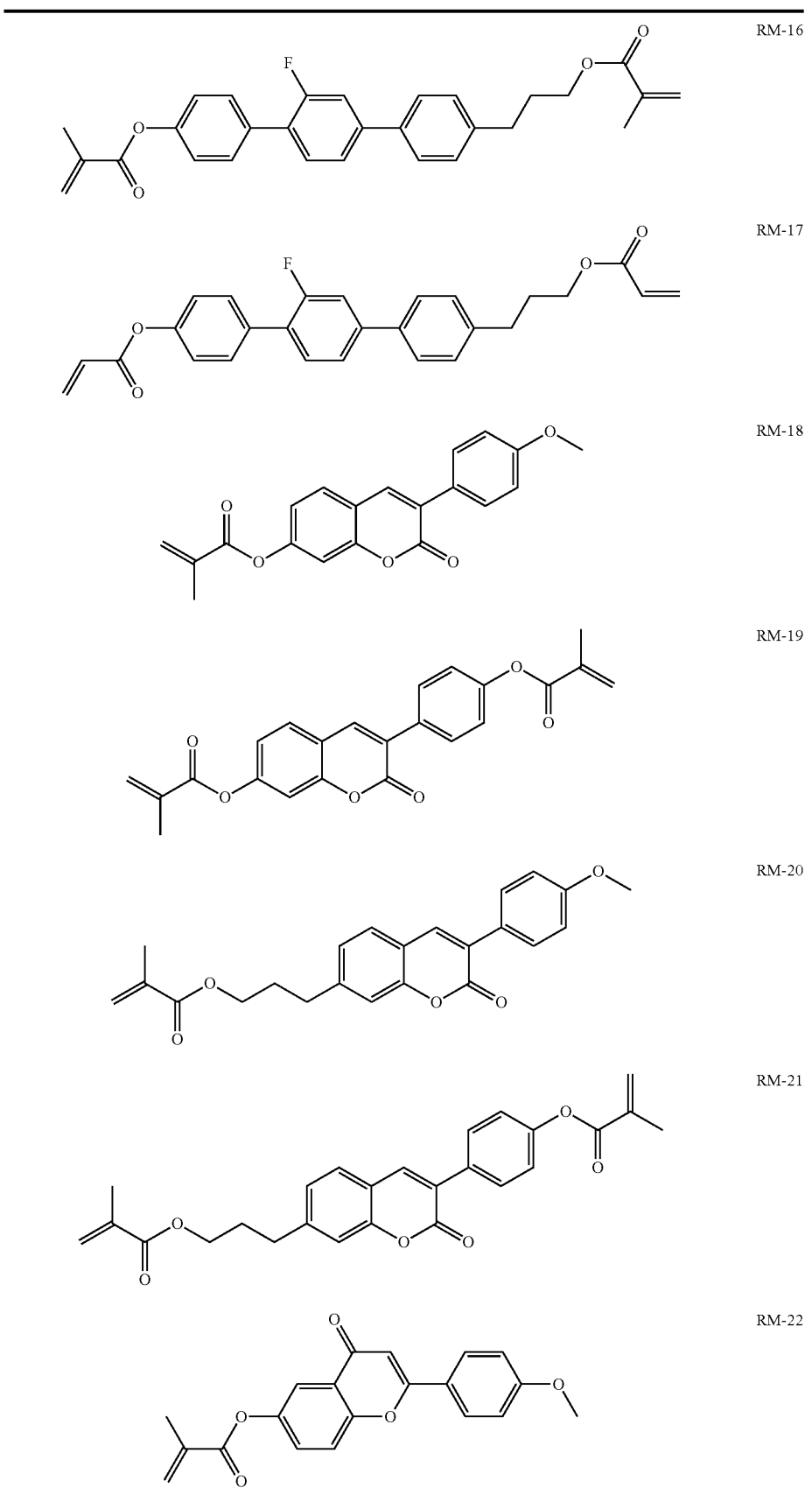

TABLE D-continued
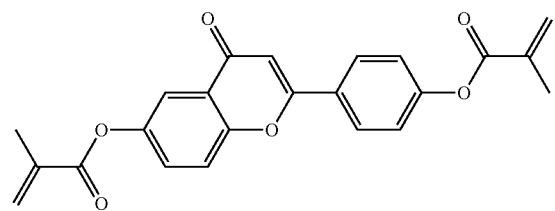 [SMILES: C=C(C)C(=O)Oc1ccc(-c2cc(=O)c3cc(OC(=O)C(=C)C)ccc3o2)cc1]
RM-23
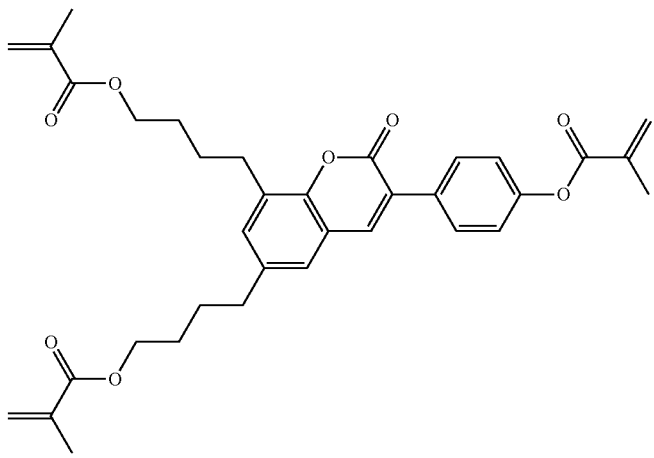 [SMILES: C=C(C)C(=O)OCCCCc1cc(CCCCOC(=O)C(=C)C)c2oc(=O)c(-c3ccc(OC(=O)C(=C)C)cc3)cc2c1]
RM-24
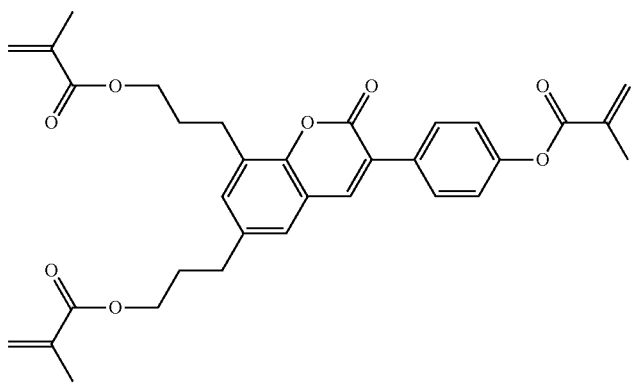 [SMILES: C=C(C)C(=O)OCCCc1cc(CCCOC(=O)C(=C)C)c2oc(=O)c(-c3ccc(OC(=O)C(=C)C)cc3)cc2c1]
RM-25
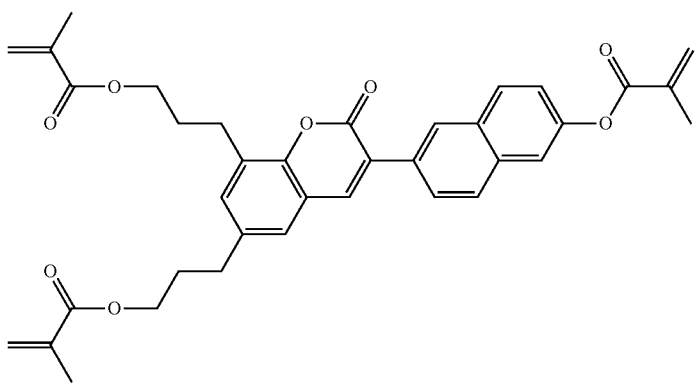 [SMILES: C=C(C)C(=O)OCCCc1cc(CCCOC(=O)C(=C)C)c2oc(=O)c(-c3ccc4cc(OC(=O)C(=C)C)ccc4c3)cc2c1]
RM-26

TABLE D-continued
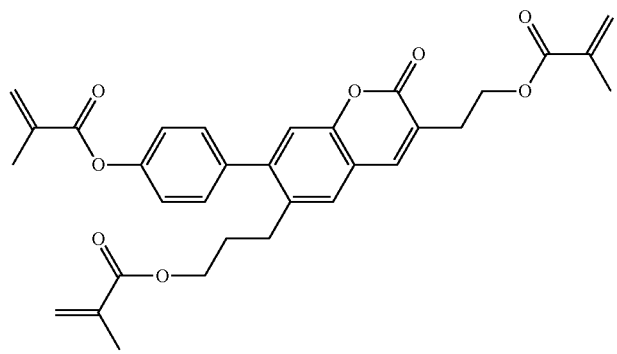 [SMILES: C=C(C)C(=O)OCCCc1cc2cc(CCOC(=O)C(=C)C)c(=O)oc2cc1-c1ccc(OC(=O)C(=C)C)cc1]
RM-27
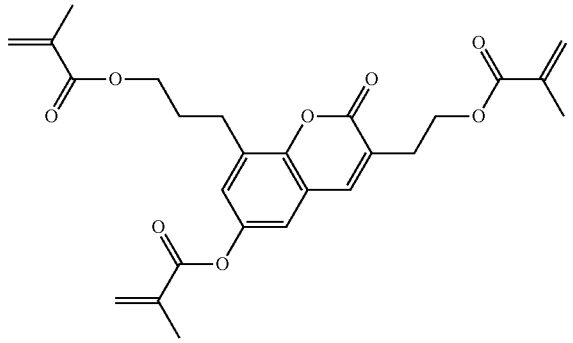 [SMILES: C=C(C)C(=O)OCCCc1cc(OC(=O)C(=C)C)cc2cc(CCOC(=O)C(=C)C)c(=O)oc12]
RM-28
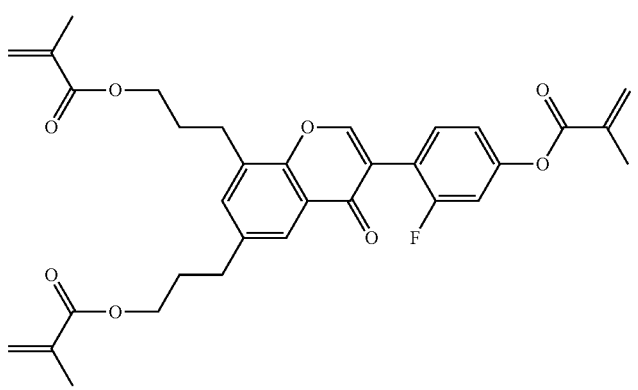 [SMILES: C=C(C)C(=O)OCCCc1cc(CCCOC(=O)C(=C)C)c2occ(-c3ccc(OC(=O)C(=C)C)cc3F)c(=O)c2c1]
RM-29
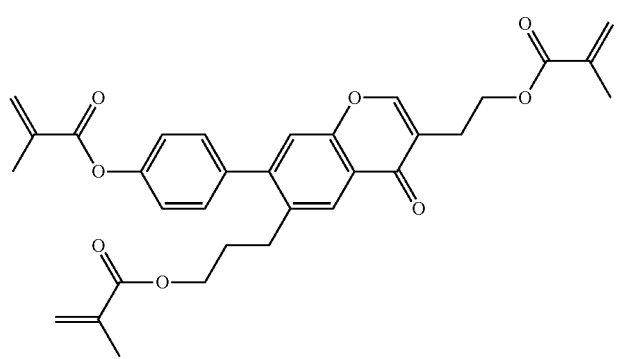 [SMILES: C=C(C)C(=O)OCCCc1cc2c(=O)c(CCOC(=O)C(=C)C)coc2cc1-c1ccc(OC(=O)C(=C)C)cc1]
RM-30

TABLE D-continued
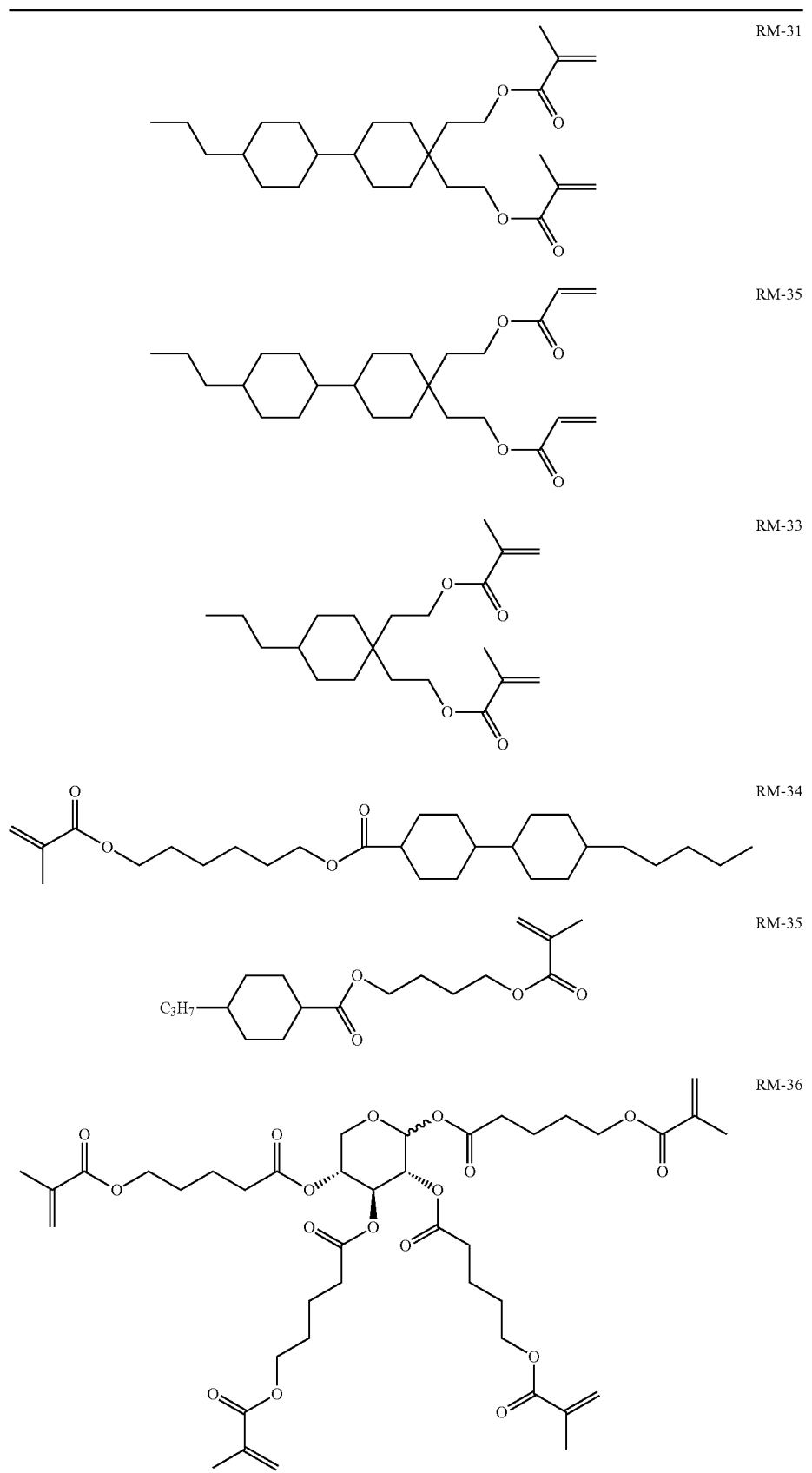

TABLE D-continued
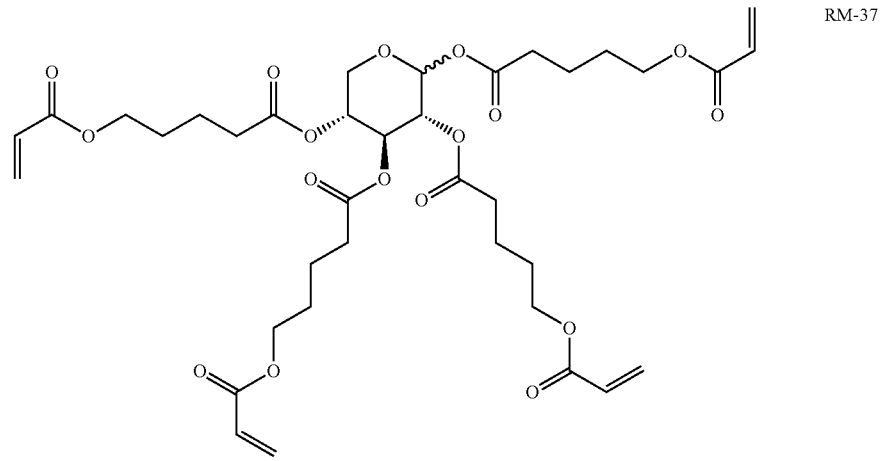
RM-37
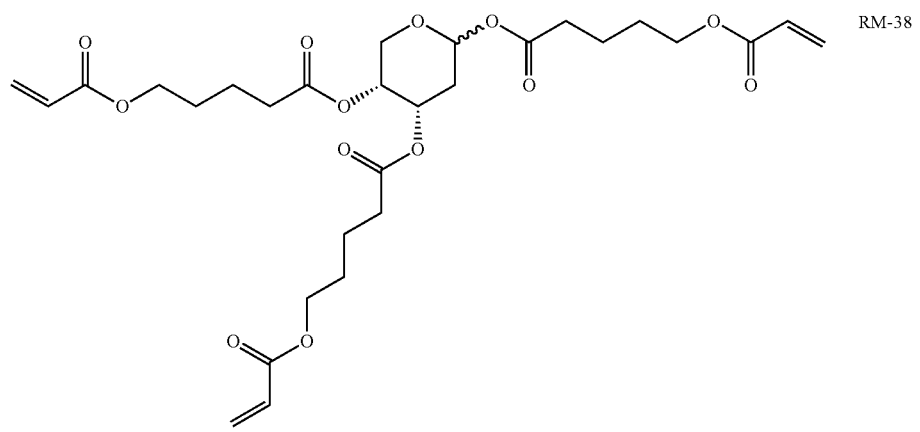
RM-38
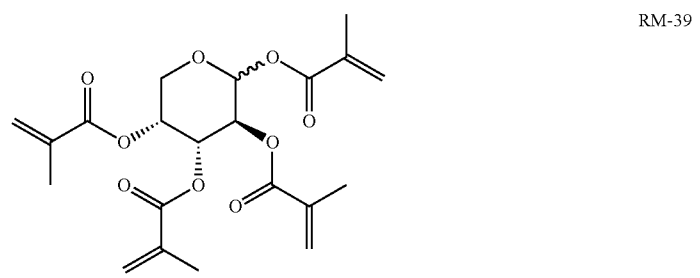
RM-39
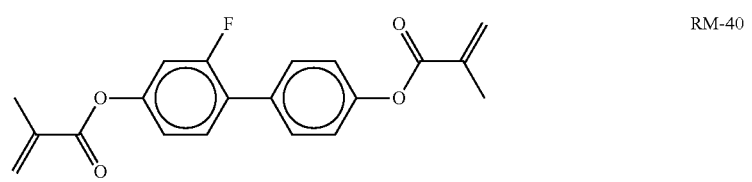
RM-40
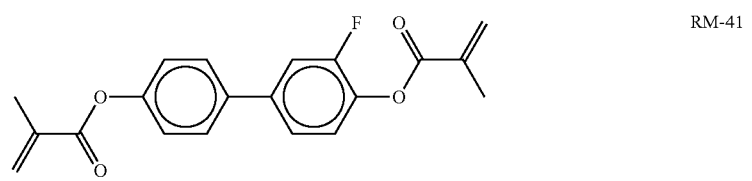
RM-41

TABLE D-continued

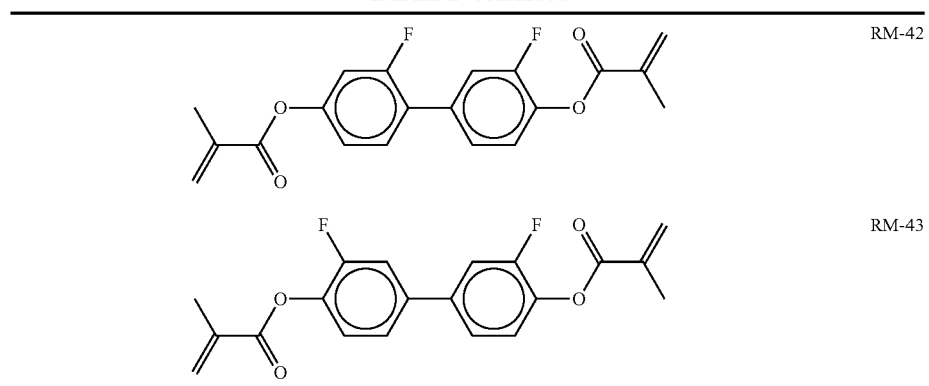

RM-42

RM-43

WORKING EXAMPLES

The following examples are intended to explain the invention without restricting it. In the examples, m.p. denotes the melting point and C denotes the clearing point of a liquid-crystalline substance in degrees Celsius; boiling points are denoted by b.p. Furthermore:

C denotes crystalline solid state, S denotes smectic phase (the index denotes the phase type), N denotes nematic state, Ch denotes cholesteric phase, I denotes isotropic phase, $T_g$ denotes glass transition temperature. The number between two symbols indicates the conversion temperature in degrees Celsius.

The host mixture used for determination of the optical anisotropy $\Delta n$ of selected self-aligning additives of the formula IA, IB, IC or ID is the commercial mixture ZLI-4792 (Merck KGaA). The dielectric anisotropy $\Delta\epsilon$ is determined using commercial mixture ZLI-2857. The physical data of the compound to be investigated are obtained from the change in the dielectric constants of the host mixture after addition of the compound to be investigated and extrapolation to 100% of the compound employed. In general, ≤10% of the additives of the formula IA, IB, IC and/or ID to be investigated are dissolved in the host mixture, depending on the solubility.

Unless indicated otherwise, parts or percent data denote parts by weight or percent by weight.

Conventional work-up means: water is added, the mixture is extracted with methylene chloride, the phases are separated, the organic phase is dried and evaporated, and the product is purified by crystallisation and/or chromatography.

The following self-aligning additives of the formula IA, IB, IC and ID are analyzed:

Compound No. 1

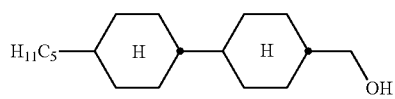

Compound No. 2

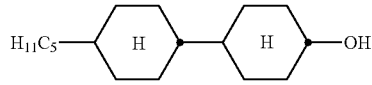

Compound No. 3

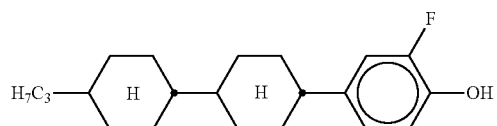

Compound No. 4

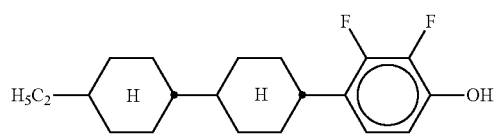

Compound No. 5

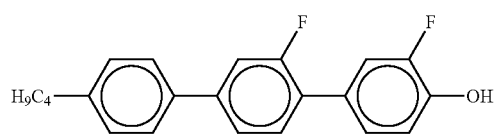

Compound No. 6

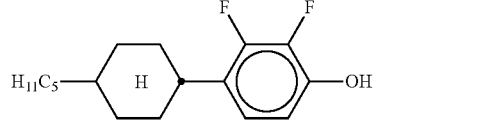

Compound No. 7

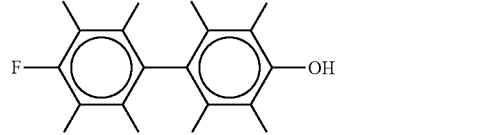

Compound No. 8

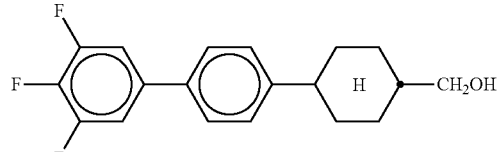

Compound No. 9

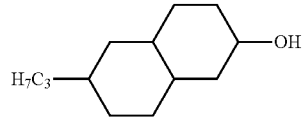

-continued

Compound No. 10

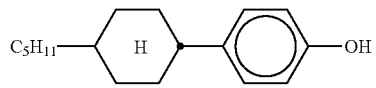

Compound No. 11

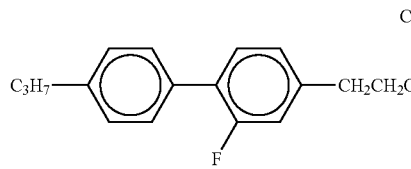

Compound No. 12

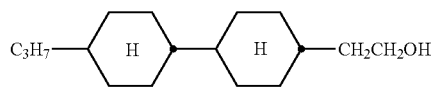

Compound No. 13

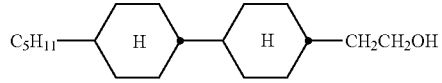

Compound No. 14

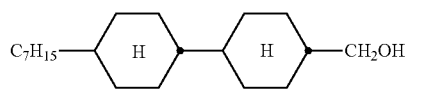

Compound No. 15

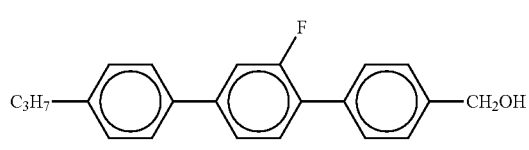

Compound No. 16

Above and below, $V_0$ denotes the threshold voltage, capacitive [V] at 20° C.

$\Delta n$ denotes the optical anisotropy measured at 20° C. and 589 nm $\Delta \epsilon$ denotes the dielectric anisotropy at 20° C. and 1 kHz cl.p. denotes the clearing point [° C.]

$K_1$ denotes the elastic constant, "splay" deformation at 20° C. [pN]

$K_3$ denotes the elastic constant, "bend" deformation at 20° C. [pN]

$\gamma_1$ denotes the rotational viscosity measured at 20° C. [mPa·s], determined by the rotation method in a magnetic field LTS denotes the low-temperature stability (nematic phase), determined in test cells The display used for measurement of the threshold voltage has two plane-parallel outer plates at a separation of 20 μm and electrode layers with overlying alignment layers of JALS-2096 on the insides of the outer plates, which effect a homeotropic alignment of the liquid crystals.

All concentrations in this application relate to the corresponding mixture or mixture component, unless explicitly indicated otherwise. All physical properties are determined as described in "Merck Liquid Crystals, Physical Properties of Liquid Crystals", status November 1997, Merck KGaA, Germany, and apply for a temperature of 20° C., unless explicitly indicated otherwise.

MIXTURE EXAMPLES

For the production of the examples, following mixtures (host mixtures M1 to M6) based on low molecular weight liquid crystal components have been used:

| M1: Nematic host-mixture | | | |
|---|---|---|---|
| CY-3-O2 | 15.00% | Clearing point [° C.]: | 75.4 |
| CY-5-O2 | 6.00% | Δn [589 nm, 20° C.]: | 0.1077 |
| CCY-3-O2 | 3.00% | Δε [1 kHz, 20° C.]: | −3.0 |
| CLY-3-O2 | 8.00% | ε∥ [1 kHz, 20° C.]: | 3.5 |
| CPY-2-O2 | 8.00% | ε⊥ [1 kHz, 20° C.]: | 6.5 |
| CPY-3-O2 | 8.00% | K₁ [pN, 20° C.]: | 12.9 |
| PYP-2-3 | 11.50% | K₃ [pN, 20° C.]: | 14.8 |
| CC-3-V | 35.50% | γ₁ [mPa·s, 20° C.]: | 93 |
| CCP-V-1 | 5.50% | V₀ [20° C., V]: | 2.35 |

| M2: Nematic host-mixture | | | |
|---|---|---|---|
| CY-3-O2 | 15.5% | Clearing point [° C.]: | 75.1 |
| CCY-3-O3 | 8.0% | Δn [589 nm, 20° C.]: | 0.0980 |
| CCY-4-O2 | 10.0% | Δε [1 kHz, 20° C.]: | −3.0 |
| CPY-2-O2 | 5.5% | ε∥ [1 kHz, 20° C.]: | 3.4 |
| CPY-3-O2 | 11.5% | ε⊥ [1 kHz, 20° C.]: | 6.4 |
| CCH-34 | 9.25% | K₁ [pN, 20° C.]: | 13.1 |
| CCH-23 | 24.5% | K₃ [pN, 20° C.]: | 13.3 |
| PYP-2-3 | 8.75% | γ₁ [mPa·s, 20° C.]: | 113 |
| PCH-301 | 7.0% | V₀ [20° C., V]: | 2.22 |

| M3: Nematic host-mixture | | | |
|---|---|---|---|
| CC-3-V | 37.50% | Clearing point [° C.]: | 75.4 |
| CCH-501 | 2.00% | Δn [589 nm, 20° C.]: | 0.1034 |
| CCY-3-O2 | 12.00% | Δε [1 kHz, 20° C.]: | −3.3 |
| CCY-3-O3 | 6.50% | ε∥ [1 kHz, 20° C.]: | 3.6 |
| CPY-2-O2 | 12.00% | ε⊥ [1 kHz, 20° C.]: | 6.9 |
| CPY-3-O2 | 10.00% | K₁ [pN, 20° C.]: | 13.4 |
| CY-3-O2 | 2.00% | K₃ [pN, 20° C.]: | 15.0 |
| PY-3-O2 | 16.00% | γ₁ [mPa·s, 20° C.]: | 95 |
| PCH-301 | 2.00% | V₀ [20° C., V]: | 2.24 |

| M4: Nematic host-mixture | | | |
|---|---|---|---|
| CY-3-O2 | 18.00% | Clearing point [° C.]: | 80.6 |
| CY-5-O2 | 10.00% | Δn [589 nm, 20° C.]: | 0.0948 |
| CCY-3-O2 | 7.00% | Δε [1 kHz, 20° C.]: | −3.1 |
| CPY-3-O2 | 9.00% | ε∥ [1 kHz, 20° C.]: | 3.4 |
| PYP-2-3 | 5.00% | ε⊥ [1 kHz, 20° C.]: | 6.5 |
| CLY-3-O2 | 8.00% | K₁ [pN, 20° C.]: | 14.8 |
| CCP-3-3 | 17.00% | K₃ [pN, 20° C.]: | 16.0 |
| CCH-34 | 4.00% | γ₁ [mPa·s, 20° C.]: | 122 |
| CCH-23 | 22.00% | V₀ [20° C., V]: | 2.37 |

| M5: Nematic host-mixture | | | |
|---|---|---|---|
| CY-3-O4 | 14.00% | Clearing point [° C.]: | 80.0 |
| CCY-3-O2 | 9.00% | Δn [589 nm, 20° C.]: | 0.0900 |
| CCY-3-O3 | 9.00% | Δε [1 kHz, 20° C.]: | −3.3 |
| CPY-2-O2 | 10.00% | ε∥ [1 kHz, 20° C.]: | 3.4 |
| CPY-3-O2 | 10.00% | ε⊥ [1 kHz, 20° C.]: | 6.7 |
| CCY-3-1 | 8.00% | K₁ [pN, 20° C.]: | 15.1 |
| CCH-34 | 9.00% | K₃ [pN, 20° C.]: | 14.6 |
| CCH-35 | 6.00% | γ₁ [mPa·s, 20° C.]: | 135 |
| PCH-53 | 10.00% | V₀ [20° C., V]: | 2.23 |

-continued

| M5: Nematic host-mixture | |
|---|---|
| CCH-301 | 6.00% |
| CCH-308 | 9.00% |

| M6: Nematic host-mixture | | | |
|---|---|---|---|
| CY-3-O2 | 18.00% | Clearing point [° C.]: | 74.5 |
| CPY-2-O2 | 10.00% | Δn [589 nm, 20° C.]: | 0.1021 |
| CPY-3-O2 | 10.00% | Δε [1 kHz, 20° C.]: | −3.1 |
| CCY-3-O2 | 9.00% | $\epsilon_{\parallel}$ [1 kHz, 20° C.]: | 3.5 |
| CCY-4-O2 | 4.00% | $\epsilon_{\perp}$ [1 kHz, 20° C.]: | 6.6 |
| CC-3-V | 40.00% | $K_1$ [pN, 20° C.]: | 12.7 |
| PYP-2-3 | 9.00% | $K_3$ [pN, 20° C.]: | 14.7 |
| | | $\gamma_1$ [mPa · s, 20° C.]: | 86 |
| | | $V_0$ [20° C., V]: | 2.29 |

Example 1

Compound No. 1 (1.5%) is added to the nematic LC-mixture M2. The resulting mixture is homogenised and filled into an "alignment-free" test cell (thickness d~4 μm, ITO electrodes on both substrates, no passivation layer, and no orientation layer).

The LC-mixture shows a spontaneous homeotropic (vertical) orientation with respect to the surface of the substrates. The orientation is stable until 70° C. and the resulting VA-cell can be reversibly switched between 0 and 30 V. Crossed polarizers are needed to display the switching.

By using additives like compound No. 1, no alignment layer (e.g. no PI coating) is required anymore for PVA, MVA, and other analogue display technologies based on the combination Δε<0 and homeotropic orientation.

Example 1P a): Polymer Stabilization of Example 1

The polymerizable derivative RM-1 (0.3%) is added to the nematic LC-mixture from example 1. The resulting mixture is homogenised and filled into an "alignment-free" test cell (thickness d~4 μm, ITO electrodes on both substrates, no passivation layer, and no orientation layer).

The LC-mixture shows a spontaneous homeotropic (vertical) orientation, with respect to the surface of the substrates. The resulting VA-cell is treated with UV-light (15 min, 100 mW/cm$^2$) after having applied to the cell a voltage higher than the optical threshold. The polymerizable derivative polymerizes and, as a consequence, the homeotropic self-orientation is stabilized and the tilt of the mixture is tuned. The resulting PSA-VA-cell can be reversibly switched between 0 and 30 V, even at high temperatures. The switching times are reduced, compared to the not polymerized system. Additives like Irganox 1076 (Ciba Specialty Chemicals) may be added (e.g. 0.001%) for preventing spontaneous polymerization. UV-cut filter may be used during polymerization for preventing damage of the mixtures (e.g. 340 nm cut-filter).

By using additives like compound No. 1 in combination with RM-1, no alignment layer is required anymore for PSA, PS-VA, and other analogue display technologies based on the combination Δε<0 and homeotropic orientation.

Example 1P b): Polymer Stabilization of Example 1

The polymerizable derivative RM-17 (0.3%) is added to the nematic LC-mixture from example 1. The resulting mixture is homogenised and filled into an "alignment-free" test cell (thickness d~4 μm, ITO electrodes on both substrates, no passivation layer, and no orientation layer). The resulting cell is treated according to example 1 Pa.

By using additives like compound 1 in combination with RM-17, no alignment layer is required anymore for PSA, PS-VA, and other analogue display technologies based on the combination Δε<0 and homeotropic orientation.

Examples 2 to 17 and 2P a) to 10P b)

In Table 1 and 2 are reported the combinations of self-aligning additives (compounds Nos. 1 to 9) with Δε<0 host-mixtures M1 to M6, and with the polymerizable additive RM-1 and RM-17. All mixtures are prepared and investigated according to Examples 1, 1P a) and 1P b).

TABLE 1

| Example | Compound No. (wt. %) | Host | Orientation/switchability |
|---|---|---|---|
| 2 | 1 (1.5%) | M1 | Homeotropic/yes |
| 3 | | M3 | Homeotropic/yes |
| 4 | | M4 | Homeotropic/yes |
| 5 | | M5 | Homeotropic/yes |
| 6 | | M6 | Homeotropic/yes |
| 7 | 2 (0.7%) | M1 | Homeotropic/yes |
| 8 | | M5 | Homeotropic/yes |
| 9 | | M6 | Homeotropic/yes |
| 10 | 3 (2.0%) | M2 | Homeotropic/yes |
| 11 | | M5 | Homeotropic/yes |
| 12 | 4 (2.0%) | M5 | Homeotropic/yes |
| 13 | 5 (2.0%) | M5 | Homeotropic/yes |
| 14 | 6 (2.0%) | M5 | Homeotropic/yes |
| 15 | 7 (2.0%) | M5 | Homeotropic/yes |
| 16 | 8 (2.0%) | M5 | Homeotropic/yes |
| 17 | 9 (2.0%) | M5 | Homeotropic/yes |

TABLE 2

| Example | Compound No. (wt. %) | Host | RM No. (wt. %) | Compatible with PSA/PS-VA |
|---|---|---|---|---|
| 2P a) | 1 (1.5%) | M1 | RM-1 (0.3%) | yes |
| 3P a) | | M3 | RM-1 (0.3%) | yes |
| 3P b) | | M3 | RM-17 (0.3%) | yes |
| 4P a) | | M4 | RM-1 (0.3%) | yes |
| 6P a) | | M6 | RM-1 (0.3%) | yes |
| 7P a) | 2 (0.7%) | M1 | RM-1 (0.3%) | yes |
| 10P a) | 3 (2.0%) | M2 | RM-1 (0.3%) | yes |
| 10P b) | | M2 | RM-17 (0.3%) | yes |

Voltage Holding Ratio Experiments

The Voltage Holding Ratio (VHR) of the mixtures is measured as a function of the exposure time to the irradiation of a CCFL (cold cathode fluorescent lamp) backlight (up to 1000 h exposure). VHR values are recorded at 60 Hz, after storing the cell for 5 min at 100° C.

Tables 3 to 7 show the comparison between PI-coated cells (as used e.g. for PVA, MVA, and PS-VA) and PI-free cell (based on mixtures from example 1 to 7P a)).

PI-coated cells (thickness d~6 μm, ITO electrodes on both substrates, SE-5561 as orientation controlling layer) are filled with host-mixtures (including RM-1 or RM-17, if polymer stabilization was investigated) without the addition of the self-aligning compounds. PI-Free cells (thickness d~6 μm) are filled as in Examples 1, 1P a) and 1P b).

It can clearly be seen that the replacement of the PI (alignment layer), as proposed in the embodiments is advantageous in terms of long-term reliability of Δε<0 mixtures, with as well as without polymer stabilization.

TABLE 3

| | VHR (5 min, 100° C., 6 Hz) | | | |
|---|---|---|---|---|
| Irradiation time | M1 on SE-5561 (VA-PI) | Example 7 on ITO (PI-free) | M1 + 0.3% RM-1 on SE-5561 (VA-PI) | Example 7P a) (0.3% RM-1) on ITO (PI-free) |
| Before UV-curing (15 min, 100 mW/cm², 340 nm filter) | 96.2 | 97.8 No curing | 98.8 No curing | 98.1 |
| 168 h, CCFL | 91.0 | 91.2 | 92.7 | 96.0 |
| 500 h, CCFL | 89.4 | 90.8 | 78.9 | 94.4 |
| 1000 h, CCFL | 85.6 | 89.9 | 72.4 | 93.3 |

TABLE 4

| | VHR (5 min, 100° C., 6 Hz) | |
|---|---|---|
| Irradiation time | M2 + 0.3% RM-1 on SE-5561 (VA-PI) | Example 1P a) (0.3% RM-1) on ITO (PI-free) |
| Before UV-curing (15 min, 100 mW/cm², 340 nm filter) | 99.0 98.5 | 97.7 99.0 |
| 168 h, CCFL | 96.9 | 98.4 |
| 500 h, CCFL | 97.0 | 98.0 |
| 1000 h, CCFL | 95.8 | 97.0 |

TABLE 5

| | VHR (5 min, 100° C., 6 Hz) | | | |
|---|---|---|---|---|
| Irradiation time | M3 on SE-5561 (VA-PI) | Example 3 on ITO (PI-free) | M3 + 0.3% RM-17 on SE-5561 (VA-PI) | Example 3P b) (0.3% RM-17) on ITO (PI-free) |
| Before UV-curing (15 min, 100 mW/cm², 340 nm filter) | 92.0 | 94.6 No curing | 97.0 No curing | 93.7 92.9 |
| 168 h, CCFL | 88.4 | 94.0 | 81.3 | 84.6 |
| 500 h, CCFL | 82.8 | 93.9 | 75.9 | 83.7 |
| 1000 h, CCFL | 71.8 | 93.4 | 70.4 | 80.4 |

TABLE 6

| | VHR (5 min, 100° C., 6 Hz) | |
|---|---|---|
| Irradiation time | M4 on SE-5561 (VA-PI) | Example 4 on ITO (PI-free) |
| Before | 97.8 | 97.1 |
| 168 h, CCFL | 93.8 | 94.7 |
| 500 h, CCFL | 93.4 | 95.8 |
| 1000 h, CCFL | 92.4 | 95.3 |

TABLE 7

| | VHR (5 min, 100° C., 6 Hz) | | | |
|---|---|---|---|---|
| Irradiation time | M6 on SE-5561 (VA-PI) | Example 6 on ITO (PI-free) | M6 + 0.3% RM-1 on SE-5561 (VA-PI) | Example 6P a) (0.3% RM-1) on ITO (PI-free) |
| Before UV-curing (15 min, 100 mW/cm², 340 nm filter) | 97.2 No curing | 96.6 No curing | 98.5 95.9 | 96.6 96.6 |
| 168 h, CCFL | 93.0 | 95.4 | 92.0 | 94.6 |
| 500 h, CCFL | 87.1 | 92.9 | 86.3 | 93.1 |
| 1000 h, CCFL | 78.6 | 90.1 | 84.8 | 90.5 |

| M7: Nematic host-mixture | | | |
|---|---|---|---|
| CY-3-O4 | 12.00% | Clearing point [° C.]: | 86 |
| CY-5-O2 | 10.00% | Δn [589 nm, 20° C.]: | 0.1096 |
| CY-5-O4 | 8.00% | Δε [1 kHz, 20° C.]: | −5.0 |
| CCY-3-O2 | 8.00% | $\epsilon_{\parallel}$ [1 kHz, 20° C.]: | 3.8 |
| CCY-4-O2 | 7.00% | $\epsilon_{\perp}$ [1 kHz, 20° C.]: | 6.5 |
| CCY-5-O2 | 6.00% | $K_1$ [pN, 20° C.]: | 14.7 |
| CCY-2-1 | 8.00% | $K_3$ [pN, 20° C.]: | 16.0 |
| CCY-3-1 | 7.00% | $\gamma_1$ [mPa · s, 20° C.]: | 250 |
| CPY-2-O2 | 9.00% | $V_0$ [20° C., V]: | 1.90 |
| CPY-3-O2 | 9.00% | | |
| BCH-32 | 6.00% | | |
| PCH-53 | 10.00% | | |

Compound No. 1 and RM-1 are added to the nematic LC-mixture M7 in the following concentrations

| Example | Compound No. (wt. %) | Host | RM (wt. %) | Orientation/ switchability |
|---|---|---|---|---|
| 18 | 1 (1.0%) | M7 | RM-1 (0.3%) | Homeotropic/yes |
| 19 | 1 (1.5%) | M7 | RM-1 (0.3%) | Homeotropic/yes |
| 20 | 1 (2.5%) | M7 | RM-1 (0.3%) | Homeotropic/yes | and prepared and investigated according to Examples 1, 1P a) and 1P b).

| M8: Nematic host-mixture | | | |
|---|---|---|---|
| CY-3-O2 | 15.00% | Clearing point [° C.]: | 75.5 |
| CCY-4-O2 | 9.50% | Δn [589 nm, 20° C.]: | 0.1075 |
| CCY-5-O2 | 5.00% | Δε [1 kHz, 20° C.]: | −3.0 |
| CPY-2-O2 | 9.00% | $\epsilon_{\parallel}$ [1 kHz, 20° C.]: | 3.5 |
| CPY-3-O2 | 9.00% | $\epsilon_{\perp}$ [1 kHz, 20° C.]: | 6.5 |
| CCH-34 | 9.00% | $K_1$ [pN, 20° C.]: | 12.9 |
| CCH-23 | 22.00% | $K_3$ [pN, 20° C.]: | 13.0 |
| PYP-2-3 | 7.00% | $\gamma_1$ [mPa · s, 20° C.]: | 115 |
| PYP-2-4 | 7.50% | $V_0$ [20° C., V]: | 2.20 |
| PCH-301 | 7.00% | | |

Compound No. 1 and RM-1 are added to the nematic LC-mixture M8 in the following concentrations

| Example | Compound No. (wt. %) | Host | RM (wt. %) | Orientation/ switchability |
|---|---|---|---|---|
| 21 | 1 (3.0%) | M8 | RM-1 (0.2%) | Homeotropic/yes |
| 22 | 1 (2.5%) | M8 | RM-1 (0.2%) | Homeotropic/yes | and prepared and investigated according to Examples 1, 1P a) and 1P b).

| | M9: Nematic host-mixture | | |
|---|---|---|---|
| CY-3-O4 | 14.00% | Clearing point [° C.]: | 80 |
| CCY-3-O2 | 9.00% | $\Delta n$ [589 nm, 20° C.]: | 0.0901 |
| CCY-3-O3 | 9.00% | $\Delta \epsilon$ [1 kHz, 20° C.]: | −3.3 |
| CPY-2-O2 | 10.00% | $\epsilon_{\|\|}$ [1 kHz, 20° C.]: | 3.4 |
| CPY-3-O2 | 10.00% | $\epsilon_{\perp}$ [1 kHz, 20° C.]: | 6.7 |
| CCY-3-1 | 8.00% | $K_1$ [pN, 20° C.]: | 15.1 |
| CCH-34 | 9.00% | $K_3$ [pN, 20° C.]: | 14.6 |
| CCH-35 | 6.00% | $\gamma_1$ [mPa·s, 20° C.]: | 135 |
| PCH-53 | 10.00% | $V_0$ [20° C., V]: | 2.23 |
| CCH-301 | 6.00% | | |
| CCH-303 | 9.00% | | |

A self-aligning additive (Nos. 10-16) and optionally a reactive mesogen (RM-1, RM-17, RM-25) are added to the nematic LC-mixture M9 in the following concentrations

| Example | Compound No. (wt. %) | Host | RM (wt. %) | Orientation/ switchability |
|---|---|---|---|---|
| 23 | 10 (1.5%) | M9 | RM-1 (0.3%) | Homeotropic/yes |
| 24 | 11 (2.0%) | M9 | RM-1 (0.3%) | Homeotropic/yes |
| 25 | 12 (2.0%) | M9 | RM-1 (0.3%) | Homeotropic/yes |
| 26 | 13 (2.0%) | M9 | RM-1 (0.3%) | Homeotropic/yes |
| 27 | 14 (2.0%) | M9 | RM-1 (0.3%) | Homeotropic/yes |
| 28 | 15 (2.0%) | M9 | RM-1 (0.3%) | Homeotropic/yes |
| 29 | 16 (2.0%) | M9 | RM-1 (0.3%) | Homeotropic/yes |
| 30 | 10 (1.5%) | M9 | RM-17 (0.3%) | Homeotropic/yes |
| 31 | 11 (2.0%) | M9 | RM-17 (0.3%) | Homeotropic/yes |
| 32 | 12 (2.0%) | M9 | RM-17 (0.3%) | Homeotropic/yes |
| 33 | 13 (2.0%) | M9 | RM-17 (0.3%) | Homeotropic/yes |
| 34 | 14 (2.0%) | M9 | RM-17 (0.3%) | Homeotropic/yes |
| 35 | 15 (2.0%) | M9 | RM-17 (0.3%) | Homeotropic/yes |
| 36 | 16 (2.0%) | M9 | RM-17 (0.3%) | Homeotropic/yes |
| 37 | 10 (1.5%) | M9 | RM-25 (0.3%) | Homeotropic/yes |
| 38 | 11 (2.0%) | M9 | RM-25 (0.3%) | Homeotropic/yes |
| 39 | 12 (2.0%) | M9 | RM-25 (0.3%) | Homeotropic/yes |
| 40 | 13 (2.0%) | M9 | RM-25 (0.3%) | Homeotropic/yes |
| 41 | 14 (2.0%) | M9 | RM-25 (0.3%) | Homeotropic/yes |
| 42 | 15 (2.0%) | M9 | RM-25 (0.3%) | Homeotropic/yes |
| 43 | 16 (2.0%) | M9 | RM-25 (0.3%) | Homeotropic/yes |
| 44 | 10 (1.5%) | M9 | — | Homeotropic/yes |
| 45 | 11 (2.0%) | M9 | — | Homeotropic/yes |
| 46 | 12 (2.0%) | M9 | — | Homeotropic/yes |
| 47 | 13 (2.0%) | M9 | — | Homeotropic/yes |
| 48 | 14 (2.0%) | M9 | — | Homeotropic/yes |
| 49 | 15 (2.0%) | M9 | — | Homeotropic/yes |
| 50 | 16 (2.0%) | M9 | — | Homeotropic/yes | and prepared and investigated according to Examples 1, 1P a) and 1P b).

| | M10: Nematic host-mixture | | |
|---|---|---|---|
| CY-3-O2 | 15.00% | Clearing point [° C.]: | 74.7 |
| CY-5-O2 | 6.50% | $\Delta n$ [589 nm, 20° C.]: | 0.1082 |
| CCY-3-O2 | 11.00% | $\Delta \epsilon$ [1 kHz, 20° C.]: | −3.0 |
| CPY-2-O2 | 5.50% | $\epsilon_{\|\|}$ [1 kHz, 20° C.]: | 3.6 |
| CPY-3-O2 | 10.50% | $\epsilon_{\perp}$ [1 kHz, 20° C.]: | 6.6 |
| CC-3-V | 28.50% | $K_1$ [pN, 20° C.]: | 12.9 |
| CC-3-V1 | 10.00% | $K_3$ [pN, 20° C.]: | 15.7 |
| PYP-2-3 | 12.50% | $\gamma_1$ [mPa·s, 20° C.]: | 97 |
| PPGU-3-F | 0.50% | $V_0$ [20° C., V]: | 2.42 |

Compound No. 1 and RM-17 are added to the nematic LC-mixture M10 in the following concentrations

| Example | Compound No. (wt. %) | Host | RM (wt. %) | Orientation/ switchability |
|---|---|---|---|---|
| 51 | 1 (2.0%) | M10 | RM-1 (0.4%) | Homeotropic/yes |
| 52 | 1 (2.5%) | M10 | RM-1 (0.4%) | Homeotropic/yes |
| 53 | 1 (3.0%) | M10 | RM-1 (0.4%) | Homeotropic/yes | and prepared and investigated according to Examples 1, 1P a) and 1P b).

The invention claimed is:

1. A liquid-crystalline medium comprising a mixture of polar compounds having a negative dielectric anisotropy and at least one self-aligning additive of the formula 1A to 1D,

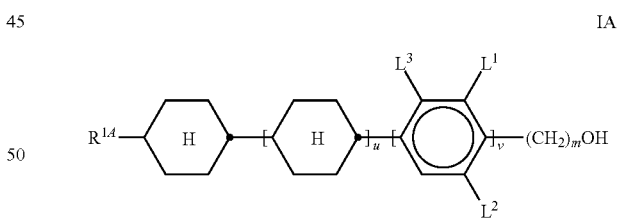

IA

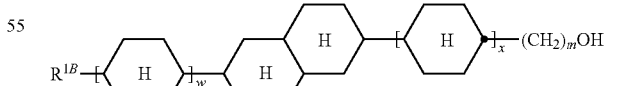

IB

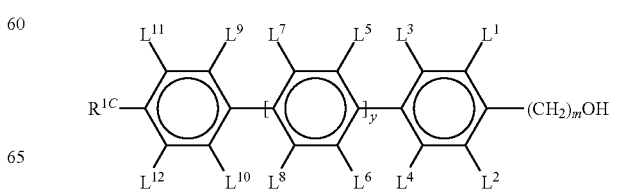

IC

-continued

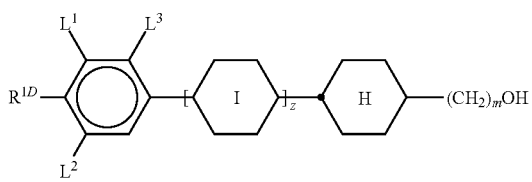

ID in which
R$^{1A}$, R$^{1B}$ and R$^{1C}$ each, independently of one another, denote halogen, an alkyl or alkoxy radical having 1 to 15 C atoms, where, in addition, one or more CH$_2$ groups in these radicals may each be replaced, independently of one another, by —C≡C—, —CF$_2$O—, —CH=CH—,

, —O—,

—CO—O—, —O—CO— in such a way that O atoms are not linked directly to one another, and in which, in addition, one or more H atoms may be replaced by halogen,
R$^{1D}$ H, halogen, an alkyl or alkoxy radical having 1 to 15 C atoms, where, in addition, one or more CH$_2$ groups in these radicals may each be replaced, independently of one another, by —C≡C—, —CF$_2$O—, —CH=CH—, —CO—O—, —O—CO—

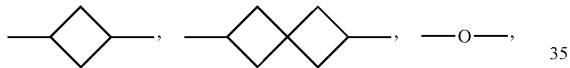, —O—, in such a way that O atoms are not linked directly to one another, and in which, in addition, one or more H atoms may be replaced by halogen,

denotes

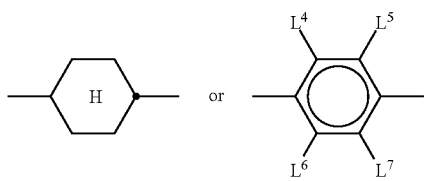

L$^1$ to L$^{12}$ each, independently of one another, denote H, F, Cl, CF$_3$, CHF$_2$ or alkyl with 1-5 carbon atoms, preferably F or alkyl,
m 0, 1, 2, 3, 4, 5 or 6, and
u, v, w, x, y and z each, independently denote 0 or 1.

2. The liquid-crystalline medium according to claim 1, further comprising at least one polymerizable compound.

3. The liquid-crystalline medium according to claim 1 comprising 0.01 to 5% by weight of the self-aligning additive based on the mixture.

4. The liquid-crystalline medium according to claim 1, wherein the self-aligning additive is a compound of the formula

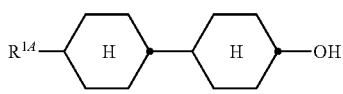 IA-1

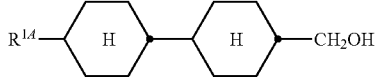 IA-2

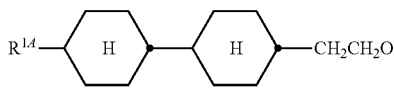 IA-3

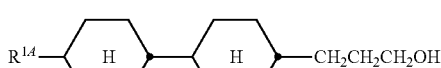 IA-4

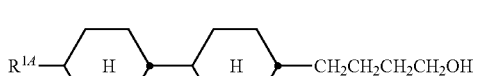 IA-5

 IA-6

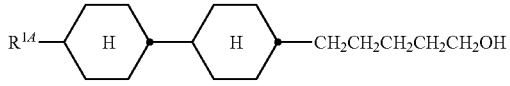 IA-7

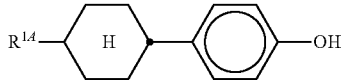 IA-8

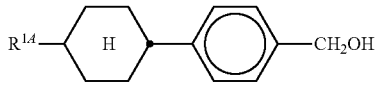 IA-9

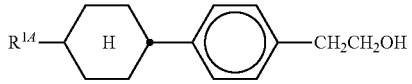 IA-10

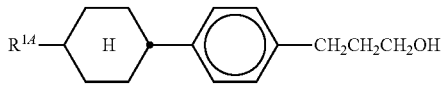 IA-11

 IA-12

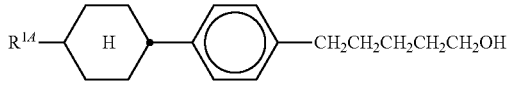 IA-13

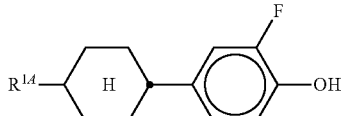 IA-14

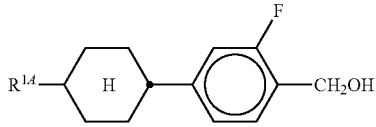

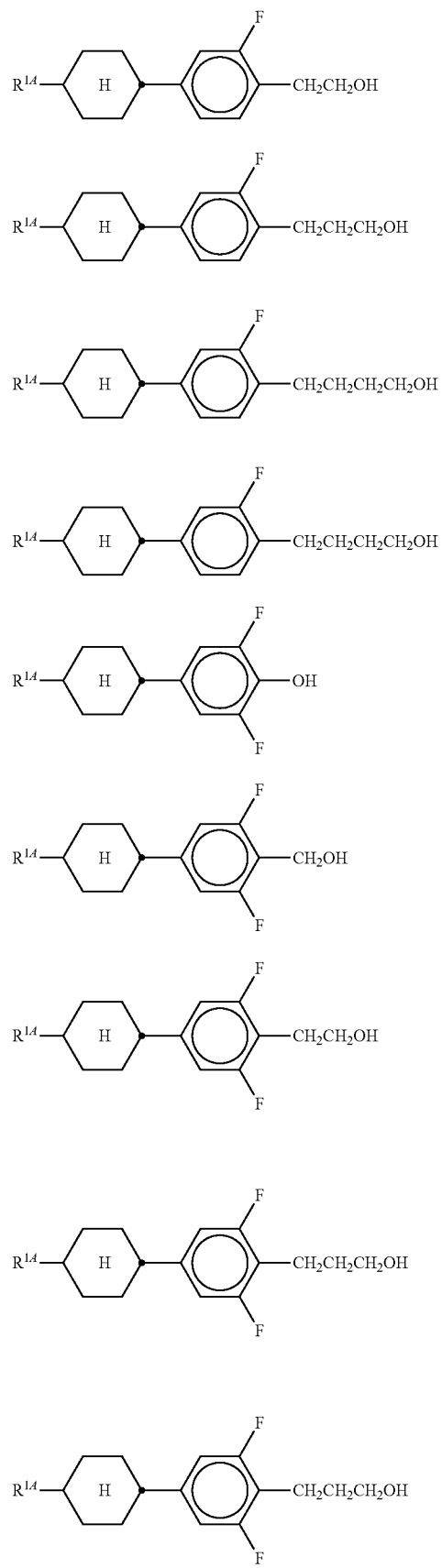

IA-35
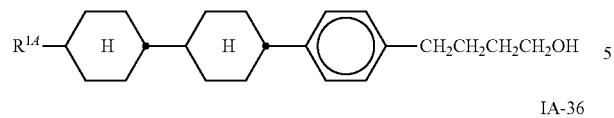
IA-36
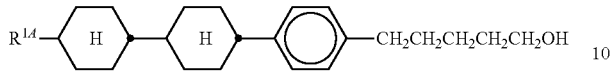
IA-37
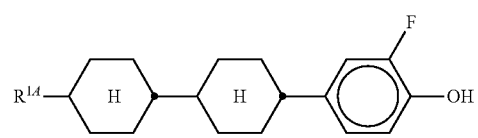
IA-38
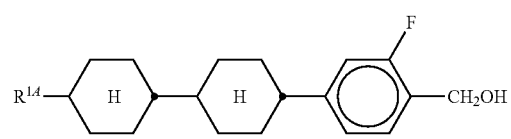
IA-39
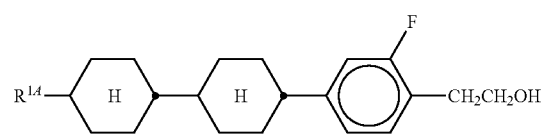
IA-40
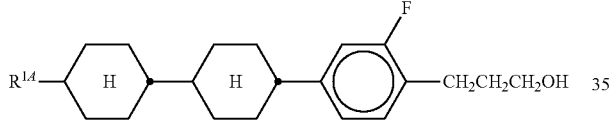
IA-41
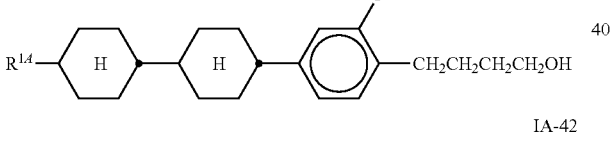
IA-42
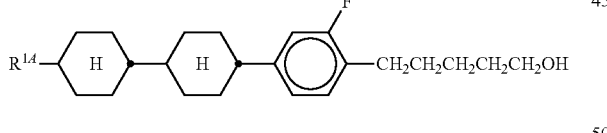
IA-43
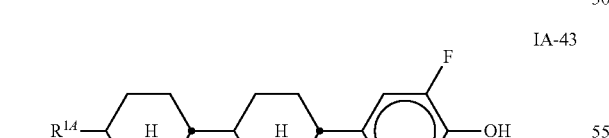
IA-44
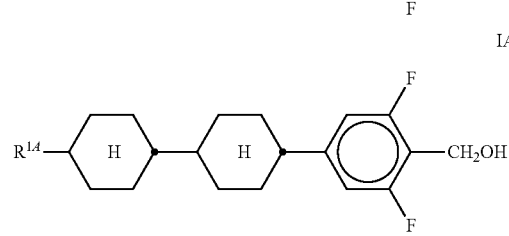
IA-45
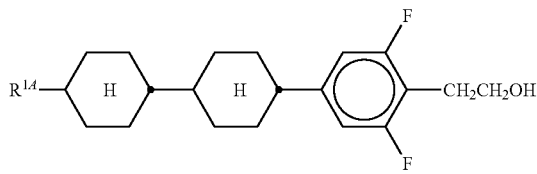
IA-46
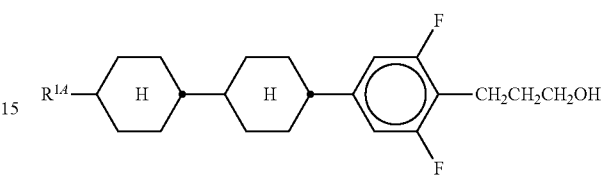
IA-47
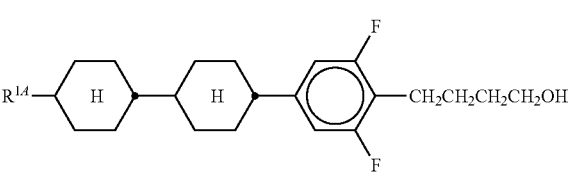
IA-48
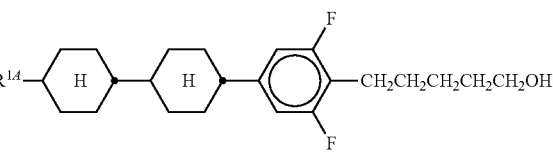
IA-49
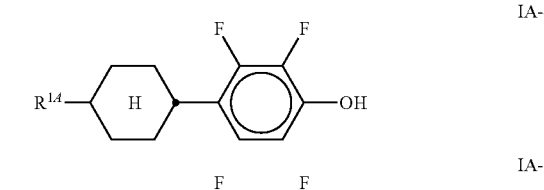
IA-50
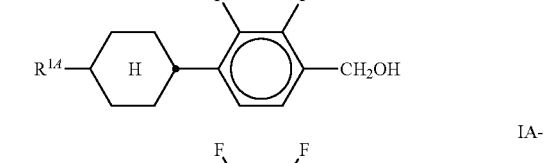
IA-51
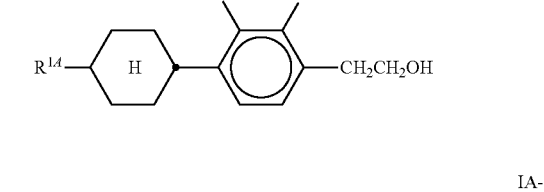
IA-52
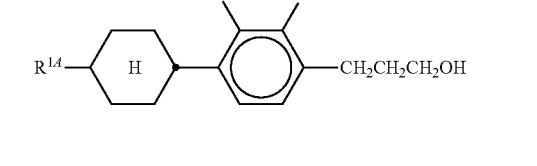
IA-53
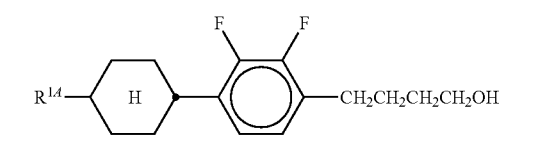

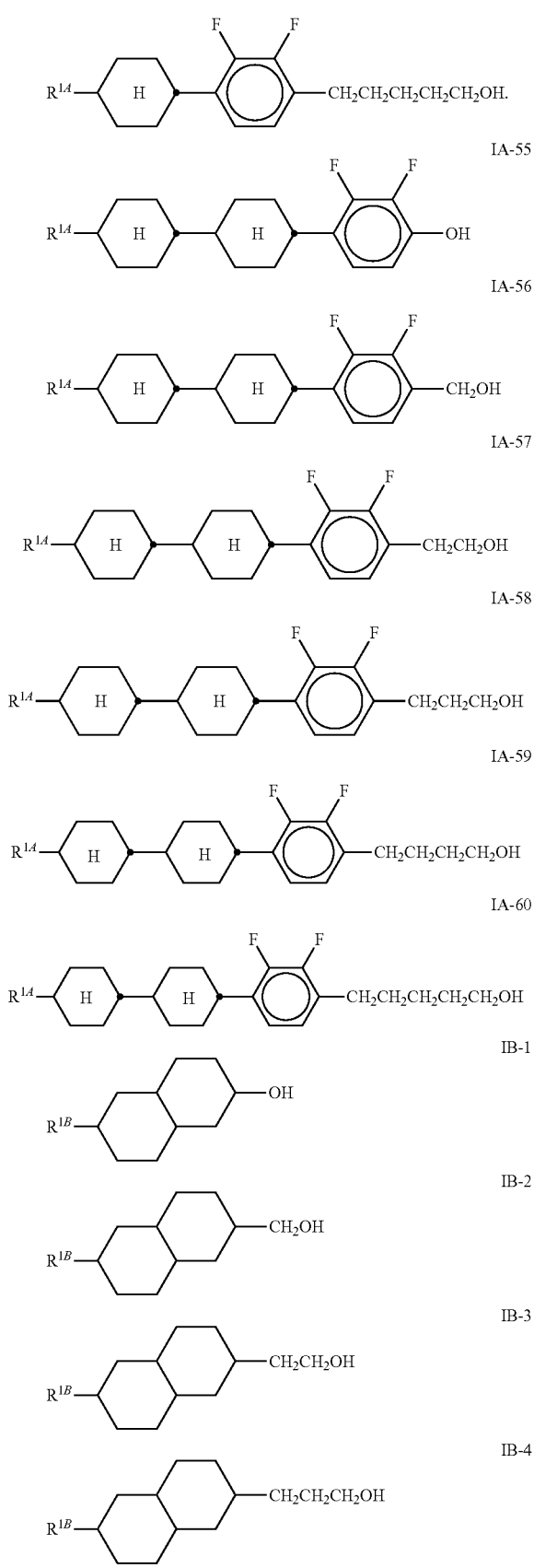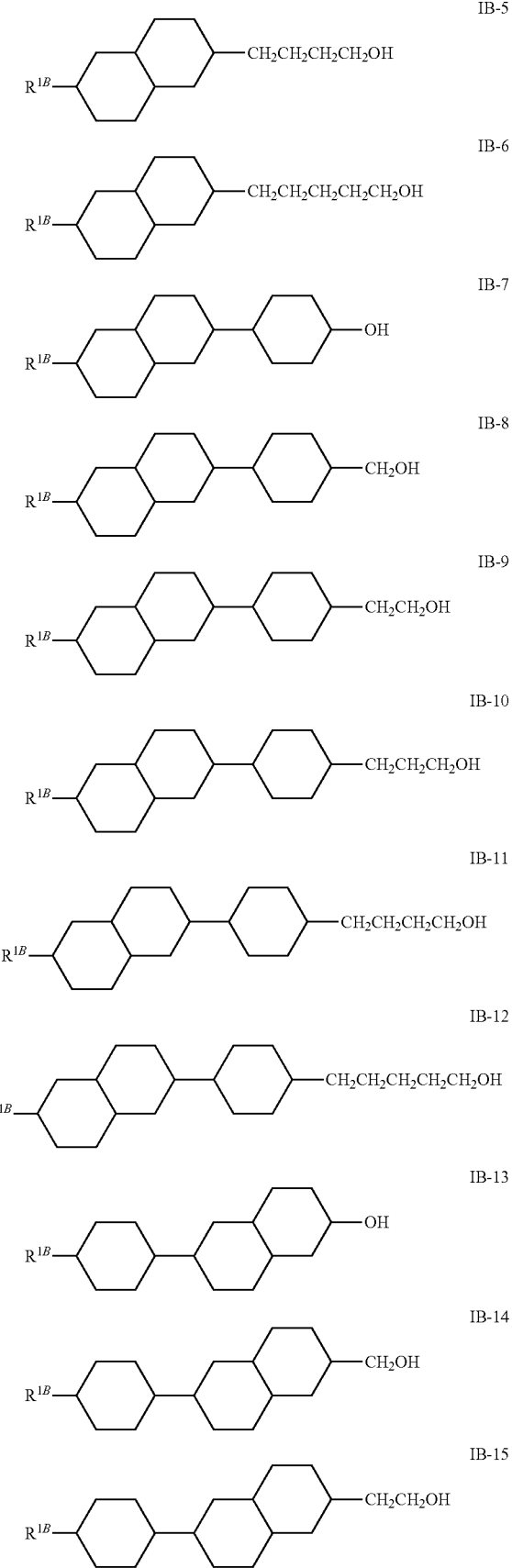

IB-16
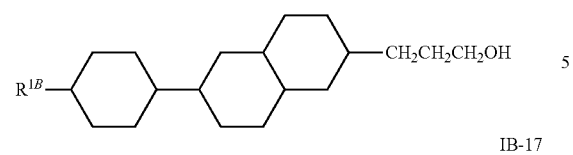
IB-17
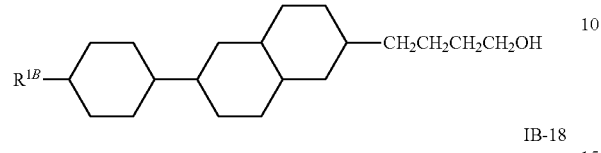
IB-18
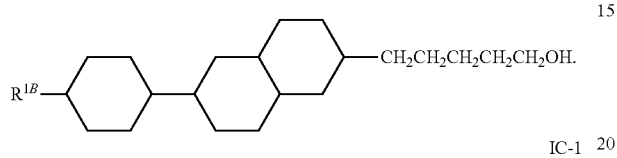
IC-1
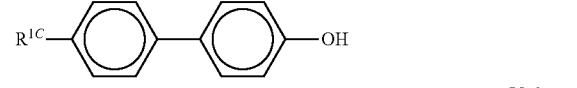
IC-2
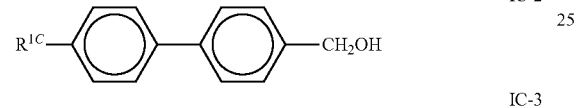
IC-3
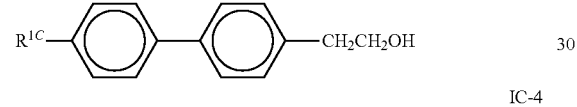
IC-4
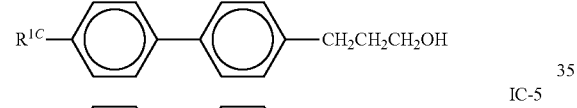
IC-5
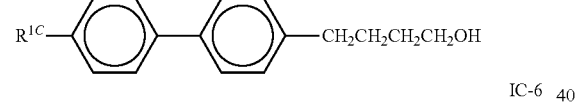
IC-6
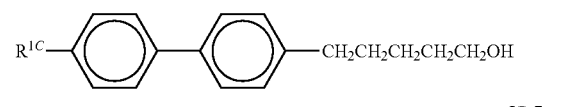
IC-7
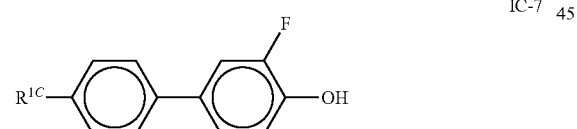
IC-8
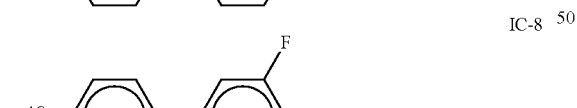
IC-9
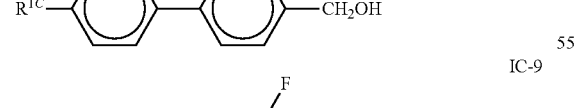
IC-10
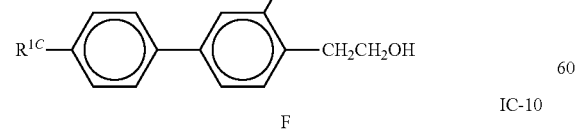
IC-11
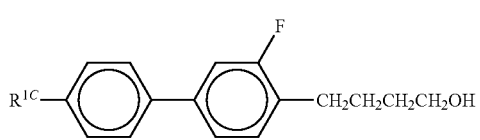
IC-12
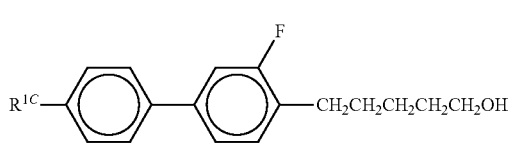
IC-13
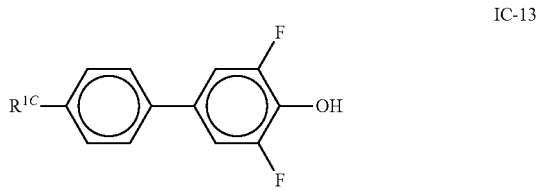
IC-14
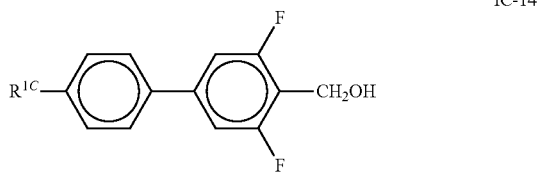
IC-15
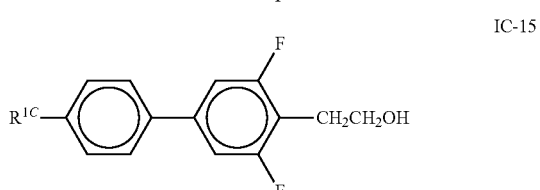
IC-16
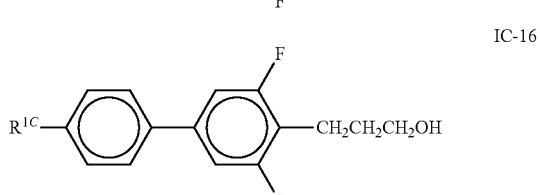
IC-17
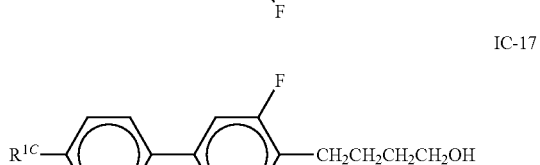
IC-18
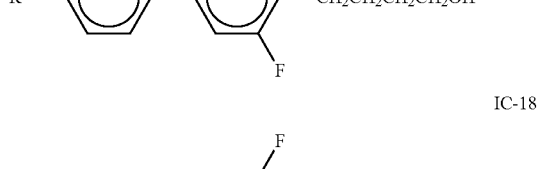
IC-19
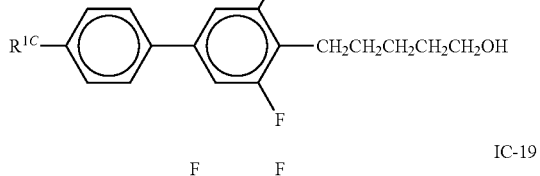

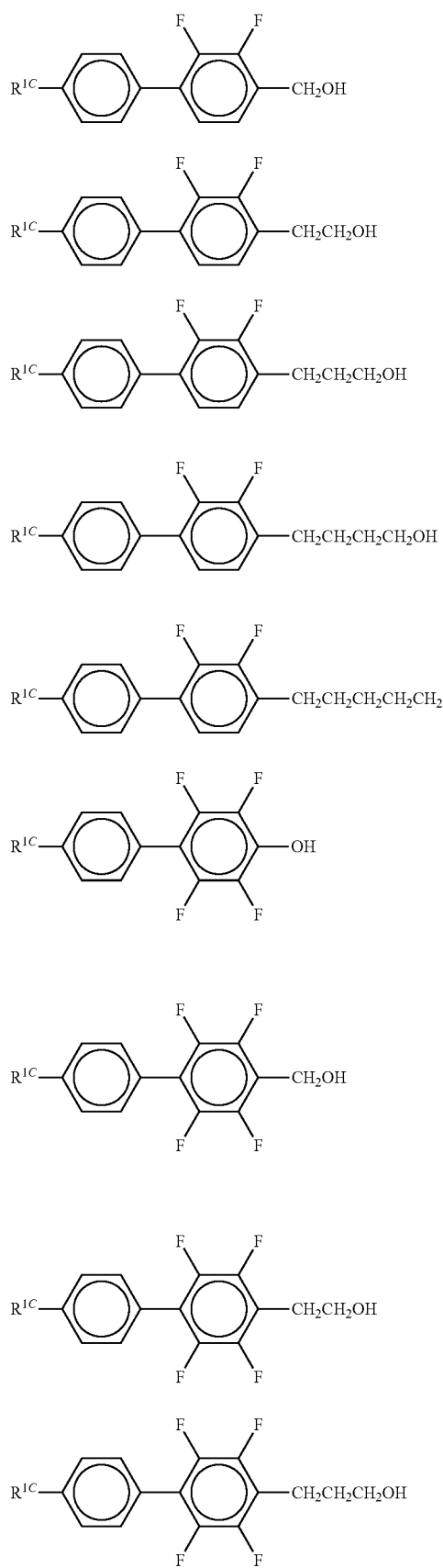
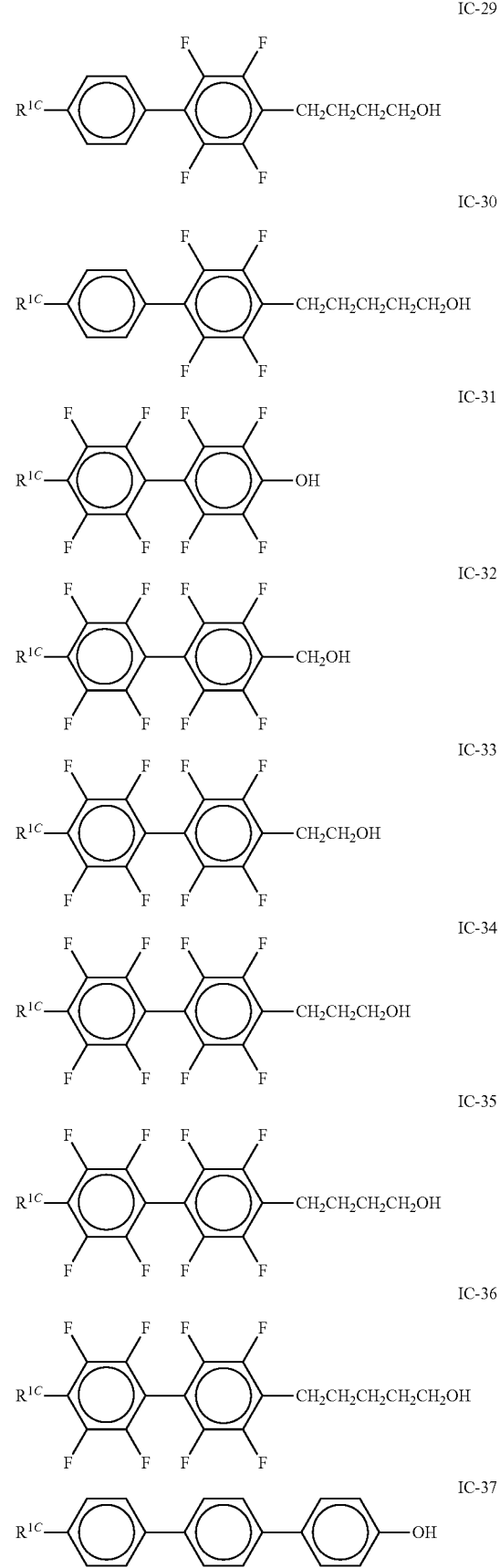

IC-38
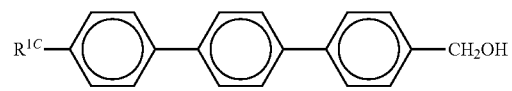
IC-39
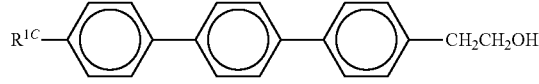
IC-40
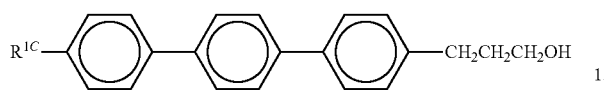
IC-41
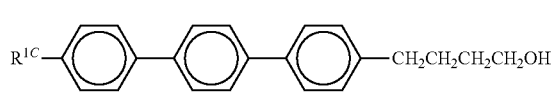
IC-42
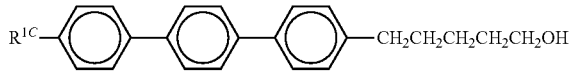
IC-43
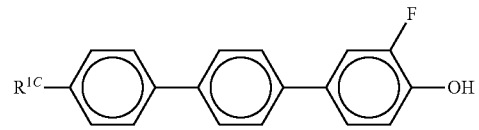
IC-44
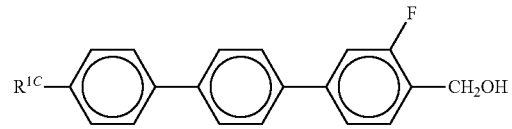
IC-45
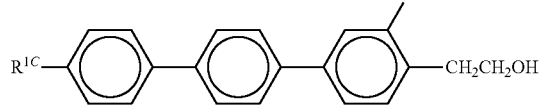
IC-46
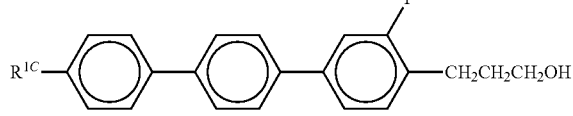
IC-47
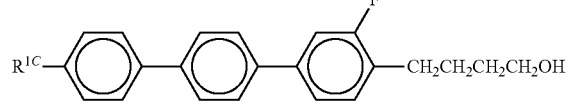
IC-48
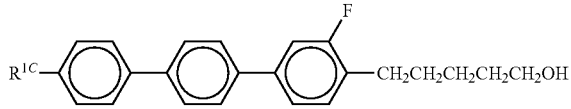
IC-49
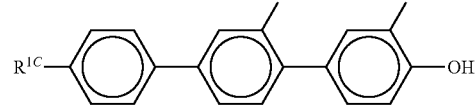
IC-50
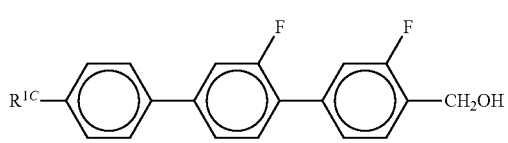
IC-51
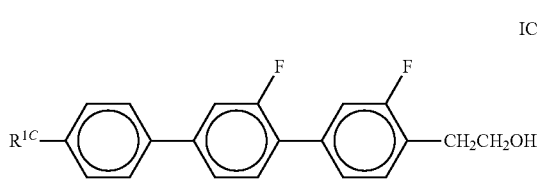
IC-52
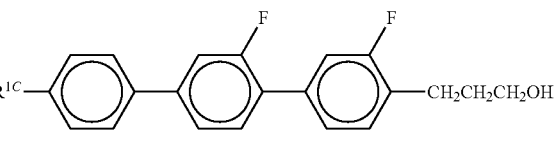
IC-53
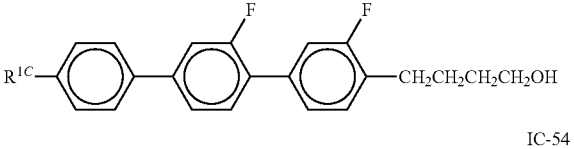
IC-54
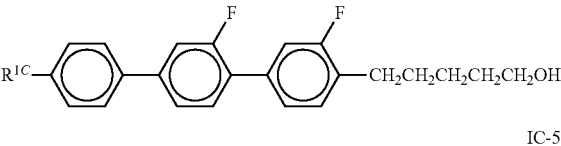
IC-55
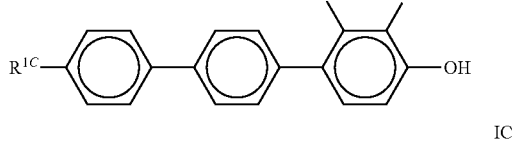
IC-56
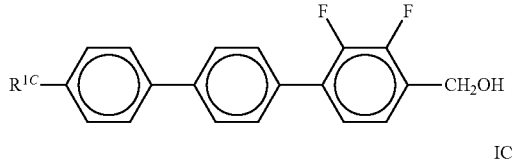
IC-57
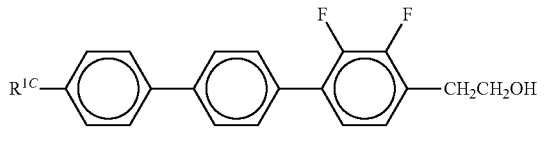
IC-58
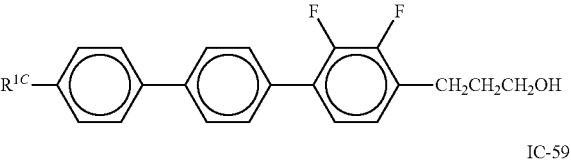
IC-59

IC-60
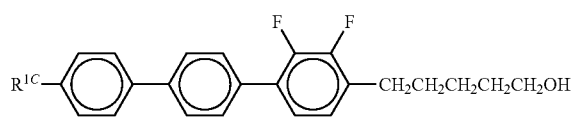
IC-61
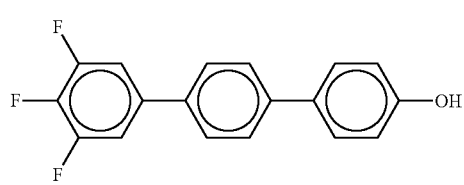
IC-62
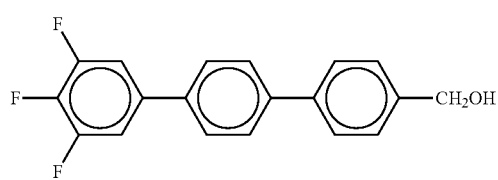
IC-63
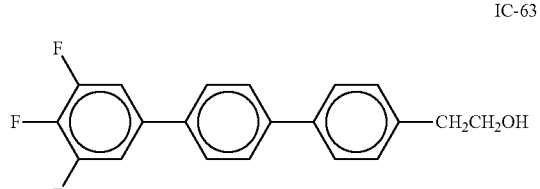
IC-64
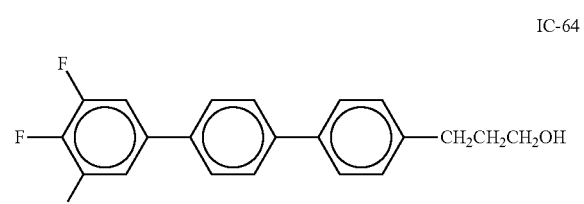
IC-65
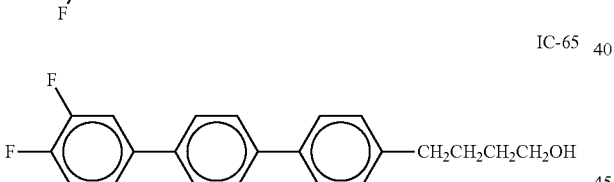
IC-66
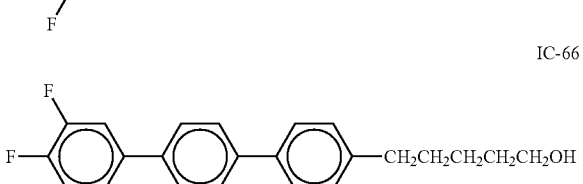
IC-67
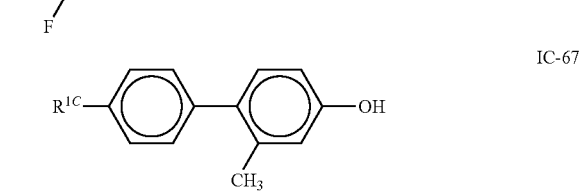
IC-68
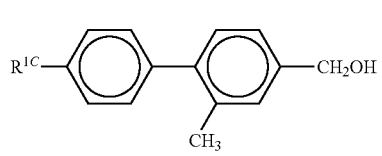
IC-69
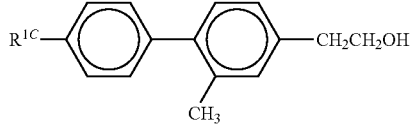
IC-70
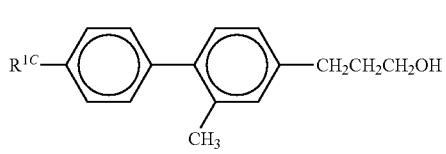
IC-71
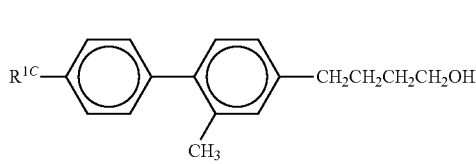
IC-72
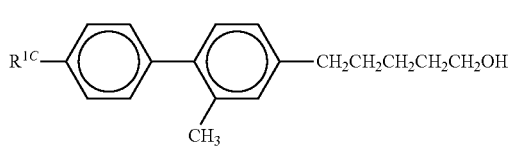
IC-73
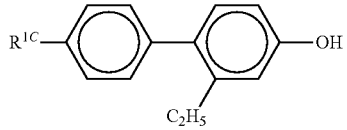
IC-74
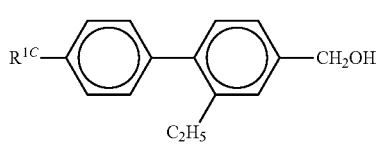
IC-75
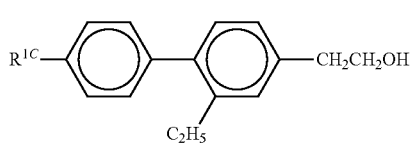
IC-76
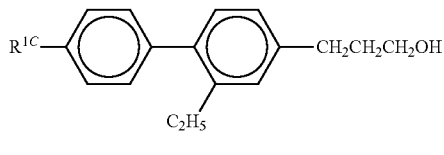
IC-77
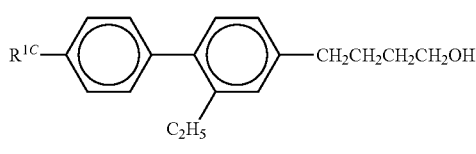
IC-78
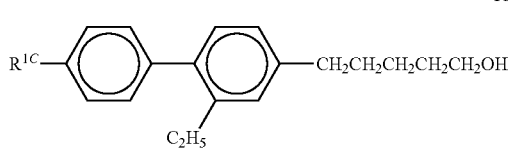

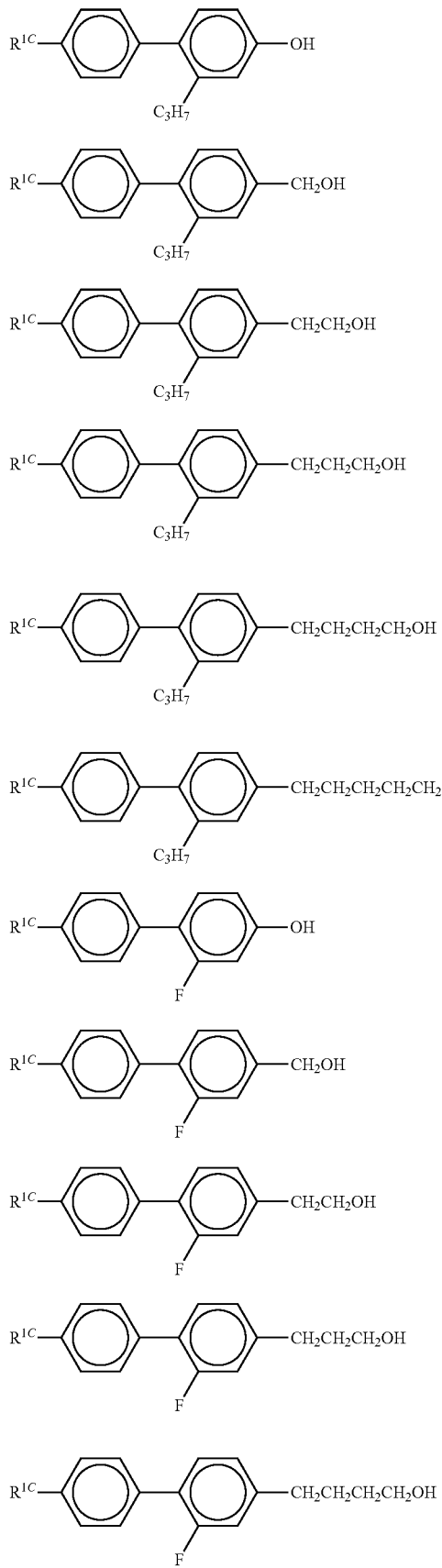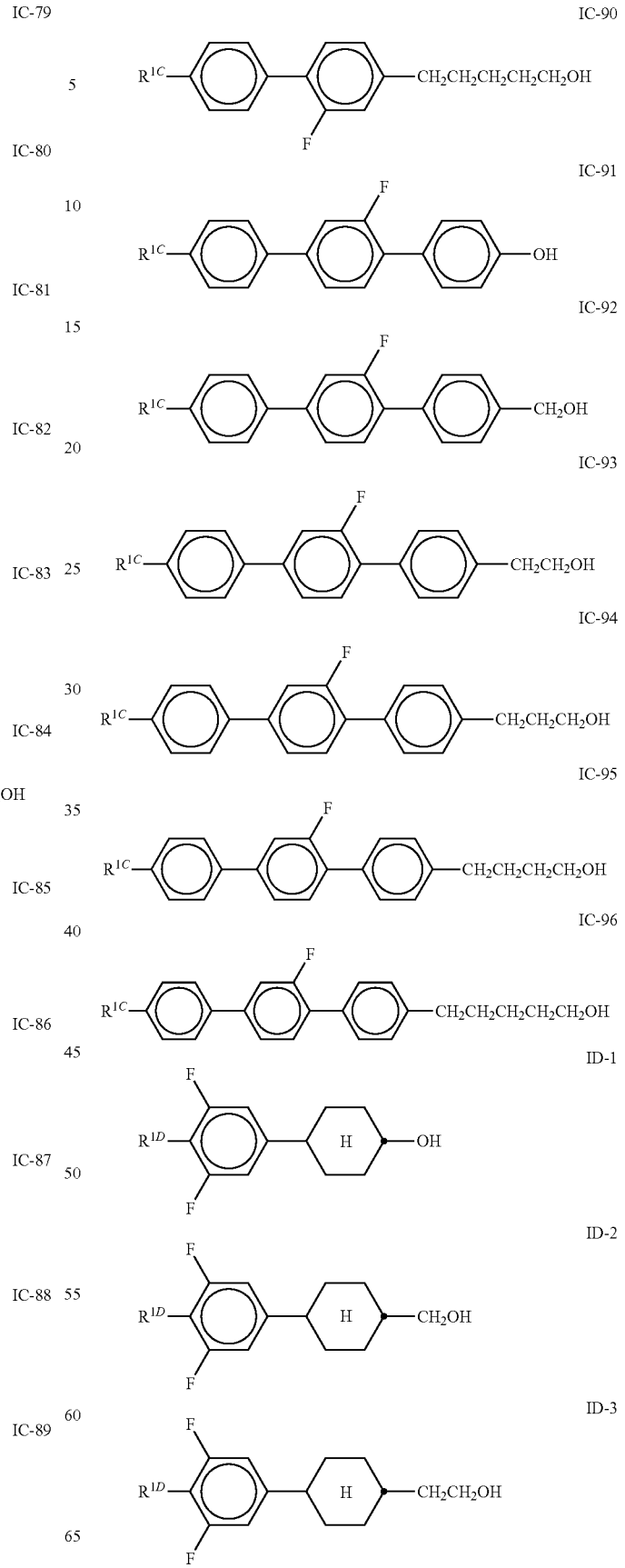

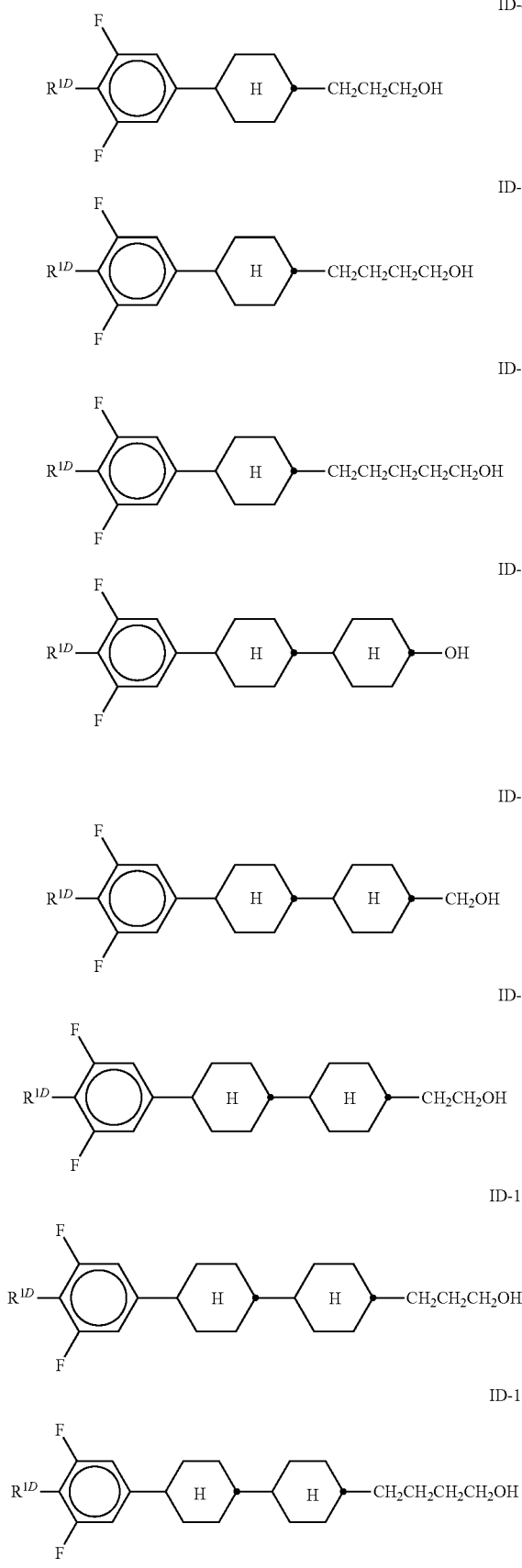

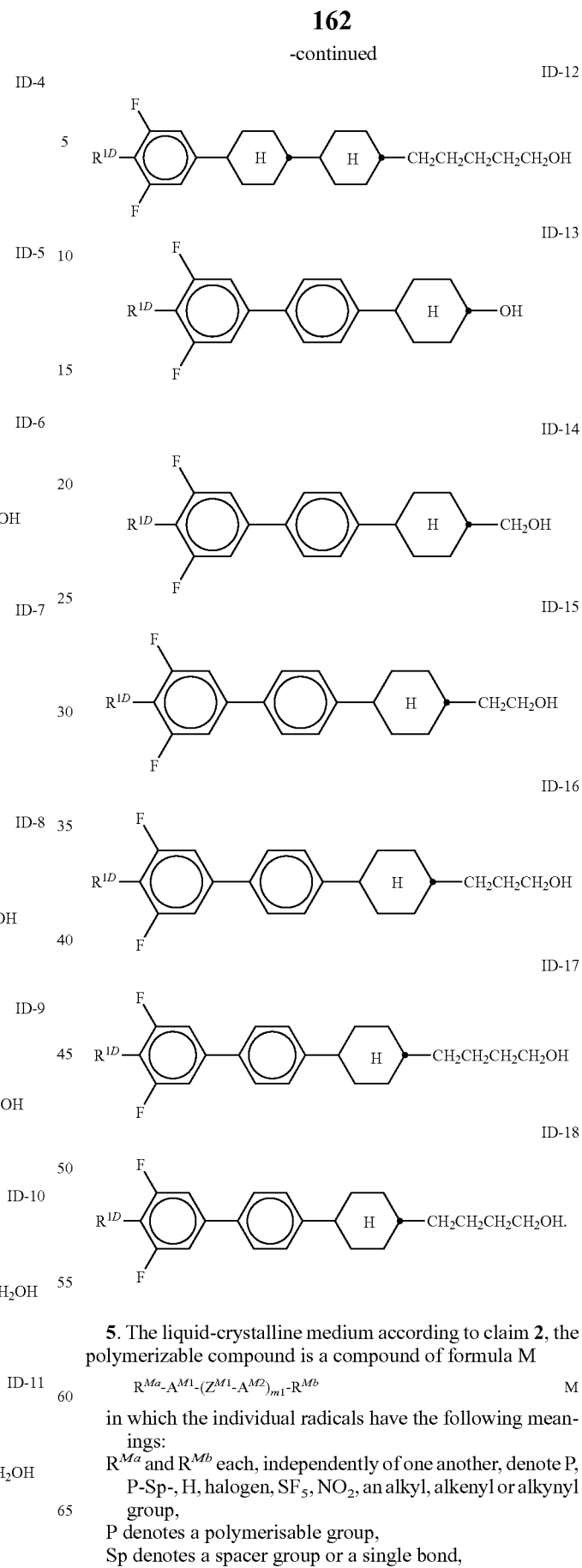

5. The liquid-crystalline medium according to claim 2, the polymerizable compound is a compound of formula M $$R^{Ma}\text{-}A^{M1}\text{-}(Z^{M1}\text{-}A^{M2})_{m1}\text{-}R^{Mb} \qquad M$$

in which the individual radicals have the following meanings:

$R^{Ma}$ and $R^{Mb}$ each, independently of one another, denote P, P-Sp-, H, halogen, $SF_5$, $NO_2$, an alkyl, alkenyl or alkynyl group, P denotes a polymerisable group, Sp denotes a spacer group or a single bond, $A^{M1}$ and $A^{M2}$ each, independently of one another, denote an aromatic, heteroaromatic, alicyclic or heterocyclic group, preferably having 4 to 25 ring atoms, preferably C atoms, which may also encompass or contain fused rings, and which may optionally be mono- or polysubstituted by L, L denotes P, P-Sp-, OH, CH$_2$OH, F, Cl, Br, I, —CN, —NO$_2$, —NCO, —NCS, —OCN, —SCN, —C(=O)N(R$^x$)$_2$, —C(=O)Y$^1$, —C(=O)R$^x$, —N(R$^x$)$_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F, Cl, P or P-Sp-, Y$^1$ denotes halogen, $Z^{M1}$ denotes —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—, —COO—, —OCO—CH=CH—, CR$^0$R$^{00}$ or a single bond, R$^0$ and R$^{00}$ each, independently of one another, denote H or alkyl having 1 to 12 C atoms, R$^x$ denotes P, P-Sp-, H, halogen, straight-chain, branched or cyclic alkyl having 1 to 25 C atoms, in which, in addition, one or more non-adjacent CH$_2$ groups may be replaced by —O—, —S—, —CO—, —CO—O—, —O—CO—, —O—CO—O— in such a way that O and/or S atoms are not linked directly to one another, and in which, in addition, one or more H atoms may be replaced by F, Cl, P or P-Sp-, an optionally substituted aryl or aryloxy group having 6 to 40 C atoms, or an optionally substituted heteroaryl or heteroaryloxy group having 2 to 40 C atoms, m1 denotes 0, 1, 2, 3 or 4, and n1 denotes 1, 2, 3 or 4, where at least one, of R$^{Ma}$, R$^{Mb}$ or L present denotes a group P or P-Sp- or contains at least one group P or P-Sp-.

6. The liquid-crystalline medium according to claim 5, wherein the polymerizable compound of the formula M is of the of formula M1 to M29,

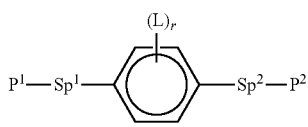

M1

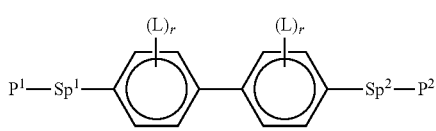

M2

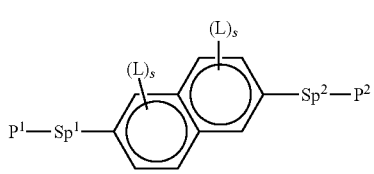

M3

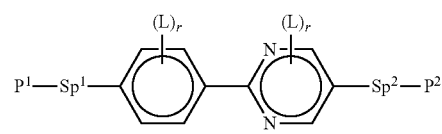

M4

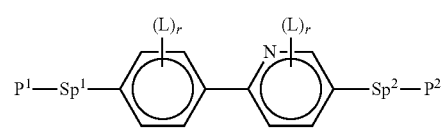

M5

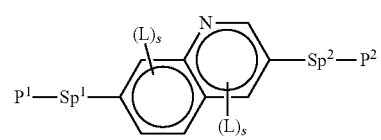

M6

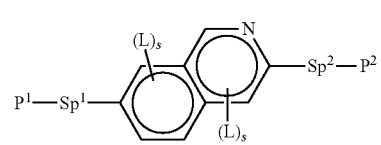

M7

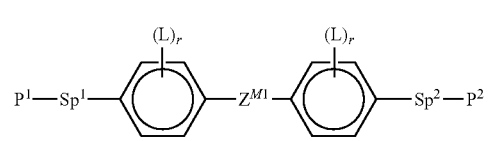

M8

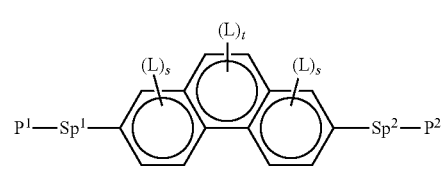

M9

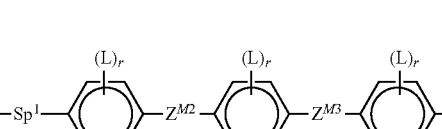

M10

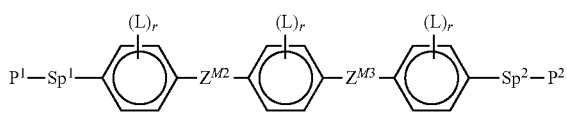

M11

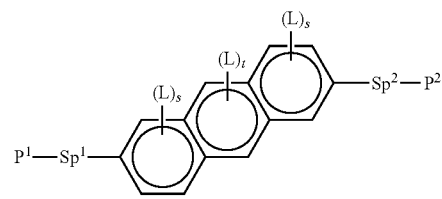

M12

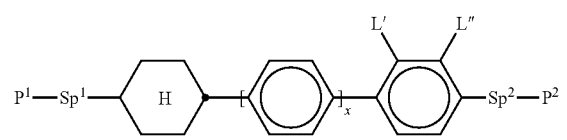

M13

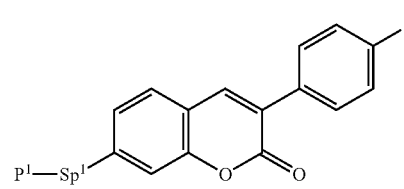

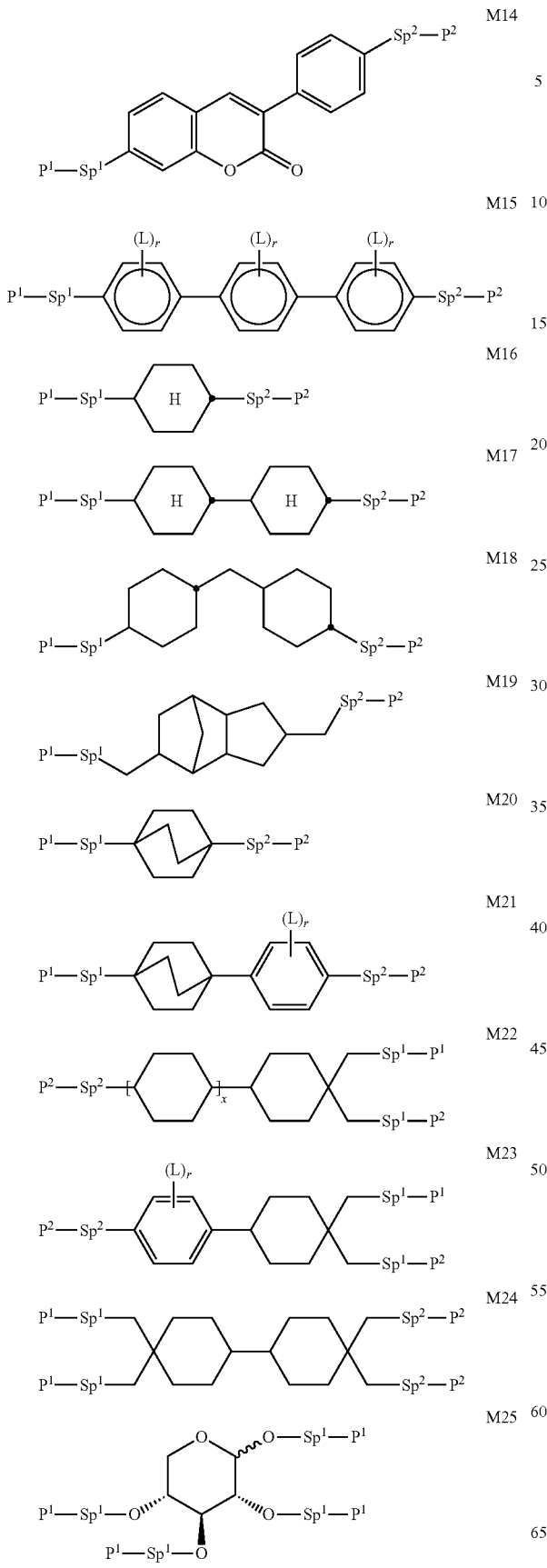
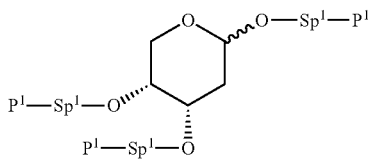
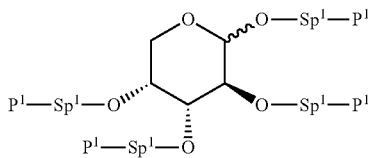
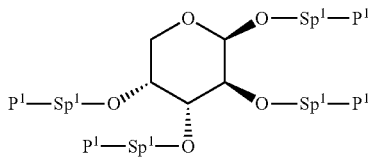
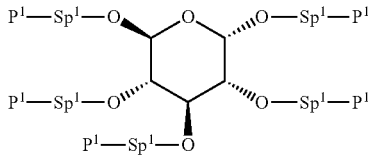

in which the individual radicals have the following meanings:

$P^1$ and $P^2$ each, independently of one another, denote a polymerisable group, $Sp^1$ and $Sp^2$ each, independently of one another, denote a single bond or a spacer group, where one of the radicals $P^1$-$Sp^1$- and $P^2$-$Sp^2$- may also denote $R^{aa}$, $R^{aa}$ denotes H, F, Cl, CN or straight-chain or branched alkyl having 1 to 25 C atoms, in which, in addition, one or more non-adjacent $CH_2$ groups may each be replaced, independently of one another, by —C($R^0$)=C($R^{00}$)—, —C≡C—, —N($R^0$)—, —O—, —S—, —CO—, —CO—O—, —O—CO—, —O—CO—O— in such a way that O and/or S atoms are not linked directly to one another, and in which, in addition, one or more H atoms may be replaced by F, Cl, CN or $P^1$-$Sp^1$-, (where the alkenyl and alkynyl radicals have at least two C atoms and the branched radicals have at least three C atoms), $R^0$, $R^{00}$ each, independently of one another and on each occurrence identically or differently, denote H or alkyl having 1 to 12 C atoms, $R^y$ and $R^z$ each, independently of one another, denote H, F, $CH_3$ or $CF_3$, $Z^{M1}$ denotes —O—, —CO—, —C($R^y R^z$)— or —$CF_2CF_2$—, $Z^{M2}$ and $Z^{M3}$ each, independently of one another, denote —CO—O—, —O—CO—, —$CH_2$O—, —O$CH_2$—, —O$CF_2$— or —($CH_2$)$_n$—, where n is 2, 3 or 4, L on each occurrence, identically or differently, denotes F, Cl, CN, or straight-chain or branched, optionally mono- or polyfluorinated alkyl, alkoxy, alkenyl, alkynyl, alkylcarbonyl, alkoxycarbonyl or alkylcarbonyloxy having 1 to 12 C atoms, L' and L" each, independently of one another, denote H, F or Cl, r denotes 0, 1, 2, 3 or 4, s denotes 0, 1, 2 or 3, t denotes 0, 1 or 2, and
x denotes 0 or 1.

7. The liquid-crystalline medium according to claim 1, additionally comprising one or more compounds of the formulae IIA, IIB and IIC

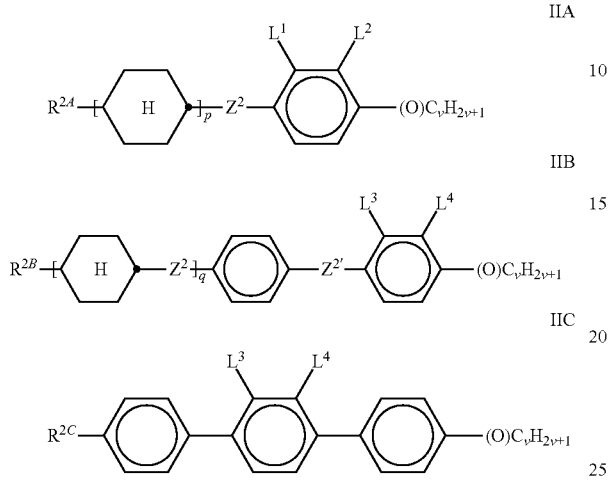

in which
$R^{2A}$, $R^{2B}$ and $R^{2C}$ each, independently of one another, denote H, an alkyl radical having up to 15 C atoms which is unsubstituted, monosubstituted by CN or $CF_3$ or at least monosubstituted by halogen, where, in addition, one or more $CH_2$ groups in these radicals may be replaced by —O—, —S—,

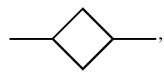

—C≡C—, —$CF_2$O—, —$OCF_2$—, —OC—O— or —O—CO— in such a way that O atoms are not linked directly to one another,
$L^{1-4}$ each, independently of one another, denote F, Cl, $CF_3$ or $OCF_2$
$Z^2$ and $Z^{2'}$ each, independently of one another, denote a single bond, —$CH_2CH_2$—, —CH=CH—, —$CF_2$O—, —$OCF_2$—, —$CH_2$O—, —$OCH_2$—, —COO—, —OCO—, —$C_2F_4$—, —CF=CF—, —CH=CHCH$_2$O—,
(O)$C_vH_{2v+1}$ denotes O$C_vH_{2v+1}$ or $C_vH_{2v+1}$
p denotes 1 or 2,
q denotes 0 or 1, and
v denotes 1 to 6.

8. The liquid-crystalline medium according to claim 1, additionally comprising one or more compounds of the formula III,

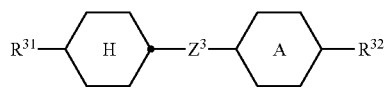

in which
$R^{31}$ and $R^{32}$ each, independently of one another, denote a straight-chain alkyl, alkoxyalkyl or alkoxy radical having up to 12 C atoms, and A denotes

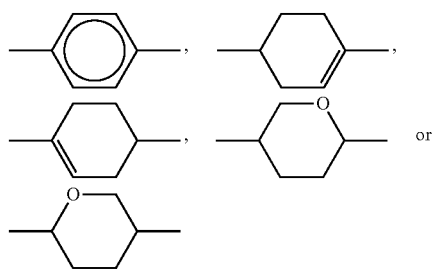

$Z^3$ denotes a single bond, —$CH_2CH_2$—, —CH=CH—, —$CF_2$O—, —$OCF_2$—, —$CH_2$O—, —$OCH_2$—, —COO—, —OCO—, —$C_2F_4$—, —$C_4H_9$—, —CF=CF—.

9. The liquid-crystalline medium according to claim 1, additionally comprising at least one compound of the formulae L-1 to L-11,

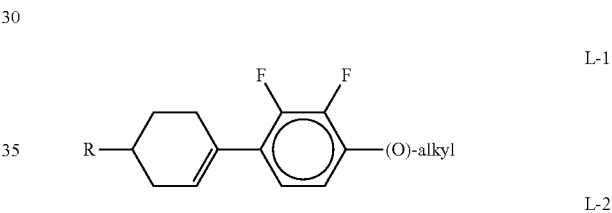

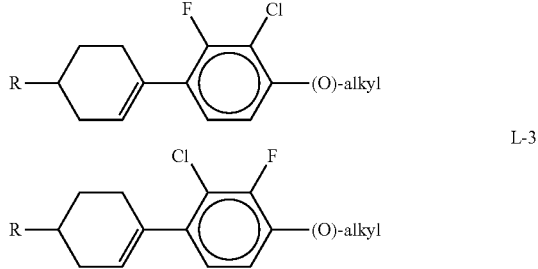

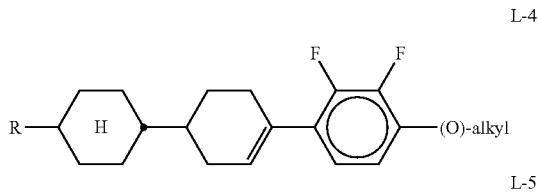

-continued

L-7
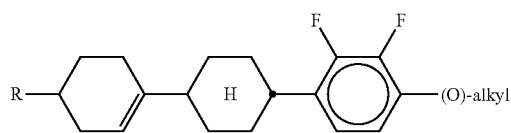

L-8
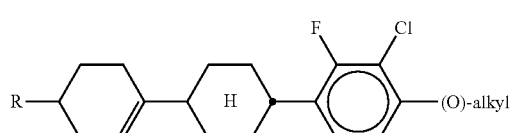

L-9
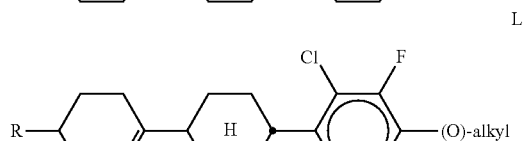

L-10
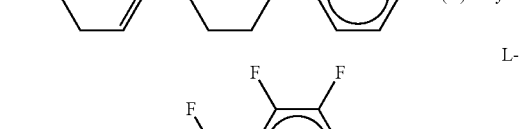

L-11
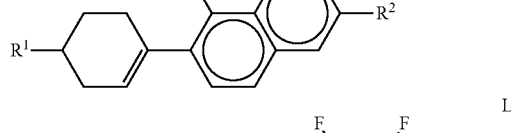

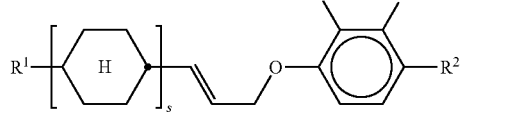

in which

R, R$^1$ and R$^2$ each, independently of one another, denote H, an alkyl radical having up to 15 C atoms which is unsubstituted, monosubstituted by CN or CF$_3$ or at least monosubstituted by halogen, where, in addition, one or more CH$_2$ groups in these radicals may be replaced by —O—, —S—,

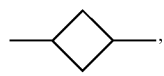

—C≡C—, —CF$_2$O—, —OCF$_2$—, —OC—O— or —O—CO— in such a way that O atoms are not linked directly to one another and alkyl denotes an alkyl radical having 1-6 C atoms, (O)-alkyl denotes O-alkyl or alkyl, and s denotes 1 or 2.

10. The liquid-crystalline Liquid-crystalline medium according to claim 1, additionally comprising one or more terphenyls of the formulae T-1 to T-21, T-1
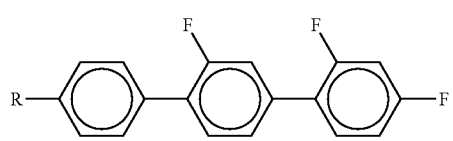

-continued

T-2
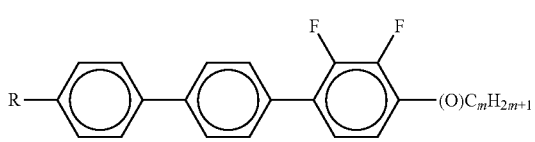

T-3
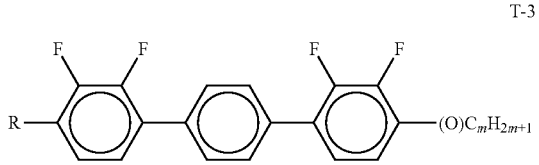

T-4
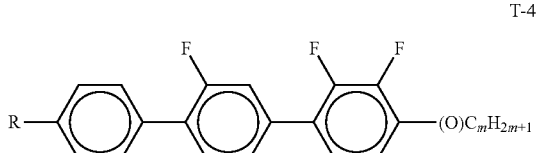

T-5
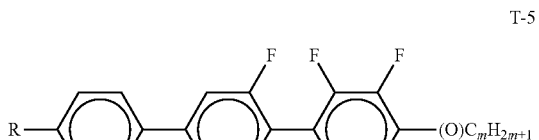

T-6
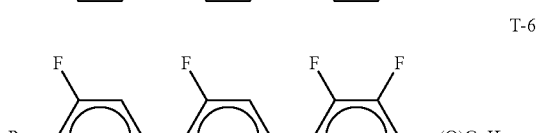

T-7
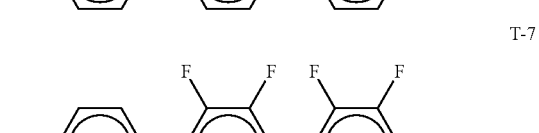

T-8

T-9
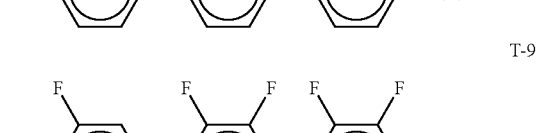

T-10
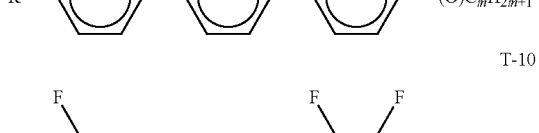

T-11
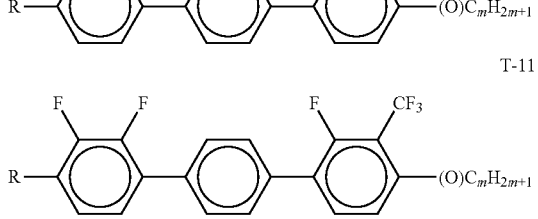

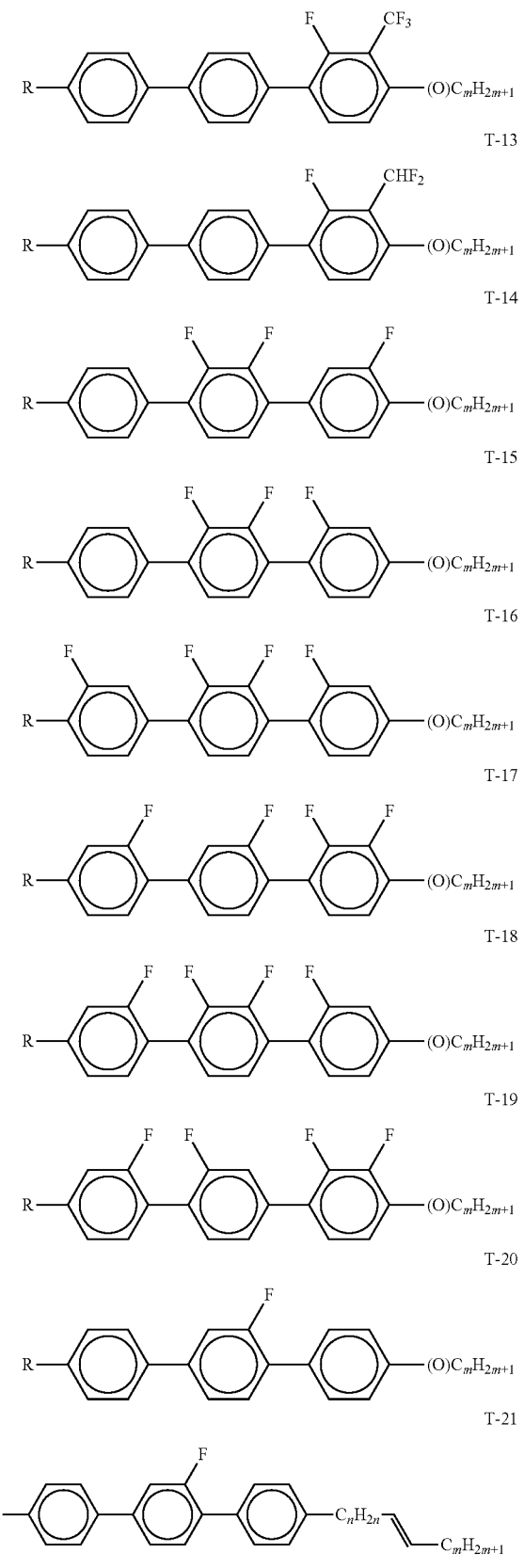
in which
R denotes a straight-chain alkyl or alkoxy radical having 1-7 C atoms,
$(O)C_mH_{2m+1}$ denotes $OC_mH_{2m+1}$ or $C_mH_{2m+1}$, and
m denotes 1-6.
11. The liquid-crystalline medium according to claim 1, additionally comprising one or more compounds of the formulae O-1 to O-16,
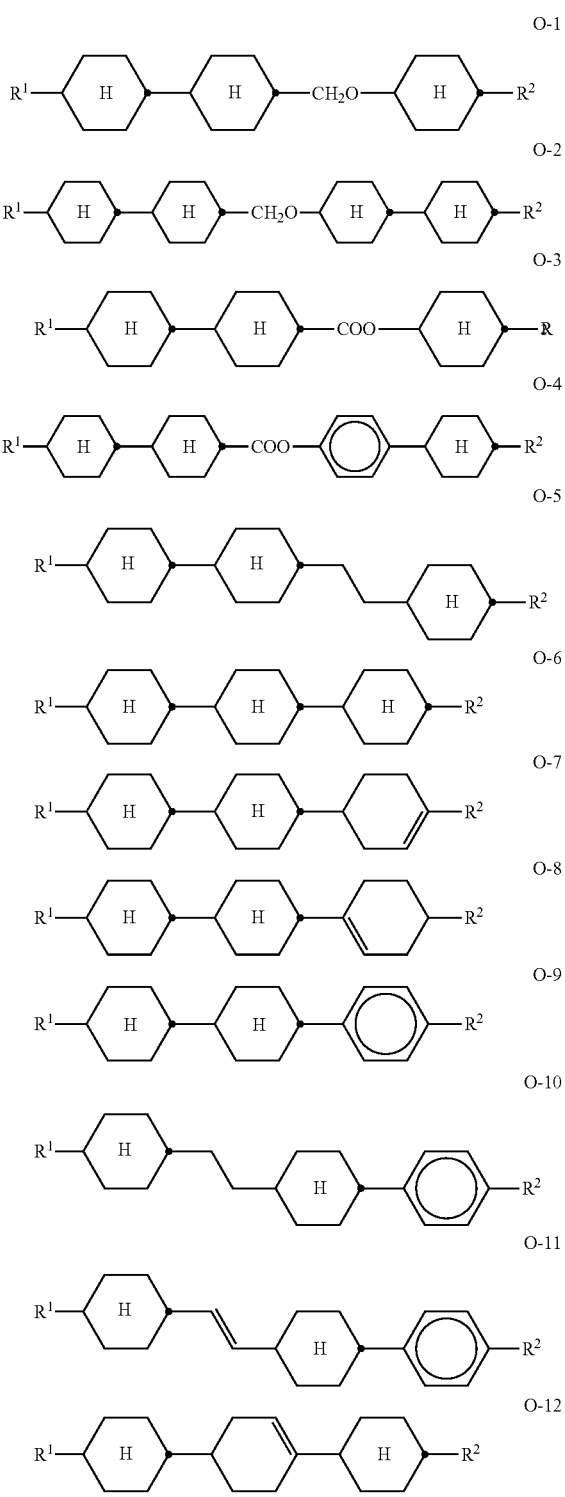

173
-continued

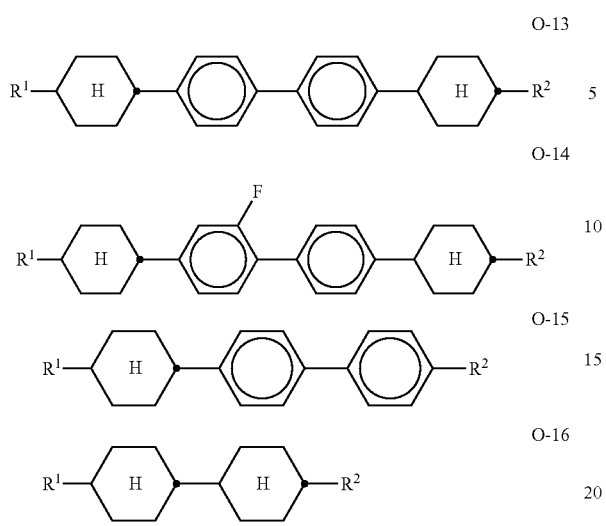

O-13
O-14
O-15
O-16 in which

R¹ and R² each, independently of one another, denote H, an alkyl radical having up to 15 C atoms which is unsubstituted, monosubstituted by CN or CF₃ or at least monosubstituted by halogen, where, in addition, one or more CH₂ groups in these radicals may be replaced by —O—, —S—,

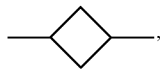

—C≡C—, —CF₂O—, —OCF₂—, —OC—O— or —O—CO— in such a way that O atoms are not linked directly to one another.

12. The liquid-crystalline medium according to claim 1, additionally comprising one or more indane compounds of the formula In,

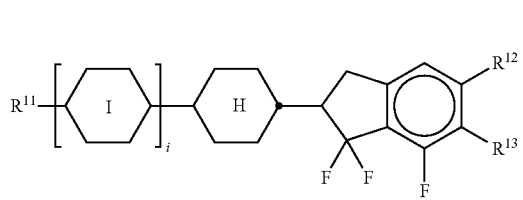

In in which

R¹¹, R¹², R¹³ denote a straight-chain alkyl, alkoxy, alkoxyalkyl or alkenyl radical having 1-5 C atoms, R¹² and R¹³ additionally also denote H or halogen,

174

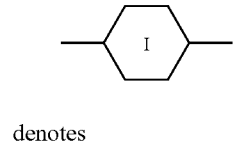

denotes

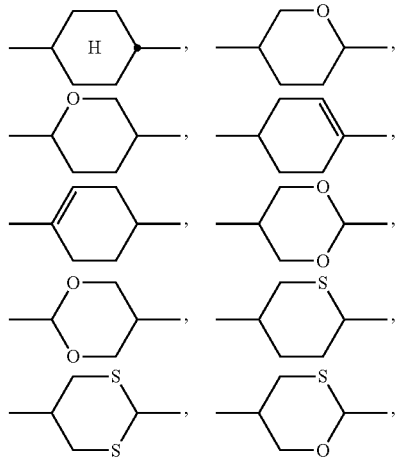

i denotes 0, 1 or 2.

13. A process for the preparation of a liquid-crystalline medium according to claim 1, comprising mixing at least one self-aligning compound with at least two liquid-crystalline compounds, and optionally with at least one polymerizable compound and optionally with one or more additives.

14. A self-aligning VA mode, electro-optical display, comprising the liquid-crystalline medium according to claim 1.

15. An electro-optical display having active-matrix addressing, comprising as dielectric, a liquid-crystalline medium according to claim 1.

16. An electro-optical display according to claim 15, that is a VA, PSA or PS-VA display.

17. The liquid-crystalline medium according to claim 5, where at least one of the radicals $R^{Ma}$ and $R^{Mb}$ denotes or contains a group P or P-Sp-.

18. The liquid-crystalline medium according to claim 5, wherein L is P, P-Sp-, H, OH, CH₂OH, halogen, SF₅, NO₂, an alkyl, alkenyl or an alkynyl group.

19. The liquid-crystalline medium according to claim 6, wherein P¹ and P² are independently an acrylate, methacrylate, fluoroacrylate, oxetane, vinyloxy or epoxy group, and Sp¹ and Sp² are each independently —(CH₂)$_{p1}$—, —(CH₂)$_{p1}$—O—, —(CH₂)$_{p1}$—CO—O— or —(CH₂)$_{p1}$—O—CO—O—, in which p1 is an integer from 1 to 12, and where the linking of the last-mentioned groups to the adjacent ring takes place via the O atom.

20. The liquid-crystalline medium according to claim 6, wherein $R^{aa}$ is a straight-chain or branched, optionally mono- or polyfluorinated alkyl, alkoxy, alkenyl, alkynyl, alkylcarbonyl, alkoxycarbonyl or alkylcarbonyloxy having 1 to 12 C atoms.

* * * * *